(12) United States Patent
Sticht et al.

(10) Patent No.: US 7,014,033 B2
(45) Date of Patent: Mar. 21, 2006

(54) PRODUCTION PLANT FOR ASSEMBLING AND/OR PROCESSING COMPONENTS TRANSPORTED ON WORKPIECE SUPPORTS

(75) Inventors: Walter Sticht, Attnang-Puchheim (AT); Roland Heiml, Vöcklamarkt (AT); Franz Stimpl, Attnang-Puchheim (AT)

(73) Assignee: STIWA-Fertigungstechnik Sticht Gesellschaft m.b.H., Attnang-Puchheim (AT)

( * ) Notice: Subject to any disclaimer, the term of this patent is extended or adjusted under 35 U.S.C. 154(b) by 13 days.

(21) Appl. No.: 10/469,903

(22) PCT Filed: Mar. 5, 2002

(86) PCT No.: PCT/AT02/00067

§ 371 (c)(1),
(2), (4) Date: Mar. 8, 2004

(87) PCT Pub. No.: WO02/072453

PCT Pub. Date: Sep. 19, 2002

(65) Prior Publication Data

US 2004/0134755 A1    Jul. 15, 2004

(30) Foreign Application Priority Data

Mar. 9, 2001   (AT) ............................... A 375/2001

(51) Int. Cl.
*B65G 29/00*   (2006.01)

(52) U.S. Cl. .................. 198/465.1; 198/345.3
(58) Field of Classification Search ............ 198/465.1, 198/465.2, 345.3; 29/33 P
See application file for complete search history.

(56) References Cited

U.S. PATENT DOCUMENTS

| | | | |
|---|---|---|---|
| 4,279,337 A * | 7/1981 | Kachnik | 198/465.1 |
| 5,062,368 A | 11/1991 | Sticht et al. | |
| 5,078,254 A | 1/1992 | Colonius et al. | |
| 5,170,876 A | 12/1992 | Sticht | |
| 5,213,195 A | 5/1993 | Sticht | |
| 5,271,490 A * | 12/1993 | Sticht | 198/465.2 |
| 5,388,684 A | 2/1995 | Peck | |
| 6,009,990 A | 1/2000 | Davis | |
| 6,070,534 A | 6/2000 | Lehrieder | |
| 6,698,574 B1 * | 3/2004 | Frommenwiler et al. | 198/465.1 |

* cited by examiner

*Primary Examiner*—James R. Bidwell
(74) *Attorney, Agent, or Firm*—Collard & Roe, P.C.

(57) ABSTRACT

The invention relates to a production line (1) for assembling and/or processing components (3) transported on workpiece holders (2), incorporating several conveyor sections (5, 6a, 6b, 6c) disposed one after the other, each of which has at least one separate forward feed mechanism (15; 51) which is independent of the adjacent conveyor sections (5, 6a, 6b, 6c) and at least one co-operating guide mechanism with two oppositely lying guide tracks (20), along which the workpiece holder (2) disposed between them, incorporating guide elements to provide a height and lateral guiding action, can be moved and positioned. The guide elements of the workpiece holder (2) have a groove-shaped recess for engaging in the guide tracks (20) spaced at a distance apart from one another transversely to the feed direction (16) and at least one guide track (20) is provided in at least one of the conveyor sections (6a; 6c) which can be raised by means of an adjusting mechanism from a non-operating position outside an obstruction gauge of the workpiece holder (2) into a position above the transport plane (19) and displaced into an engaged position locating with the recesses of the guide elements transversely to a longitudinal direction of the guide track (20).

73 Claims, 24 Drawing Sheets

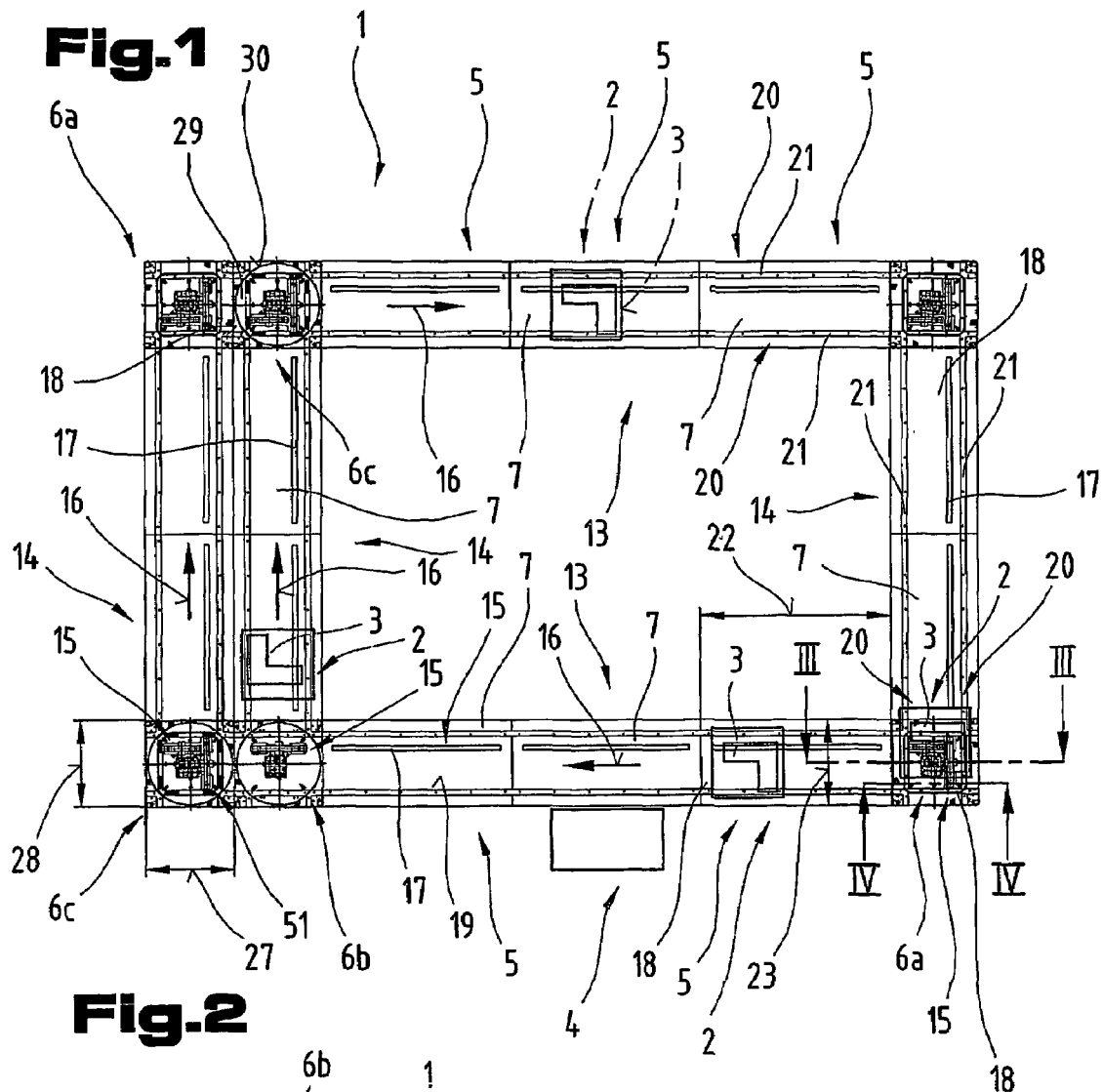
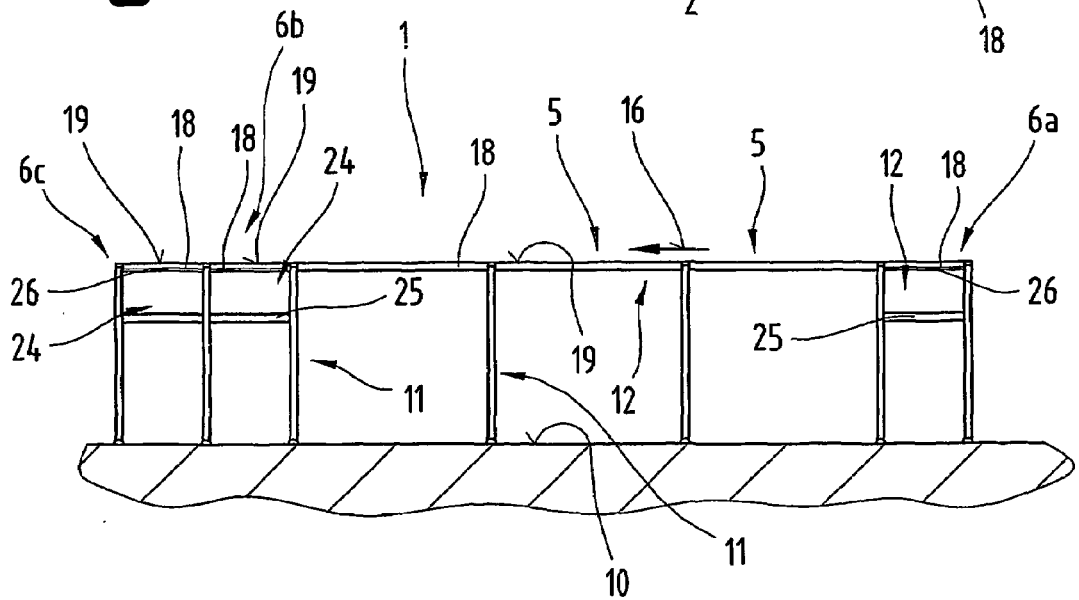

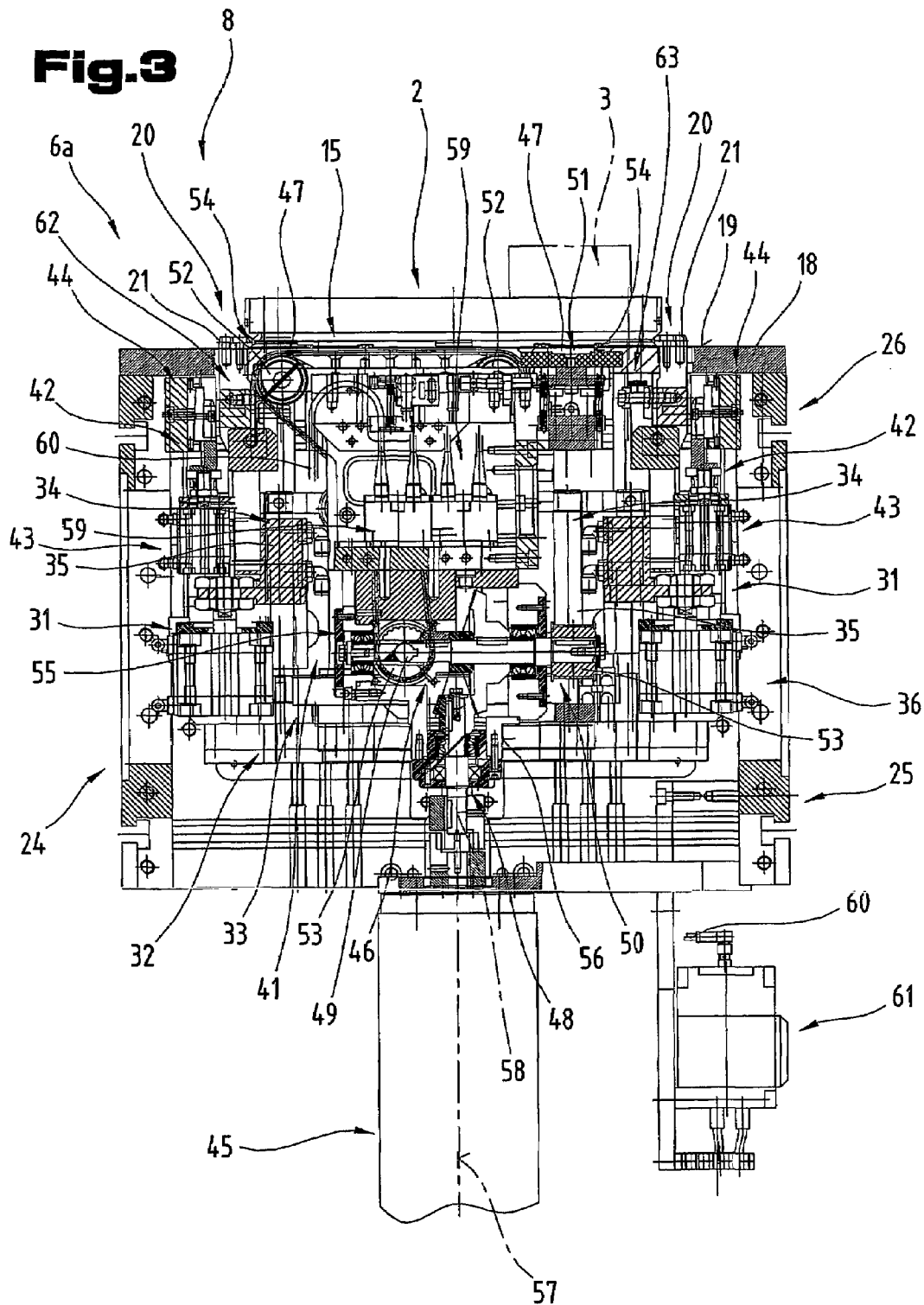

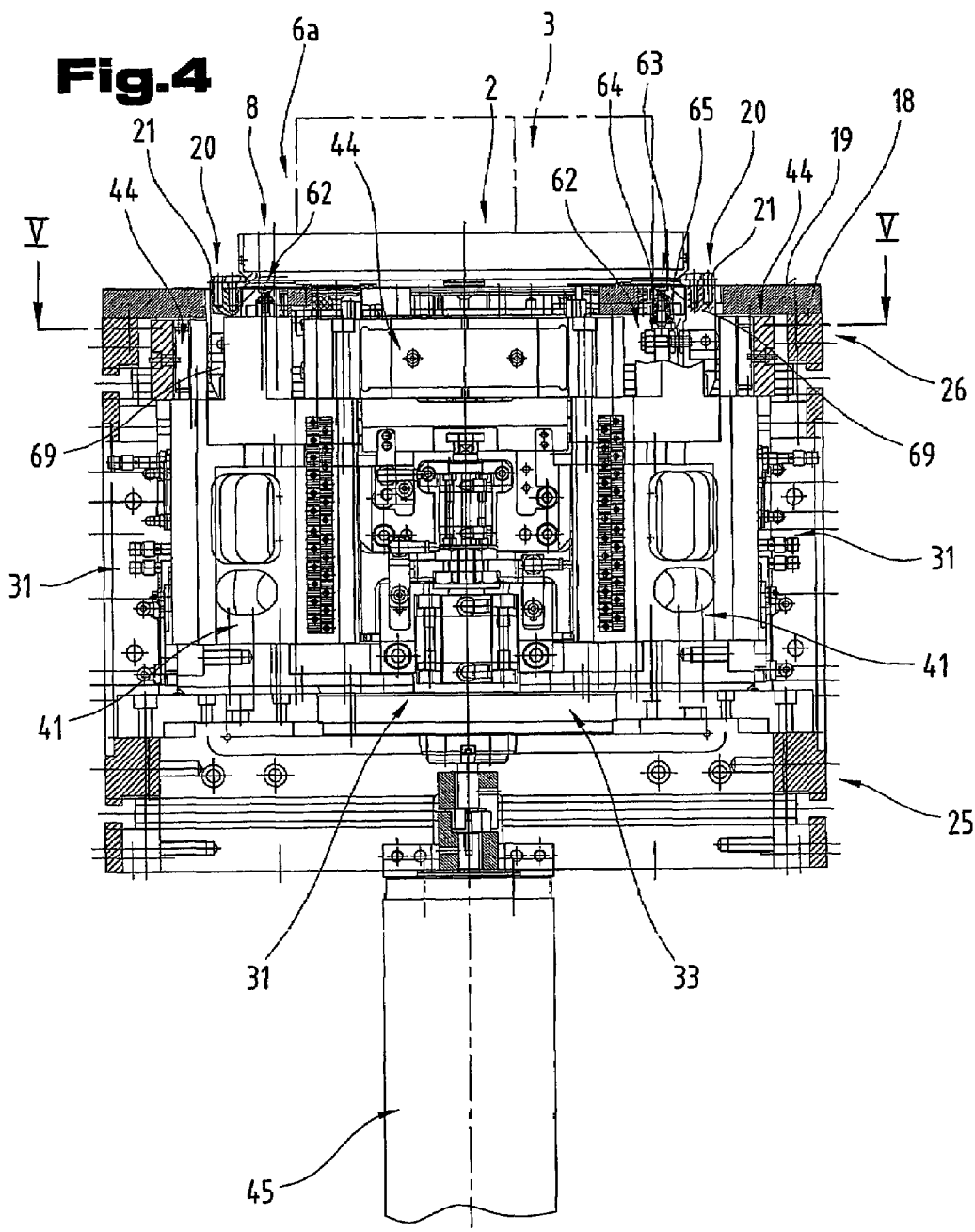

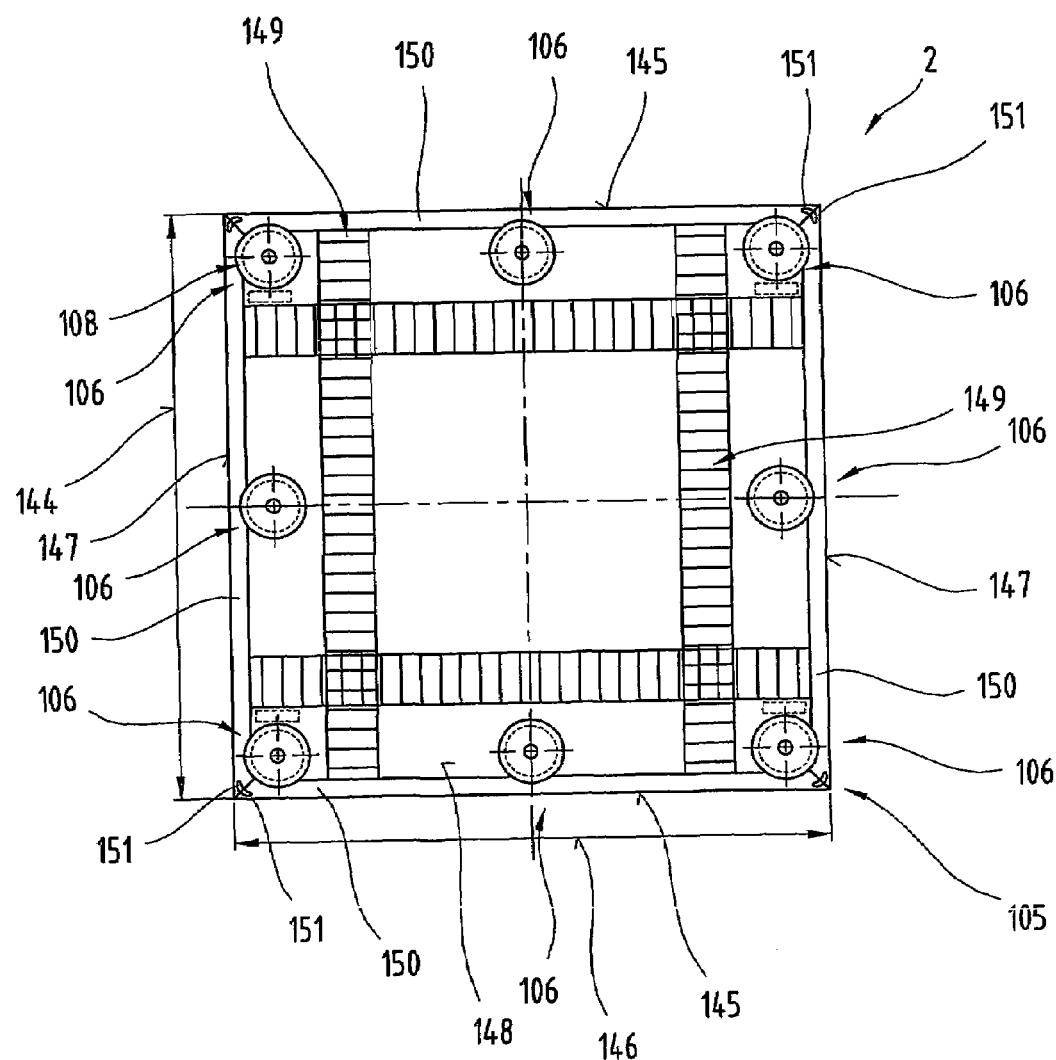

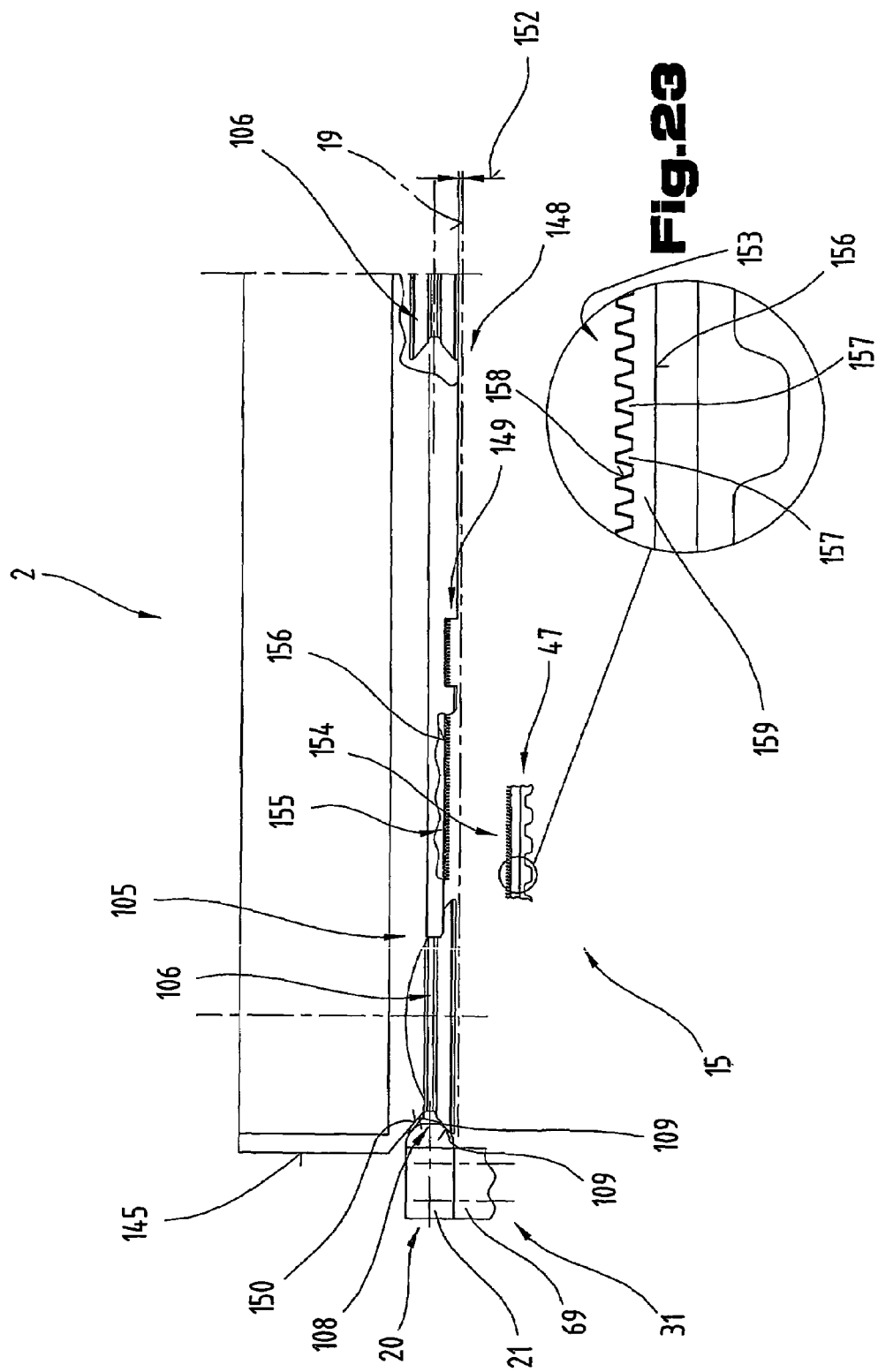

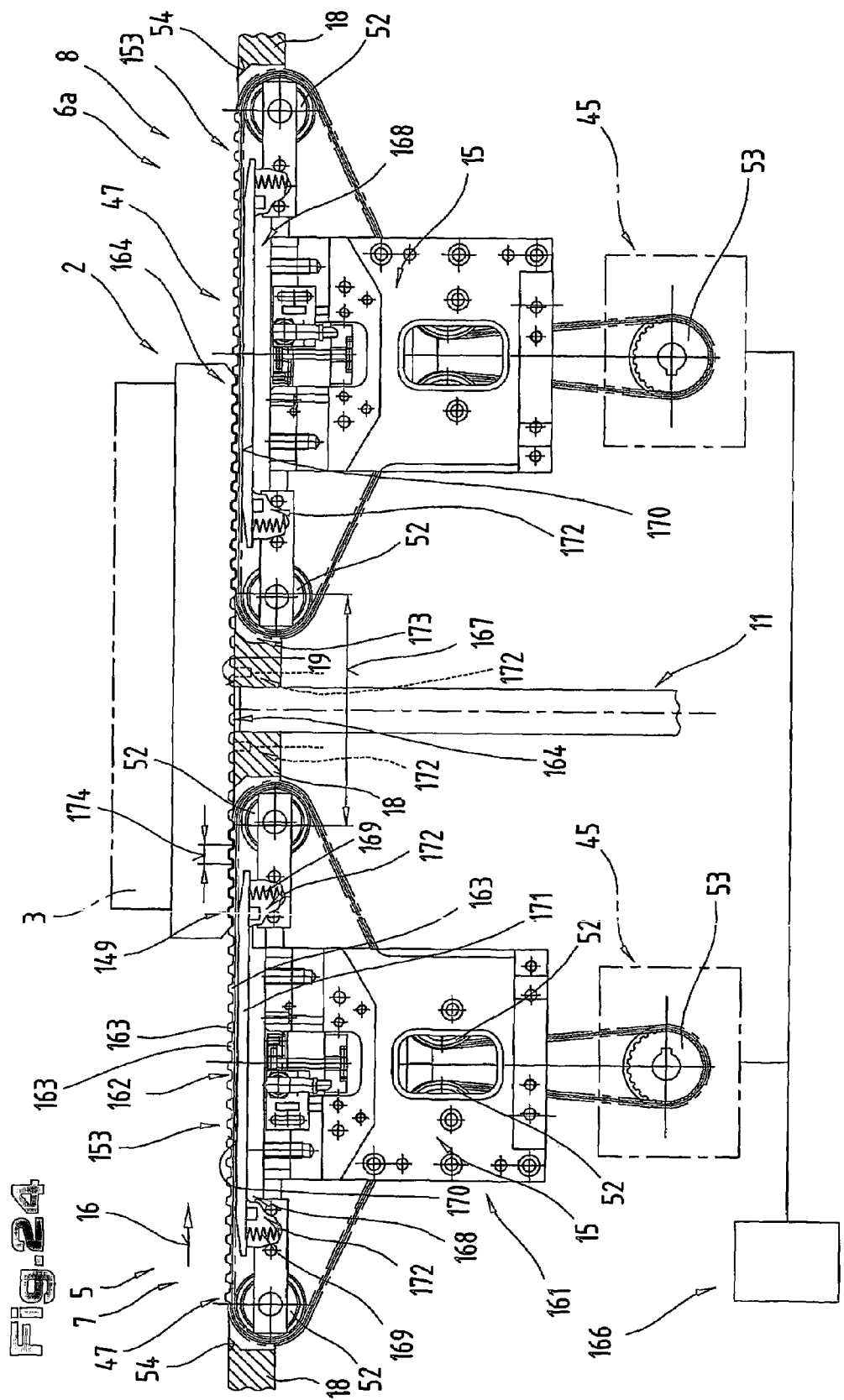

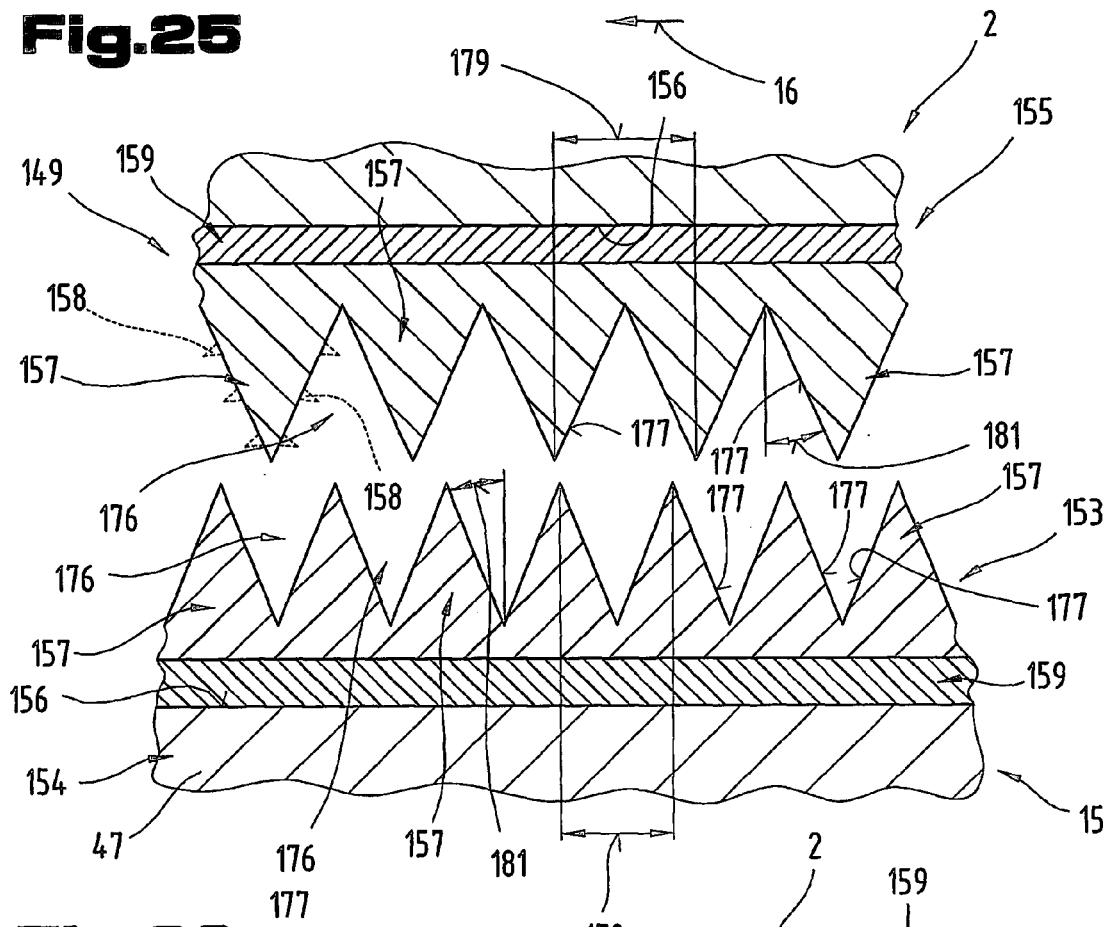
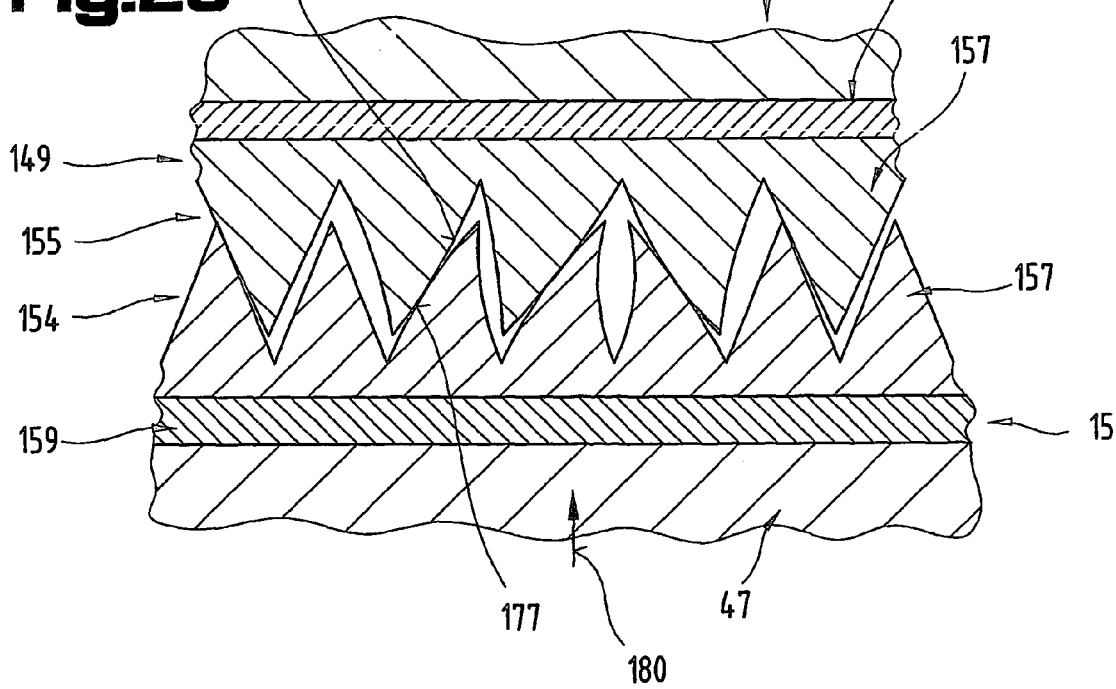

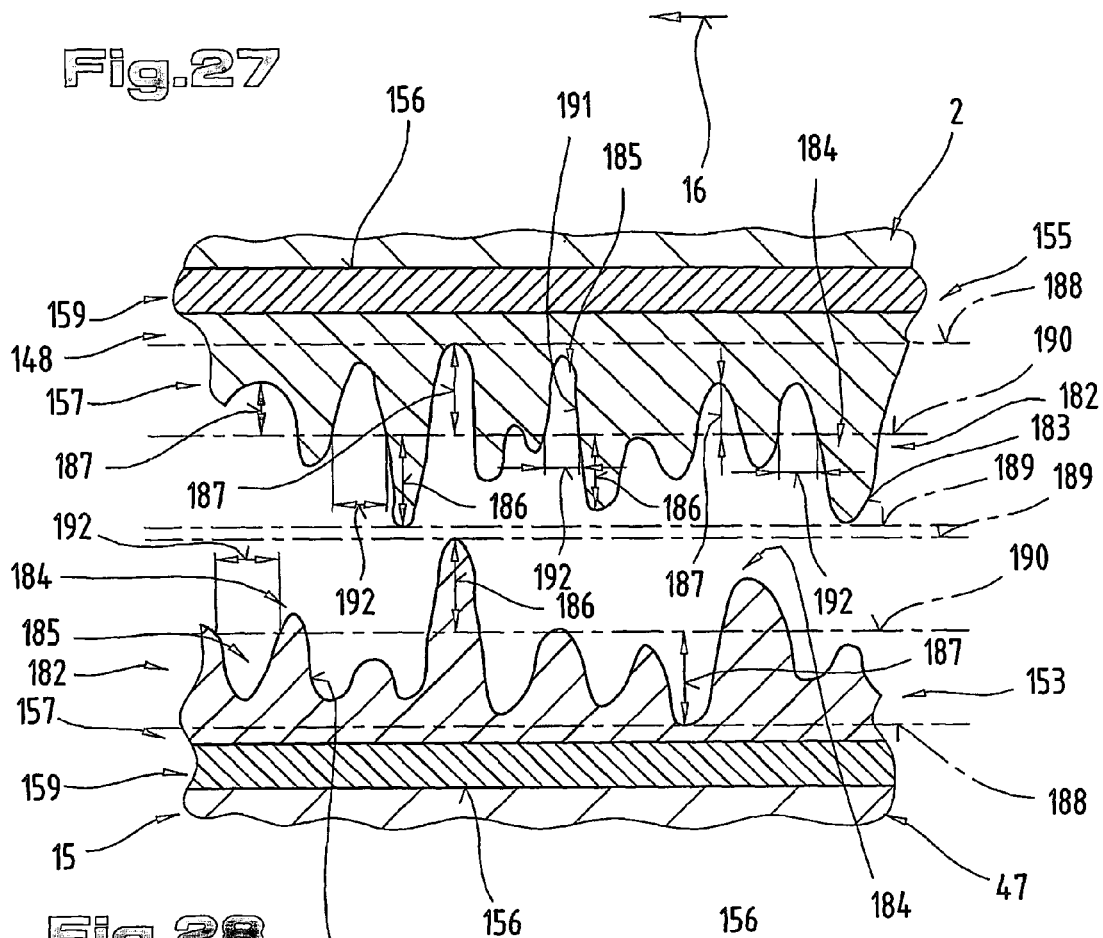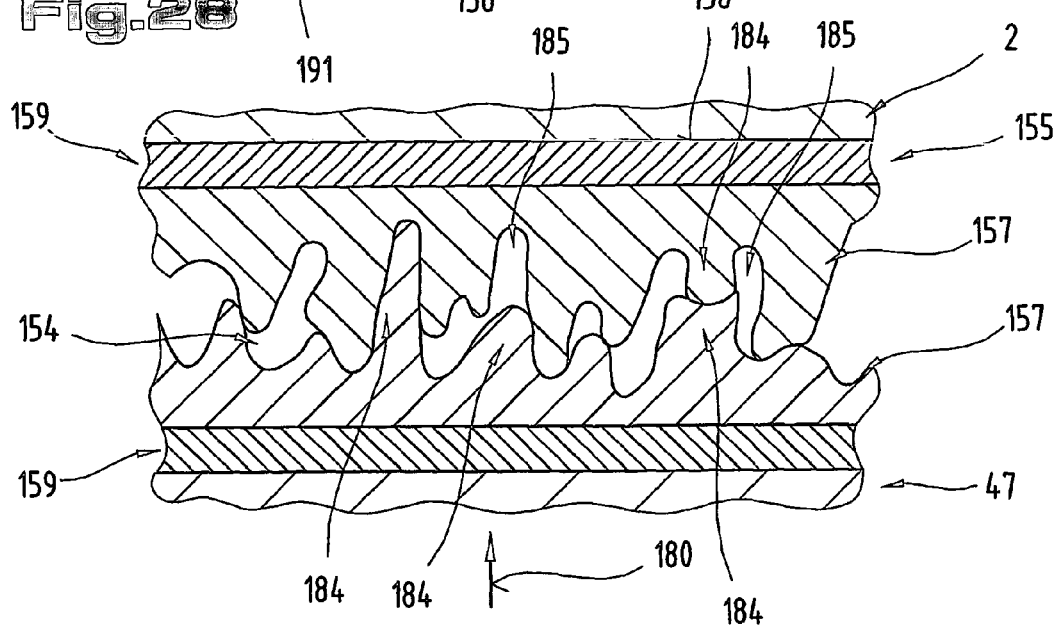

PRODUCTION PLANT FOR ASSEMBLING AND/OR PROCESSING COMPONENTS TRANSPORTED ON WORKPIECE SUPPORTS

CROSS REFERENCE TO RELATED APPLICATIONS

Applicants claim priority under 35 U.S.C. §119 of AUSTRIA Application No. A 375/2001 filed on Mar. 9, 2001. Applicants also claim priority under 35 U.S.C. §365 of PCT/AT02/00067 filed on Mar. 5, 2002. The international application under PCT article 21(2) was not published in English.

The invention relates to a production line for assembling or processing components transported by workpiece holders, a method of transferring a workpiece holder from one conveyor section to another and a feed mechanism for a workpiece holder.

Many different types of production systems with a loose chain-linked system have become known, in which a plurality of different conveyor sections, in particular transport stations and diverting stations or node stations, performing different tasks are disposed immediately one after the other. The workpiece holders, which are self-driving or drivingly linked to feed mechanisms co-operating with the transport and node stations, can be respectively displaced independently of one another on a height and/or lateral guide mechanism along two oppositely lying guide tracks. The guide tracks of the guide mechanism are provided in the form of flat-surfaced guide rails or guide rollers engaging in the region of side faces extending perpendicular to the bottom face and top face of the workpiece holder. Systems of this type are only suitable for transporting components of a low weight because the workpiece holder is at risk of being lifted out of the guide mechanism, especially when handling overhanging loads, which can cause damage to the workpiece holder, to the component and possibly also to the guide mechanism of the production system. If the workpiece holder is required to handle heavy loads, the guide surfaces, guide rails and workpiece holder itself must be built to larger dimensions in order to be able to operate at all, which above all has a detrimental effect on the performance required of the drives, etc., for example, thereby significantly reducing the degree of efficiency of a production line of this type.

The underlying objective of the present invention is to propose a production line capable of handling heavy loads but with guide tracks and workpiece holders of the smallest possible dimensions. Irrespective of this, the workpiece holder should be such that it can be positioned and transferred from a first into a subsequent conveyor section.

According to one aspect of the invention, there is provided a production line for assembling or processing components transported on a workpiece holder, incorporating several conveyor sections arranged one after the other in a feed direction of the workpiece holder, each of which has at least one separate forward feed mechanism which is independent of the adjacent conveyor sections, and at least two oppositely lying guide tracks spaced at a distance apart from one another and disposed transversely transversely to the feed direction, along which the workpiece holder is guided by guide elements disposed at its oppositely lying sides, and is displaceable by the respective forward feed mechanism. The guide elements or the guide tracks form a groove-shaped recess and the guide elements on the workpiece holder have a cross-sectional shape complementing the recess in the guide tracks, or the guide tracks have guide surfaces in at least certain regions which complement the recess. The workpiece holder with its drive means engages in a form lock in a belt-type drive element of the forward feed mechanism and is drivingly linked to the drive element and is guided along the guide tracks in a direction perpendicular to and parallel with the transport plane. In at least one of the conveyor sections a pair of guide tracks lying opposite one another in the feed direction can be raised by means of an adjusting mechanism from a non-operating position outside a structure gage of the workpiece holder into a position located above the transport plane and can be displaced respectively in the same direction transversely to the longitudinal direction of the guide track into an engaged position so that the guider tracks mutually engage with the guide elements. The surprising advantage of this approach is that the guide tracks engage in the groove-shaped recesses of the guide elements provided on the workpiece holder in an essentially form-locking arrangement, which also enables components lying externally to the centre of gravity of the forcibly guided workpiece holder to be handled without the workpiece being moved from its pre-definable relative position with respect to the guide tracks.

In one preferred embodiment, the guide elements are guide rails or guide rollers on oppositely lying sides of the workpiece holder, which rotate about axes extending perpendicular to the transport plane, or the guide elements are disposed consecutively, spaced apart from one another by a distance which is the same as or slightly longer than a length of the guide tracks in the conveyor section. This is of advantage because the form-locking inter-engagement of certain regions of the guide tracks and guide elements does not cause friction-induced wear, thereby enabling the availability of a production system of this type to be increased. The automatically centred and forcibly guided workpiece holders are also able to withstand higher loads and torques.

In another embodiment, the adjustment mechanism and an operating mechanism for the guide track each have an actuator drive, and pressure is applied consecutively to the actuator drives to make a synchronous height adjustment and pivoting motion of respective pairs of guide tracks in the conveyor sections. This enables the workpiece to be accurately guided along the guide tracks due to the simultaneous displacement of a pair of guide tracks. Furthermore, even if even if a workpiece or the component and possibly also the guide tracks are subjected to vibrations, the latter are nevertheless positioned in their engaging position and prevented from returning to their initial position.

It is also of advantage if the workpiece holder is square-shaped and the guide rollers are disposed preferably in circular cylindrical recesses in the bottom face of the workpiece holder, because the fact that the guide elements are disposed on the bottom face of the workpiece holder and optionally in recesses, the vertical gravitational axis of a component held by the workpiece holder can be kept low, which means that it is now possible to apply a low surface pressure to the guide elements and guide tracks, even in the case of overhanging loads, again increasing the availability of the production system.

A groove-shaped recess on the guide elements may be bounded by complementary guide surfaces disposed at an angle to one another and at least certain regions of the guide tracks have guide surfaces complementing the recess. Also, edges of the guide tracks disposed transversely to the feed direction of the workpiece holder may form a square in the conveyor sections. This enables the forces flowing through the workpiece holder and the guide tracks to be distributed.

Also of advantage is an embodiment in which the workpiece holder is supported by the guide elements against the guide tracks and at least a slight distance is left free between a bottom face of the workpiece holder and the transport plane in a direction perpendicular to the transport plane, because the surface of the conveyor sections constituting the transport plane does not have to be produced to low manufacturing tolerances except in a region incorporating the guide tracks, which primarily helps to reduce production costs. Moreover, undesired and unforeseeable impacts, etc., are primarily transmitted to the guide tracks, which can be replaced and are inexpensive, without causing damage to the conveyor sections.

The vertical distance between the workpiece holder and the transport plane may be varied by a remotely operable height adjustment mechanism so that adjustment is possible in several spatial directions when using the node station as a work station.

In one preferred embodiment first forward feed mechanism with a first drive element is disposed between the guide tracks of the conveyor section in the feed direction of the workpiece and another forward feed mechanism with another drive element is disposed transversely to the feed direction, and the forward feed mechanisms are alternately height-adjustable in the direction perpendicular to the transport plane and are driven by a drive system with an interconnected gear mechanism, at the same circumferential speed, and the workpiece holder is alternately drivingly connected to one of the forward feed mechanisms and can be displaced and positioned in the feed direction or transversely to the feed direction in one of several conveyor sections along the conveyor section. This enables the workpiece holder to be positioned and transferred to one of several conveyor sections so that a routing path can be selected depending on the how densely occupied the individual conveyor sections are relative to the cycle time of the production system, thereby enabling substantially interruption-free operation and interruption-free delivery of a workpiece holder to an operating station.

Oppositely lying guide tracks disposed transversely to the feed direction may be synchronously displaced in the same direction if each is connected to an adjusting mechanism, improving the timing in a node station individually and in conjunction with the other transport stations, which increases the productivity of the production system.

Preferably, the guide tracks have guide rails detachably connected to a fork-shaped actuator lever mounted on a support body of a guide carriage. This enables a worn guide rail to be easily replaced or different types of guide rails to be mounted, which above all reduces cost-intensive downtimes.

In one embodiment, the adjusting mechanism has an actuator lever operable by an actuator drive and having a slide track supported on a bearing element. A first Part region of the slide track may be inclined relative to the transport plane and another part region adjoining it extend perpendicular thereto. The actuator lever bearing the guide track is adjustable or displaceable to produce an engagement of the guide track with the guide elements against the action on elastic return elements, out of a non-operating position into the engaged position in a direction parallel with the angle of inclination of the part region of the slide track. This enables the guide tracks, which are expediently operated in synchronisation, to be moved in a direction substantially at an angle to the transport plane, so that the oppositely lying guide tracks disposed transversely to the feed direction can be moved towards one another simultaneously and in the same direction.

If the actuator drive is mounted pivotably about a transverse axis, stress on the actuator drive is reduced.

A mechanical construction of a robust design, built in a modular system, which results in stable operating behaviour, provided with the following features: Each adjusting mechanism is disposed on a support frame interchangeably connected to a base frame of a preferably square machine frame. The base frame may have a bottom frame part and a top frame part, the frame parts are connected by vertical side walls, and a square apron is placed on the top frame part. A recess for a circular rotary table is provided in the apron, and the support frame has a preferably octagonal support plate disposed parallel to the transport plane and strip-shaped support elements disposed perpendicular thereto. The rotary table and support plate are connected by diagonally opposite elements, and the support frame is mounted on a face remote from the rotary table by a bearing mechanism so as to be displaceable in a pivoting motion relative to the base frame about an axis perpendicular to the transport plane. A drive means parallel to the transport plane is drivingly linked to a drive system detachably connected to the base frame.

Reliable operation of the production line is ensured if the apron or the rotary table has longitudinal cutouts to accommodate at least one pair of guide rails and the forward drive elements of the forward feed mechanism, the pair of guide rails in the extracted position projects from the apron or rotary table and, in the non-operating position, is lowered into the cutouts below the transport plane.

To connect the adjusting mechanisms interchangeably to the support frame is also of advantage because it enables different component units to be adjusted to cater for different application ranges and loads and enables the change to be made within the shortest time.

It is advantageous if each adjustment mechanism is disposed on a support frame and has a first actuator drive, an operating and/or locking mechanism for the guide track, and a substantially prism-shaped guide carriage with a preferably cruciform support body. The carriage is displaceably mounted by the first actuator drive on the support frame and the support body for receiving certain regions of another actuator drive of the operating and/or locking mechanism is connected to the guide carriage. The support body preferably has projections projecting laterally transversely to its longitudinal extension and has U-shaped pivot mounts between a middle web and the projections across at least a part of its thickness, as well as a projection between the pivot mounts in the other longitudinal direction. This provides a robust design, compact and requires little mounting space and can be built using components known from the prior art.

Preferably, the actuator lever is mounted so as to be displaceable by a pivoting motion against the action of an elastic return element about an axis extending transversely thereto. It has an L-shaped cross section in the region of the oppositely lying pivot mounts, shorter legs of bearing elements in the region of the pivot mounts extending transversely to the longitudinal extension of the support body are pivotably mounted, and lens projecting from the shorter legs have bearing elements mounted so as to pivot about a rotation axis extending parallel with a pivot axis of the actuator lever. The actuator lever is thus automatically prevented from returning from an engaged position between the groove-shaped recesses and the guide rails into a non-operating position outside of the obstruction gauge of the workpiece holder, thereby ensuring that the workpiece holder is reliably transferred to a transport station adjacent to the diverting station.

Advantageously, the workpiece holder has a drive on its bottom face between the guide elements, and a forward feed mechanism incorporating a drive element comprising the latter is drivingly connected to the drive. This offers a compact structural design.

The adjusting mechanisms can be displaced and adjusted to enable an aligned transfer between the guide tracks of the transport stations and the guide tracks of the conveyor sections if they are displaceable in a direction perpendicular to the transport plane and a displacement motion of the adjusting mechanisms in this direction is restricted by a height adjusting mechanism.

Any space between the guide elements of the workpiece holder and the guide tracks in the direction parallel with the feed direction, such as might occur in particular when fitting new guide tracks, can be eliminated if a displacement path of the actuator lever transversely to the feed direction is restricted and adjustable.

The operating and locking mechanism preferably cooperates with a clearance compensating device having a prism-shaped base body with wedge-shaped positioning elements therein, which can be displaced and fixed relative to each other. This enables tolerance variations resulting from production to be compensated.

It is also of advantage if an operating element of the operating and locking mechanism is U-shaped and has an L-shaped cross section, since the operating element has a degree of freedom, thereby reducing stress in the construction.

If a leg of the operating element is mounted on the other actuator drive and the other projecting leg has an oblique surface on its free end in the region of the side face directed towards the actuator lever, the operating element used, which fulfills several functions, may be a slide-controlled element.

When the guide track is in a non-operating position, the oblique surface is preferably engagingly linked to a bearing element of the actuator lever. This ensures that the actuator lever and the operating and/or locking mechanism are always actively linked, which above all helps to improve the cycle time.

Preferably, the bearing element is engagingly linked to the vertical side face forming a slide track when the guide track is in a raised engaged position. This prevents the guide tracks from being automatically returned from an engaged position into a non-operating position.

Preferably, the guide carriage acts as a pneumatic or hydraulic or electrical distributor rail with terminals and the distributor rail has electric control lines or passages conveying a pressurizing medium. The guide carriage may also be provided with a memory module or a control unit processing signals or bus data. This is of advantage because the fact that the guide carriages are provided in the form of a pneumatic and/or hydraulic and/or electric distribution rail significantly reduces the hose system and/or the amount of cabling required and the guide carriages can be equipped to a certain extent with intelligent elements, such as memory modules.

One of the conveyor sections may be a holding or buffer run for accommodating several workpiece holders in readiness for delivering the workpiece holders to and away from one other conveyor section. This enables the timing of the workpiece holders in each of the conveyor sections to be optimised.

The objective of the invention is also achieved as a result of a method of transferring a workpiece holder from a first conveyor section to a second conveyor section immediately adjacent to it, whereby the workpiece holder is engaged in a positive lock by a drive means with a first cogged-belt drive arranged in the first conveyor section and a second cogged-belt drive arranged in the second conveyor section during the movement of the workpiece holder between the first and second conveyor sections. Before the workpiece holder enters the other conveyor section, a distance between drive elements of two consecutive cogged-belt drives corresponding to a multiple of a pitch of the drive means on the workpiece holder is detected and, if there is a deviation, a forward feed rate of at least one cogged-belt of the first and second conveyor sections displacingly connected to the drive means of the workpiece holder and designed to engage in the drive means is briefly varied until the distance is set to a multiple of the pitch, after which the workpiece holder moves from the first conveyor section into the second conveyor section and the driver elements of the drive means are alternately engaged with locating means of the cogged-belt drives in the second conveyor section free of slip. The surprising advantage of this approach is that the distance of the workpiece holder as it is moved out of a first feed mechanism by means of the first driving element or locating means to the instant at which it enters the region of the other feed mechanism and engages in a form-locking arrangement with the locating means or driving element of the drive member of the feed mechanism is pre-set, which enables slip-free transmission of the forward motion of at least one feed mechanism, without causing inherent tension in the workpiece holder or applying pressure to it, and permits a transfer between the conveyor sections devoid of impacts.

As the workpiece holder is transferred from the first towards the second conveyor section downstream in a feed direction, a relative position of the drive means with respect to the cogged-belt drive is preferably detected to ascertain the distance, and in the event of deviation, a forward feed rate of at least one of the cogged-belt drives is briefly varied and, once the distance is set, the workpiece holder is moved into the second conveyor section and the locating means of the cogged-belt drive is alternately moved into engagement with drive elements of the drive means without any slip. Once the speed has been set, the speeds of the drive systems for the cogged-belt drives are synchronised during the movement of the workpiece holders between the first and second conveyor sections and the actual values of the adjusted speeds and the distance are stored as desired values. In this way, the workpiece holder is moved along by at least one forward feed mechanism and driven at the higher side, and the rotation speed of at least one forward feed mechanism can be changed once the driving element with the locating means has automatically been aligned and engaged with the feed mechanism, so that it is expediently fed forward continuously.

Preferably, the cogged-belt drives and the drive means have the same geometries. The drive system for the first cogged-belt drive is speed-controlled and the drive system for the second cogged-belt drive is torque-controlled. As it is transferred from the first to the second conveyor section, the workpiece holder sits with a first flank of a tooth of the drive means at a tangent to a flank of a tooth of the cogged-belt drive and, if there is a deviation in the distance, a desired value of a driving torque that will overcome the load torque is applied to the drive system, after which the speed is changed and, when the driving torque reaches the desired value, the set speed or a resultant distance is store as a new desired value. In this way, the workpiece holder moving along in the feed direction is pressed so that the first flank of the engaging means abuts with a flank of the engaging means or driving element of the drive member, as a result of which any variance in the rotation speed of the other feed mechanism can be detected on the basis fluctuations in the driving torque reflected as a rise in the torque characteristic curve, and the speed can be controlled in order to adapt the load torque to the pre-definable desired torque or driving torque automatically, and a cyclical check is performed by constantly monitoring the torque characteristic curve so that a synchronous drive or a synchronous speed always prevails between the two drive elements of the feed mechanisms, thereby enabling friction-induced wear to be reduced to a minimum. This ensures reliable operation and high availability of the production line proposed by the invention.

Finally, the objective of the invention is also achieved as a result of another aspect thereof, which provides a forward feed mechanism for a workpiece holder with a bottom face which can be displaced and positioned along at least two oppositely lying guide tracks and guided in a lateral and vertical direction, which forward mechanism has at least one endlessly circulating belt-type drive element drivingly linked to the workpiece holder in order to move the workpiece holder along the guide tracks. The drive element has a first coupling element on a top face directed towards the bottom face and the workpiece holder has a second coupling element on the bottom face, the first and second coupling elements each having at least one coupling part which can be moved into engagement. The coupling parts are made of an elastically flexible and reversible plastics material and, when the coupling elements are in a coupled engaged position, contacting coupling parts are elastically deformed so that the coupling elements can be coupled with one another in each of their relative positions for the positioned movement of the workpiece holder along the guide tracks. The surprising advantages of this approach are that because the coupling parts of the mutually engageable or locating coupling elements are of an elastically flexible and reversible design, they can be pushed apart or towards one another, even if several coupling parts are in contact with one another, and the further displacement of the height-adjustable feed mechanism or drive member causes a part of the coupling parts to engage with one another in a form-locking arrangement and the other part of the clutch elements to be positioned relative to one another in a friction lock, and because the coupling elements are form-locked and friction-locked, the forward displacement forces of the displaceable workpiece holder can be absorbed. Furthermore, this form-lock and friction-lock between the drive member and the workpiece holder increases positioning accuracy, because the coupling elements can be coupled with one another in each of their relative positions in order to transmit the feed forces. The fact that the coupling elements can be coupled with one another continuously to a certain extent obviates the need for control and mechanical means that would otherwise be required to control the setting of a distance corresponding to a multiple of a pitch of the drive means of the workpiece holder.

It is advantageous for the first coupling element to be connected with the drive element and the second coupling element to be connected with the workpiece holder, and for the drive element to be of a multi-layered structure, with one of the layers being the first coupling element. Also, the coupling parts preferably have slightly elastically flexible projections distributed on their surface and, in the engaged position, the coupling parts engage in an essentially positive and friction lock to move the workpiece holder along. This enables the coupling elements disposed on the workpiece holder and the drive member to be steplessly engaged or disengaged, thereby preventing the drive means from engaging and disengaging with the drive member in predefined pitches.

If the drive element is relatively displaceable at an angle to a bearing surface of the first and second coupling elements in order to release the engageable coupling elements, and the displacement path is restricted to a minimum height of the coupling parts of the second coupling element, the coupling parts engage and/or optionally come into contact with one another exclusively at the side faces, and do so in such a way that the coupling elements mutually engage at a slight distance from one another, thereby preventing damage to the coupling elements which might otherwise occur due to inadmissible deformation.

To be adapted to different conditions of usage, the drive element and workpiece holder are made of plastic and the coupling elements are extruded thereon. The coupling elements may be made of a single piece or may comprise multiple parts or layers, and they may be made from materials having different strength or thoughness properties and modulus of elasticity. For instance, the first coupling element may have a mechanical property different from that of the second coupling element.

Also of advantage are embodiments in which the proportion of the coupling parts engageable in a positive lock is between 30% and 100%, and engageable in a friction lock is between 70% and 0%, whereby a form-lock is obtained in at least certain regions where the coupling elements engage, whereas a form-locking and friction-locking drive connection is obtained in the other regions.

Finally, it is useful if the coupling part has a surface profile with peaks and valleys regularly or irregularly distributed across a bearing surface on the belt-type drive element and workpiece holder or a support body of the first and second coupling elements, which are elastically deformable and reversible in three spatial directions. The workpiece holder and the drive element cause a conformation of the profiled surface of at least one coupling element when at least two peaks come into contact or impact on each other and the coupling elements are drivingly linked in a positive and friction lock. This is of advantage because the coupling elements are designed to be elastically flexible and reversible, even in situations involving different pitch distances and/or a different number of coupling elements, and the contact force of the height-adjustable feed mechanism can be predefined, thereby enabling a reliable slip-free driving action.

In order to provide a clearer understanding, the invention will be described in more detail below with reference to examples of embodiments illustrated in the appended drawings.

Of these:

FIG. 1 is a highly simplified, schematic diagram showing a plan view of a production line proposed by the invention with a plurality of conveyor sections disposed immediately one after the other;

FIG. 2 is a highly simplified, schematic diagram of the production system, seen from a side view;

FIG. 3 is a highly simplified, schematic diagram showing a side view of a conveyor section proposed by the invention, as well as a node station with a workpiece holder disposed in this section and a guide track disposed in a raised engaging position, viewed along line III—III indicated in FIG. 1;

FIG. 4 is a highly simplified, schematic diagram showing a side view of the conveyor section and the node station with the workpiece holder disposed in this section and the guide track in a raised engaging position, viewed along line IV—IV indicated in FIG. 1;

FIG. 21 is a highly simplified, schematic diagram showing a workpiece holder from underneath;

FIG. 22 is a highly simplified, schematic diagram showing a side view, in partial section, of a part-region of the workpiece holder illustrated in FIG. 21 with a different embodiment of a drive means for effecting a forward feed motion;

FIG. 23 is a highly simplified, schematic diagram showing a side view of a part-region of a drive element with a clutch element;

FIG. 24 is a highly simplified, schematic diagram showing a side view of a part-region of two conveyor sections with the workpiece holder disposed therein;

FIG. 25 is a highly simplified, schematic diagram on a very enlarged scale, illustrating a part-region of the workpiece holder and the forward feed mechanism, in vertical section, with a different embodiment of the coupling elements proposed by the invention in a disengaged position;

FIG. 26 is a highly simplified, schematic diagram on a very enlarged scale showing a part-region of the workpiece holder and the forward feed mechanism, in vertical section, with the coupling elements proposed by the invention in an engaged position;

FIG. 27 is a highly simplified, schematic diagram on a very enlarged scale, showing a part-region of the workpiece holder and the forward feed mechanism, in vertical section, with a different embodiment of the coupling elements in the disengaged position;

FIG. 28 is a highly simplified, schematic diagram on a very enlarged scale, showing a part-region of the workpiece holder and the forward feed mechanism, in vertical section, with the coupling elements proposed by the invention in the engaged position.

Figure 5:
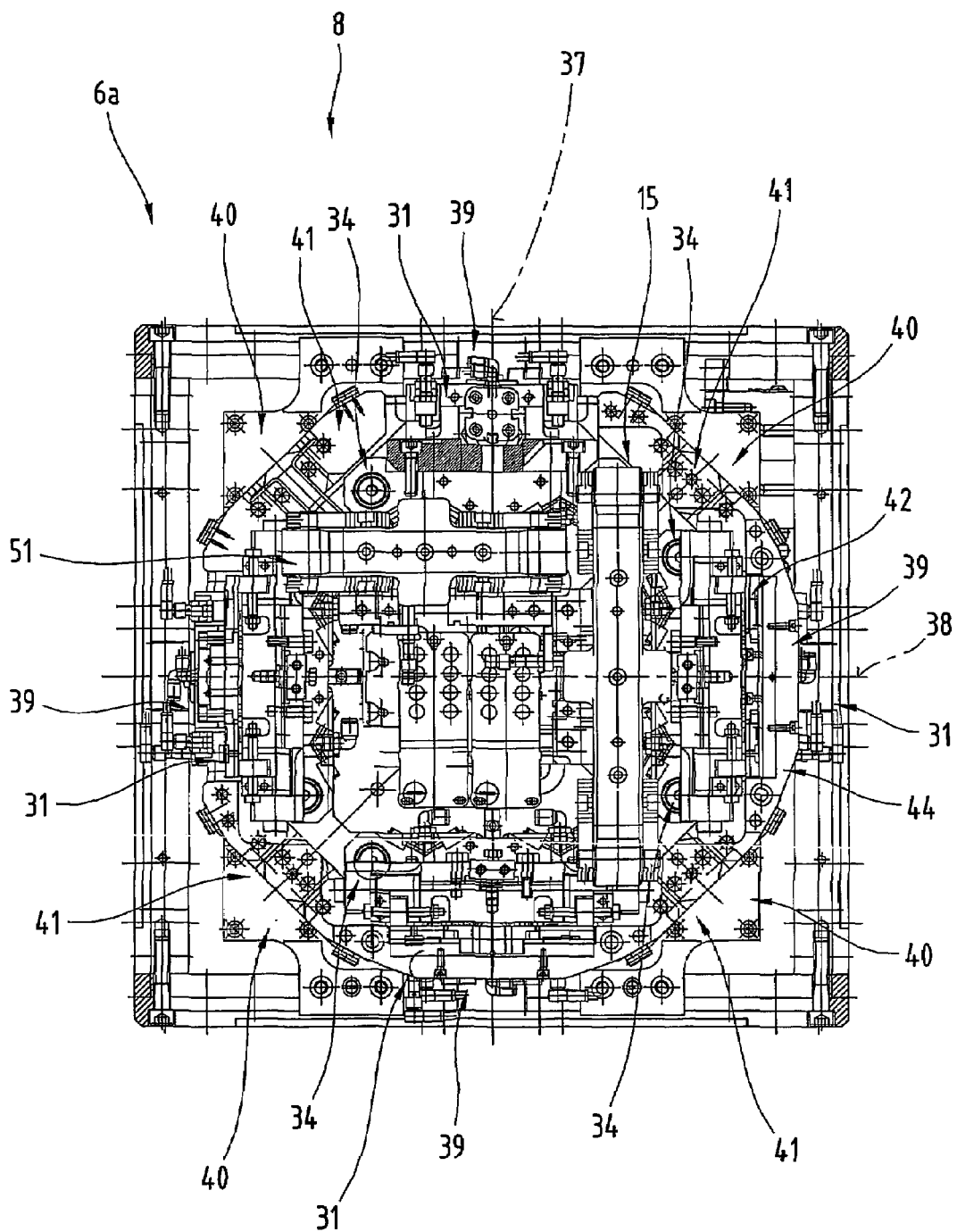
FIG. 5 is a highly simplified, schematic diagram showing a plan view of the conveyor section and the node station with a raised apron, viewed in section along line V—V indicated in FIG. 4.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIGS. 1 to 5, which will be described together, illustrate a plan view and a side view of a production line 1 for processing and assembling components 3 disposed on workpiece holders 2. These components 3 are delivered in the form of a plurality of individual parts which are fed in containers or sets of pallets, to delivery systems etc., in readiness for assembly. A production line 1 of this type might comprise at least one work station 4, for example. The handling, joining and/or processing procedures, etc., are taken care of by a manipulator or an operator at the work station 4. The production plant 1 is made up of a plurality of conveyor sections 5, 6a, 6b, 6c arranged immediately one after the other and linked to one another, of which conveyor section 5 incorporates transport stations 7 and conveyor sections 6a, 6b, 6c constitute node stations 8. A machine frame 9 has height-adjustable support elements 11 supported on a mounting surface 10, to which a base frame 12 of the conveyor sections 6a, 6b, 6c, in particular the node stations 8, is detachably affixed. The support elements 11 and the conveyor sections 5, 6a, 6b, 6c are expediently made from elongate sections and the support elements 11 are fitted with a height adjusting mechanism incorporating a screw-thread arrangement on a free end region directed towards the mounting surface 10. The conveyor section 6a; 6b; 6c, in particular the node station 8, is disposed in a region where at least two of the conveyor sections 5, in particular transport stations 7, intersect with one another.

As illustrated in FIG. 1, the production plant 1 proposed by the invention may have one or more linear main conveyor runs 13 expediently extending parallel with one another and/or one or more transverse conveyor runs 14 intersecting with them, in which intersecting mutually parallel main conveyor runs 13 and/or transverse conveyor runs 14 serve as holding conveyor runs and/or return conveyor runs, thereby permitting a multiple circulation of the workpiece holders 2 and an uninterrupted production sequence.

The individual conveyor sections 5, 6a, 6b, 6c are linked to one another so that they can be released if necessary by means of positioning and fixing elements known from the prior art, such as adjusting pins, centring pins, pneumatically or hydraulically operable coupling elements, etc. and screw connections. This enables one or more conveyor sections 5, 6a, 6b, 6c to be inter-changed at any time. Naturally, all elements known from the prior art may be used as positioning and coupling or fixing elements.

Each of the conveyor sections 5, 6a, 6b, 6c has at least one displaceable forward feed mechanism 15 for moving the workpiece holder or holders 2 along in the feed direction— indicated by arrow 16. The forward feed mechanism 15 of the conveyor sections 5 and transport stations 7 has pulley blocks around which at least one endless drive element 17 circulates, which extends through a cutout piece of an apron 18. In terms of its length and width dimension, the forward feed mechanism 15 is at least slightly smaller than a length and width dimension of the conveyor sections 5, 6a, 6b, 6c. The apron 18 of the conveyor sections 5, 6a, 6b, 6c, which can be detachably secured to the machine frame 9 of the production line 1, extends between support the elements 11 spaced apart from one another in the lengthways and widthways direction and forms a transport plane 19 extending substantially parallel with the mounting surface 10. Extending plane-parallel with the transport plane 19 and in the direction extending transversely to the feed direction— indicated by arrow 16—are mutually spaced, parallel guide tracks 20 and the guide rails 21 forming them, between or along which the workpiece holders 2 can be displaced and are forcibly guided in the direction substantially perpendicular to and parallel with the transport plane 19. The mutually parallel guide tracks 20 spaced at a distance apart from one another, in particular the guide rails 21, form height and lateral guide mechanisms for the workpiece holders 2 holding the components 3. The guide tracks 20 may be provided in the form of hard metal strips, ceramic strips, etc. They are designed so as to be stationary in the transport stations 7 and displaceable in the node stations 8 so that positioning in the transport stations is deliberately less accurate than in the node stations at which the workpiece holder 2 is transferred and/or than at node stations 8 where high positioning accuracy is required. The workpiece holder 2 is essentially guided in the node stations 8 without any clearance.

The rectangular base frame 12 and the apron 18 of the conveyor section 5 and the transport station 7 mounted on it is longer in length 22 than in width 23. A base frame 24 of the conveyor sections 6a, 6b, 6c and the node station 8 and a bottom frame part 25 and top frame part 26 forming the latter are purposely of the same length 27 as width 28. The apron 18, which is preferably square in shape, forming the transport plane 19 is placed on the top frame part 26.

As may also be seen from FIG. 1, one of the conveyor sections 6 and node stations 8 has a recess 30 accommodating a circular rotary table 29, which is positioned and/or rotatable in cycles about a mid-axis extending in the direction perpendicular to the transport plane 19. The transport planes 19 of the aprons 18 of the conveyor sections 5 and transport stations 7 and the conveyor sections 6a, 6b, 6c and node stations 8 extend in the same plane and therefore form a flat conveyor track or transport plane 19 for the workpiece holders 2.

As may also be seen from FIG. 1, the production line 1 has several conveyor sections 6a, 6b, 6c, in particular node stations 8, with different functions, one of the conveyor sections, for example 6a, transferring the workpiece holder 2 disposed in the region of the transverse conveyor run 14 in alignment or congruently in the main conveyor run 13, which expediently extends at an angle of 90° offset from the transverse conveyor run 14. The relative position of the workpiece holder 2 carrying the component or components 3 therefore remains congruent with the work station 4, as indicated by dotted-dashed lines.

In another embodiment, the workpiece holder 2 in the region of the main conveyor run 13 is transferred via conveyor section 6b, in particular the node station 8, into a different position in the transverse conveyor run 14 relative to the main conveyor run 13. The workpiece holder 2 receiving the components 3, whose position is changed relative to the main conveyor run 13 or transverse conveyor run, is fed to the transverse conveyor run 14 in a shifted position, rotated by 90°, 180°, 270°, for example, as indicated by broken lines.

Another embodiment combines a process of transferring the workpiece holder 2 between the main conveyor run 13 and the transverse conveyor run 14 in the same position and/or in the shifted position. The structure of a conveyor section 6c of this type, in particular the node station 8, will be described in more detail below. At least one of the guide tracks 20 in the conveyor sections 6a, 6b is expediently designed so that it can be displaced in at least one, but preferably several spatial directions synchronously and in the same direction.

Although not illustrated, it would also be possible to arrange several transport stations 7 immediately one after the other to form a unit with a forward feed mechanism 15, which will extend essentially across an entire length thereof.

FIGS. 3 to 5, which will be described together, illustrate an embodiment of the conveyor sections 6a, in particular the node station 8, which enables the workpiece holder 2 to be transferred from a transverse conveyor run 14 into the main conveyor run 13 or from the main conveyor run 13 into the transverse conveyor run 14 in the same position, illustrated in various aspects and sections. The node station 8 proposed by the invention comprises the base frame 24 made up of the bottom and top frame parts 25, 26, between which side walls extend and bound at least certain regions of a support frame 32 bearing at least one, in particular several adjusting mechanisms 31. The substantially square base frame 24 of the node station 8 receiving the support frame 32, which forms a separate unit, has substantially rectangular access orifices in the region of the side walls to facilitate assembly or maintenance, etc. The modular support frame 32 has a polygonal, in particular octagonal support plate 33 extending parallel with the transport plane 19, which is detachably affixed to the bottom frame part 25 of the base frame 24, and guide elements 34, in particular guide bars 35, disposed perpendicular thereto.

The support frame 32 in conjunction with the adjusting mechanisms 31 form a removable structural unit 36 which can be connected to the base frame 24 and taken out of the base frame 24 as a unit to permit maintenance work, and can be replaced by another ready-to-use unit 36 which can be fitted in the base frame 24 very rapidly. This reduces to a minimum costly downtimes which might otherwise be incurred by maintenance and repair work.

A first mid-axis 37 extends parallel with and between the oppositely lying guide tracks 20 or guide rails 21 of the transverse conveyor run 14 whilst another mid-axis 38, perpendicular thereto, extends on and parallel with the oppositely lying conveyor tracks 20 and conveyor rails 21 of the main conveyor run 13. The side regions 39, spaced at a distance apart from a common intersection point of the two mid-axes 37 and 38 and running parallel with them, are bounded by lateral intermediate regions 40 diagonally offset from the midaxes 37, 38 and extending parallel with one another.

Provided in the outer peripheral region of the lateral intermediate regions 40 of the support plate 33 are essentially strip-shaped support elements 41 extending from the support plate 33 in the direction of the apron 18, which are connected to the support plate 33 by means of releasable fixing means. In an end region of the support elements 41 remote from the support plate 33, a clearance compensating device 44 co-operating with an operating and/or locking mechanism 42 of the adjusting mechanism 31 extends in a direction parallel with the mid-axes 37, 38 between two adjacent support elements 41. Each adjusting mechanism 31, in particular of a height adjusting mechanism 43, co-operates with at least one clearance compensating device 44, in order to compensate for the clearance between the workpiece holder 2 and the guide tracks 20 and guide rails 21 and to compensate for manufacturing tolerances. The exact structure and operating mode of the clearance compensating device 44 will be described in more detail with reference to FIGS. 15 and 16.

At least two drive elements 47 endlessly circulating by means of a drive system 45 with an inter-connected gear mechanism 46 are provided in the conveyor section 6a, in particular the node station 8, in order to feed the workpiece holder 2 forward. The drive system 45 is connected by releasable fixing means directly to the base frame 24, expediently to the bottom frame part 25. The gear mechanism 46, comprising one input drive part 48 and several output parts 49, 50, expediently drives the circulating belt-type drive elements 47 constituting the forward feed mechanisms 15; 51 at the same circumferential speed, depending on the technical specifications set for the feed rate. One of the forward feed mechanisms 15; 51, which is synchronously driven and adjustable, in particular height-adjustable, by means of an actuator element, in particular a pneumatic cylinder, hydraulic cylinder etc., is disposed in a lowered position when the workpiece holder 2 is being transported into the conveyor section 6a, so that the toothing of one drive element 47 only, in particular a notched belt, is always in engagement with the matching toothing of the workpiece holder 2.

The adjustable, forward feed mechanisms 15, 51 of the conveyor sections 6a, which in particular can be raised, each extend parallel with the feed direction—indicated by arrow 16—of the main conveyor run 13 and transverse conveyor run 14. As illustrated in the embodiment shown as an example here, the main conveyor run 13 and the transverse conveyor run 14, and hence also the forward feed mechanisms 15 and 51, are oriented perpendicular to one another. The forward feed mechanisms 15, 51 have several pulley blocks 52 and at least one drive roller 53 in order to change the direction of the endless drive elements 47. The notched belt is provided with toothing both on the side directed towards the pulley blocks 52 and drive rollers 53 and on the side remote therefrom. In order to accommodate the forward feed mechanisms 15, 51, the apron 18 has slot-shaped cutouts 54 disposed parallel with the feed direction—indicated by arrow 16—of the main conveyor run 13 and transverse conveyor run 14, through which the forward feed mechanisms 15, 51, in particular the drive elements 47, project or extend.

To provide a driving connection between the workpiece holder 2 and the forward feed mechanism 15; 51, one of the two forward feed mechanisms 15; 51 is either raised into a position projecting above the transport plane 19 or is lowered into a position below the transport plane 19. For example, it might be that in a base position, the forward feed mechanisms 15, 51 project above the transport plane 19 and one of the two forward feed mechanisms 15; 51 is lowered when a control signal is triggered by the workpiece holder 2. In another possible alternative, both forward feed mechanisms 15, 51 might be below the transport plane 19 in the base position and one of the two forward feed mechanisms 15; 51 is raised when a control signal is triggered by the workpiece holder 2, and when driving means of the workpiece holder 2, which will be described in more detail below, have engaged with the drive element 47, the workpiece holder 2 is moved along in a linear fashion. It should be pointed out at this stage that, for practical purposes, the forward feed mechanisms 15 always project above the transport plane 19 in the region of the transport stations 7. Consequently, no additional adjusting elements are needed in order to raise the forward feed mechanisms 15.

The drive system 45, the gear mechanism 46 and the forward feed mechanisms 15, 51 are generally known from the prior art. The drive system 45 may naturally incorporate all electrical, pneumatic, hydraulic drives known from the prior art, in particular electric motors, pivot drives, etc. If electric drives are used, it will be of advantage if these are primarily standardised motors, such as asynchronous motors, stepper motors, servo-motors, for example.

A gear housing 55 of the gear mechanism 46 is disposed in a recess 56 in the support plate 33, through which the drive part 48 extends and is detachably affixed thereto by fixing means. The gear mechanism 46 is disposed between the respective oppositely lying adjusting mechanisms 31 arranged symmetrically about the mid-axes 37, 38, which helps to keep the overall size of the conveyor section 6a or node station 8 down. A mid-axis 57 of the drive system 45 extends flush with a mid-axis 58 of the drive shaft of the gear mechanism 46. On a side face of the gear housing 55 of the gear mechanism 46 lying opposite the drive part 48 is an electric and/or pneumatic or hydraulic control module 59, which is connected in a controlling relationship via one or more connecting lines 60 to a central electrical and/or pneumatic and/or hydraulic supply unit 61.

In order to change the adjusting motion or displacement path of the oppositely lying, simultaneously adjustable guide tracks 20 and guide rails 21 extending in the direction perpendicular to the transport plane 19, if necessary, at least one height restricting device 63 co-operates with support members 62 of the adjusting mechanisms 31 and height adjusting mechanisms. The height restricting device 63 is integrated in or mounted on the apron 18 and a bottom face remote from the transport plane 19 has at least one stop element 64 disposed in a recess, which is length-adjustable or slidable in the direction of its longitudinal extension in a bore projecting from the transport plane 19 in the direction of the bottom face, and limits the adjusted position of the oppositely lying guide rails 21 as a result of the stop surfaces 65 formed by the support members 62. The stop element 64 is held fixed in its set relative position. The height restricting device 63 can be adjusted by means of remotely controllable actuator elements, permitting a freely settable height adjustment in the direction perpendicular to the transport plane 19, so that the node station 8 is designed to operate as a lifting station, e.g. for making seams. During the height adjustment, the height of the forward feed mechanism 15; 51 is adjusted and the workpiece holder 2 is always drivingly linked to the forward feed mechanism 15; 51 controlling the positioning of the workpiece holder 2.

Figure 6:
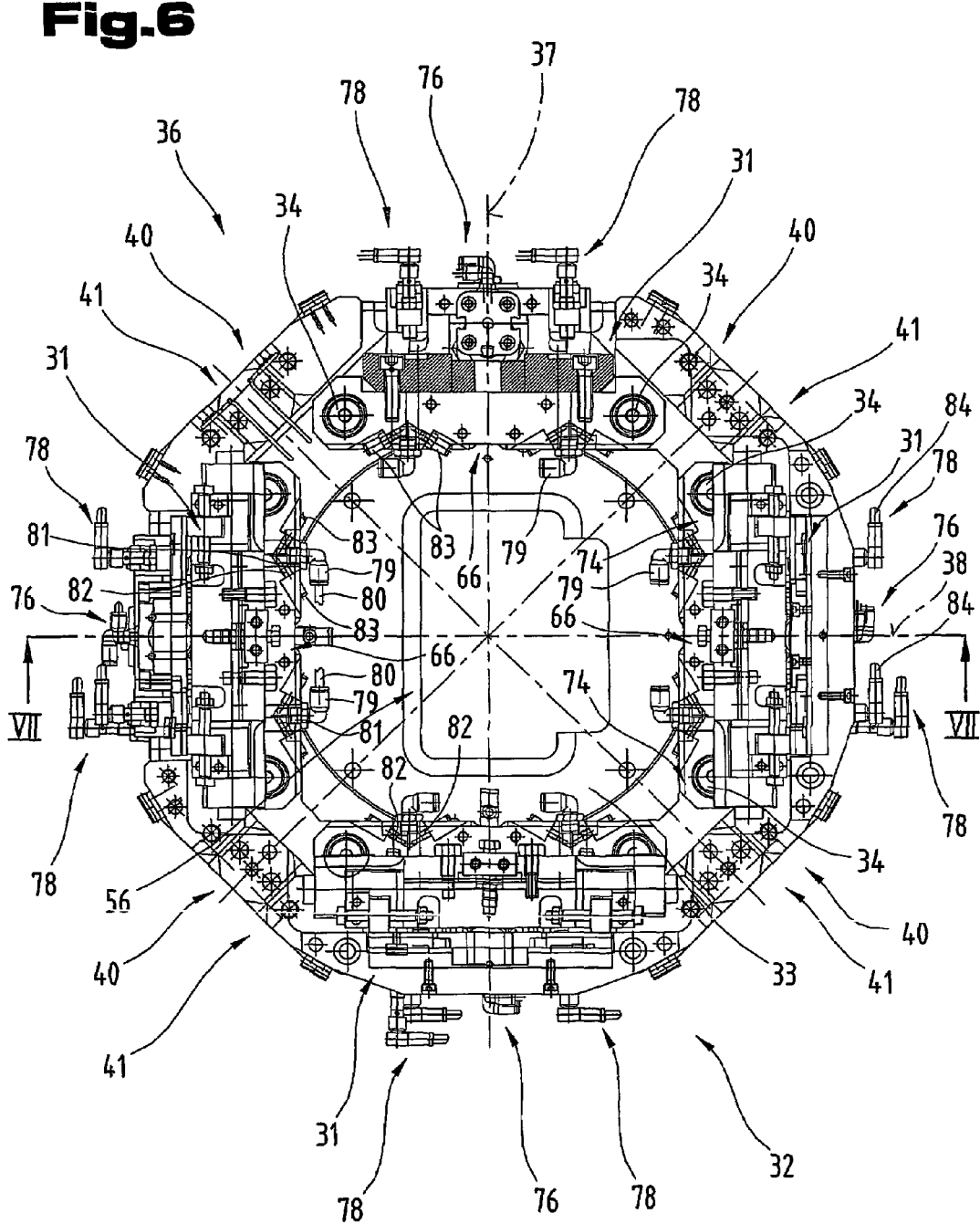
FIG. 6 is a highly simplified, schematic diagram showing a plan view of the unit incorporating the support frame and the displacement mechanisms to be mounted in the conveyor section and at the node station.
Figure 7:
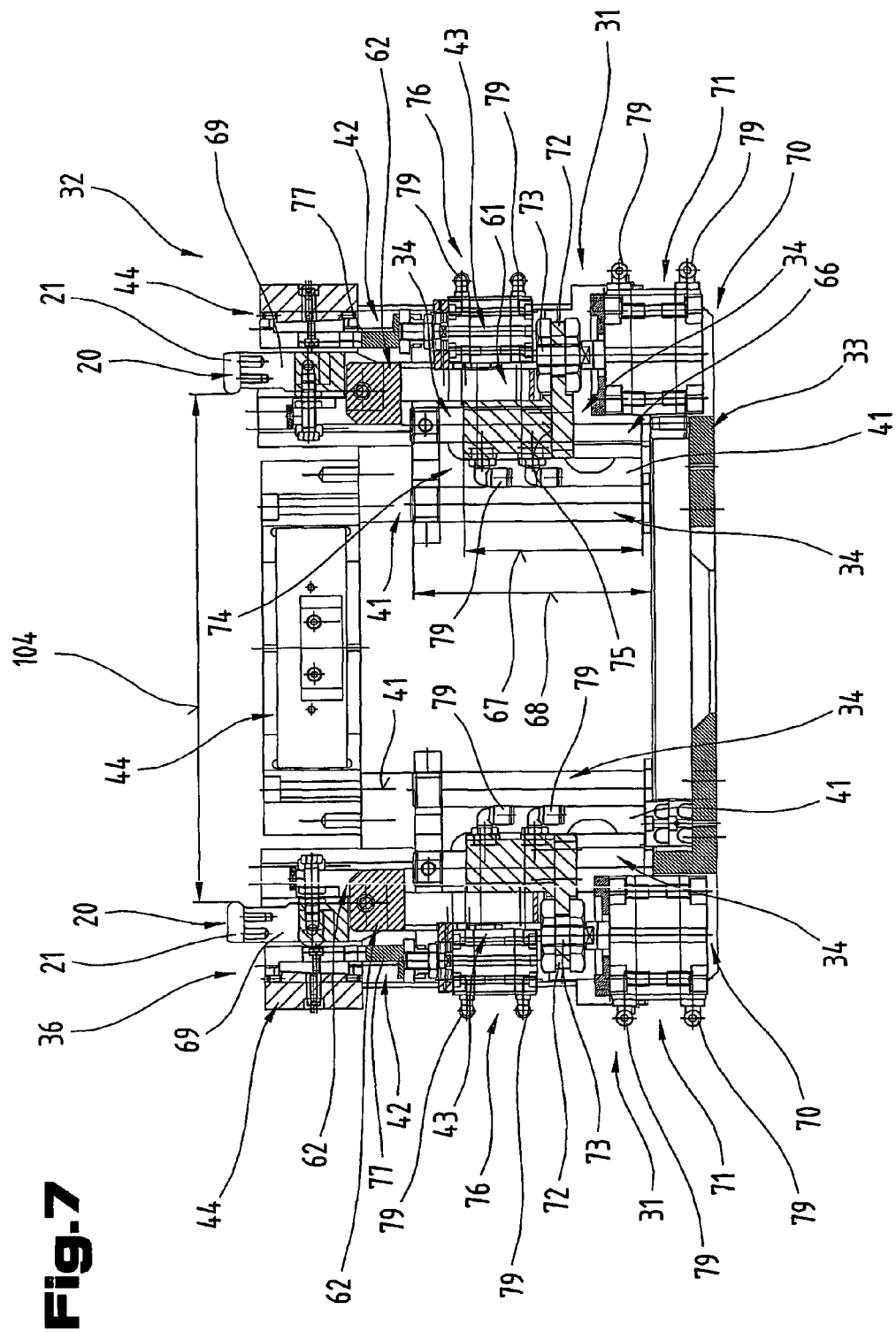
FIG. 7 is a highly simplified, schematic diagram showing a side view of the unit incorporating the support frame and the adjusting mechanisms, viewed in section along line VII—VII indicated in FIG. 6.
Figure 8:
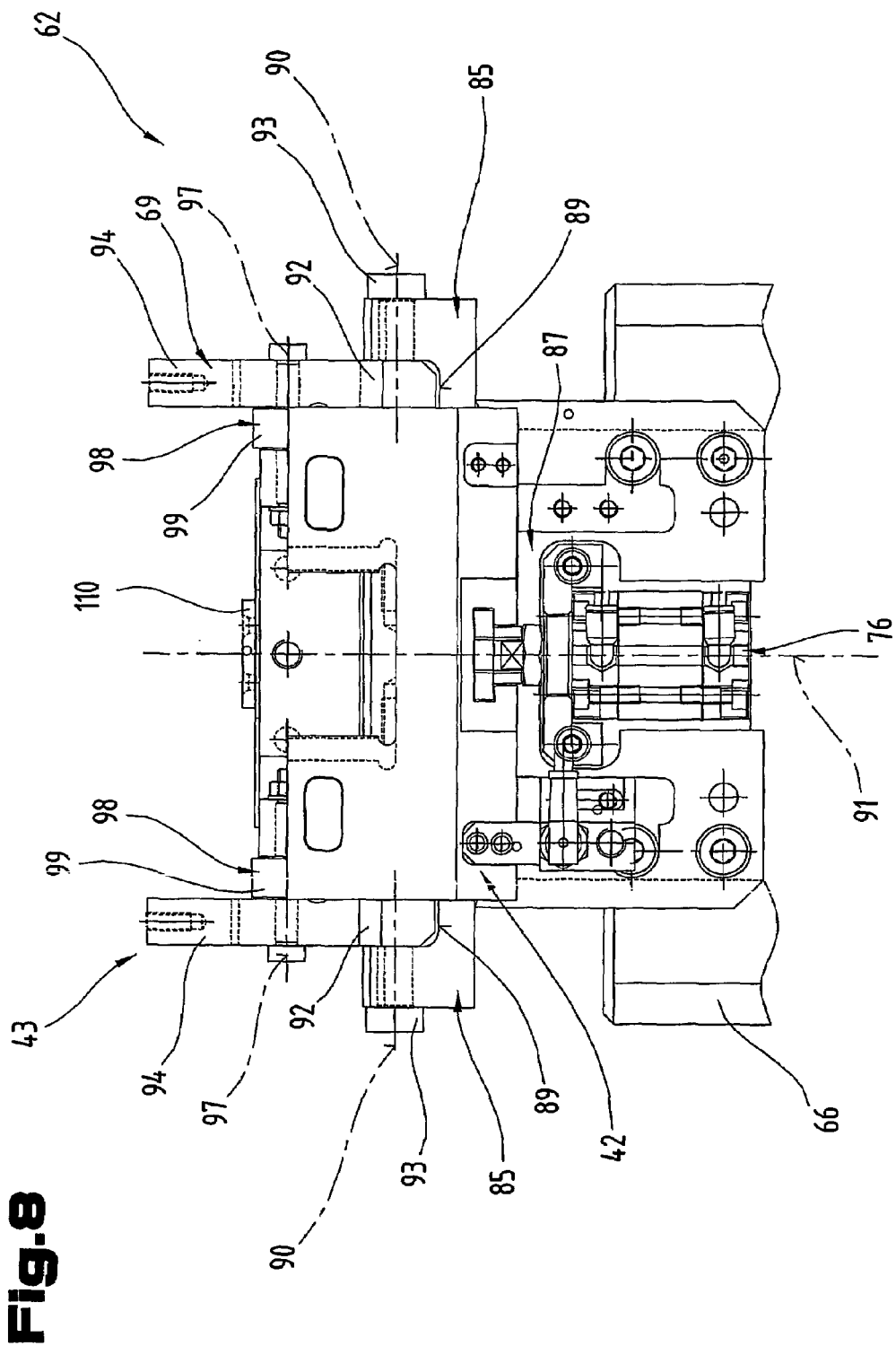
FIG. 8 is a highly simplified, schematic diagram showing an end-on view of the height adjusting mechanism proposed by the invention with a co-operating operating and/or locking mechanism.
Figure 9:
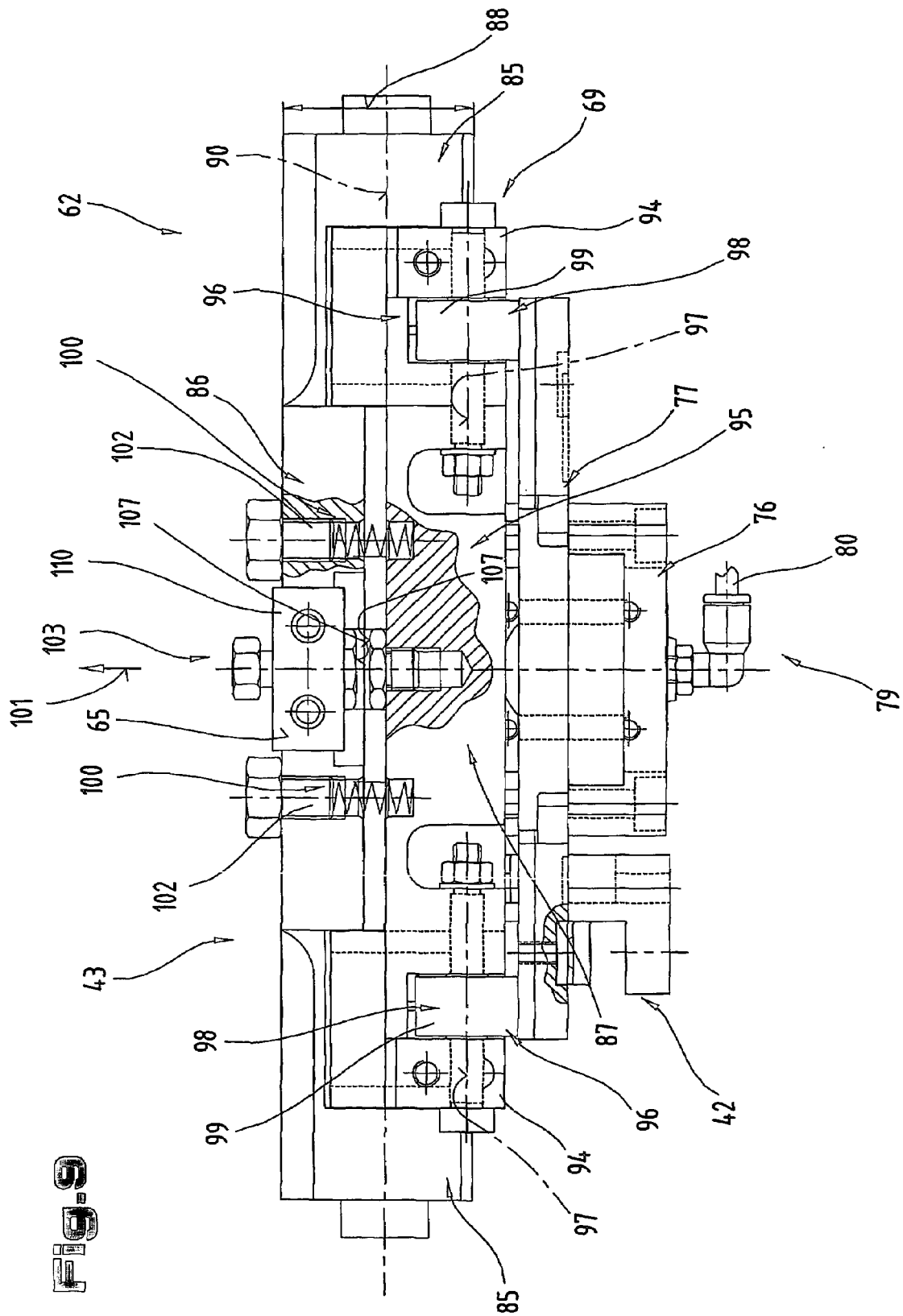
FIG. 9 is a highly simplified, schematic diagram showing a plan view of the height adjusting mechanism and operating and/or locking mechanism.

FIGS. 6 and 7, which will be described together, illustrate the unit 36 incorporating the support frame 32 and the adjusting mechanisms 31 from different perspectives and in partial section. As mentioned above, the support plate 33 fitted with the guide elements 34 receiving the adjusting mechanisms 31 is octagonal. Disposed in the peripheral region of the lateral intermediate regions 40 are the support elements 41 disposed perpendicular to the support plate 33, between which the clearance compensating devices 44 extend in the direction parallel with the mid-axes 37 and 38. An more or less prism-shaped guide carriage 66 of the adjusting mechanism 31 extends between the guide elements 34 supported in a longitudinally slidable arrangement, the height 67 of which is at least slightly smaller than a length 68 of the guide elements 34 plus the adjustment path of the guide rails 21. The approximately cruciform support element 62 mounted on the guide carriage 66, which is substantially U-shaped in longitudinal cross section, is connected to the latter by means of releasable fixing means, in particular screws, bolts, etc., the support body 62 of which has an actuator lever 69 and co-operates with at least one operating and/or locking mechanism 42. The height adjusting mechanism 43 of the adjusting mechanism 31 comprises the guide carriage 66 and the support element 62 mounted on it, the latter co-operating with the operating and/or locking mechanism 42.

In the side regions 39, the support plate 33 has recesses 70 respectively directed towards one another and extending across a part of the side regions 39, which are designed to receive actuator drives 71 in order to make a height adjustment of the guide tracks 20 and guide rails 21 in the direction perpendicular to the transport plane 19. The actuator drives 71, which are expediently operated by pressurising medium, and the linear drives forming them, which might be pneumatic cylinders, hydraulic cylinders or electric actuator drives 71, such as electric linear drives, etc., are fixedly connected to the support plate 33 by releasable fixing means. The actuator drives 71 are expediently arranged offset from the guide elements 34 bearing the guide carriages 66 in the direction of the peripheral region of the support plate 33. A substantially plate-shaped support plate 72 is disposed between the guide carriage 66 and the actuator drive 71 extending in the direction parallel with the transport plane 19 (not illustrated) for transmitting an adjusting motion of the actuator drive 71 to the guide track 20 and the guide rail 21, the first end region of which is linked to a free end of a piston rod 73 of the actuator drive 71, on which the other end region of which facing the guide carriage 66 the guide carriage is placed and supported. To this end, the guide carriage 66 with a substantially U-shaped cross section has a support surface 75 extending parallel with the transport plane 19 between guide part regions 74, which overlaps with the support plate 72, at least in certain regions.

As may be seen more clearly from FIG. 7, the operating and/or locking mechanism 42 is mounted on the support element 62, so that the height adjusting mechanism 43, comprising the guide carriage 66 and the support element 62 joined to it, and the operating and/or locking mechanisms 42 are adjusted or raised or lowered when the actuator drive 71 effects an adjusting motion in the direction perpendicular to the transport plane 19. The adjusting mechanism 31 incorporates the guide carriage 66, the support element 62 and the operating and/or locking mechanism 42, each component forming a separate module which can be releasably connected to another module and positioned relative to one another. Another actuator drive 76 of the operating and/or locking mechanism is arranged directly on the support element 62 and offset from the actuator drive 71 and, like the actuator drive 71 is provided in the form of a pneumatic cylinder, hydraulic cylinder or electric linear drive, etc., for example. The operating and/or locking mechanism 42, which has an operating element 77, is arranged between the clearance compensating device 44 and the actuator lever 69 of the support element 62 and is designed so that it can be at least slightly displaced in the direction parallel with the transport plane 19 (although this is not illustrated). The substantially U-shaped operating element 77 has an L-shaped cross section.

The actuator drives 71, 76 are provided with interrogation elements 78 and terminal elements 79 known from the prior art as a means of control and for selectively applying pressure to the actuator drives 71 and 76. Like the actuator drives 71, the actuator drives 76 are also operated simultaneously by applying pressure so that the oppositely lying pairs of guide rails 21 are simultaneously moved towards one another in the direction parallel with the transport plane 19.

Two respective oppositely lying adjusting mechanisms 31 receiving the guide rails 21 are operated simultaneously, at least shortly before the workpiece holder 2 enters the conveyor section 6a or node station 8, by means of the actuator drives 71 co-operating with the height adjusting mechanisms 43 of the adjusting mechanisms 31, in particular by applying pressure. Each of the guide carriages 66 has several, in particular two, separate connecting elements 79 for pressurising and venting the actuator drives 71 and a connecting line 80 providing a link to the central pneumatic supply unit 61, and the pressurising medium is distributed to distribution passages 82 by means of flow passages 81 disposed in the guide carriage 66. For this application, it is expedient to use two distribution passages 82 and one flow passage 81. To provide a flow connection for the respective oppositely lying actuator drives 71 of the oppositely lying adjusting mechanisms 31, the distribution passages 82 have a flow connection to one each of the connecting elements 79 for venting and pressurising the actuator drives 71 via an interconnected other connecting element 83 and a connecting line 84.

By connecting two pressurisable actuator drives 71 in a substantially parallel arrangement, it is now essentially possible simultaneously to raise or lower the guide rails 21, which are disposed in a mutually parallel arrangement spaced at a distance apart from one another transversely to the feed direction—indicated by arrow 16—by applying pressure to the actuator drives 71. The other connecting element 79 disposed on the guide carriage 66 also has a flow connection to the distribution passages 82 via a flow passage 81, and in turn also supplies the oppositely lying actuator drives 71 of the adjusting mechanisms 31.

The connecting elements 79 for pressurising and venting the individual adjusting mechanisms 31 have an inter-communicating flow connection and each is connected via a central connecting line 80 (not illustrated) via interconnecting switch and/or control valves, not illustrated, such as 4/2-way valves, 5/3-way valves etc., for example, to the central electric and/or pneumatic or hydraulic supply unit 61 (not illustrated).

In order to apply pressurising medium to the actuator drives 7, they are also connected via connecting lines 80 and inter-connected via switch valves, not illustrated, linking them to the supply unit 61. A control connection of this type and the structure of the individual components, such as switch valves, actuator drives 71, 76 etc., for example, are generally known from the prior art.

To provide a clearer understanding, the height adjusting mechanism 43 and the operating and/or locking mechanism 42 of the adjusting mechanism 31 are illustrated in more detail in different views in FIGS. 8 to 12, in which the same reference numbers are used to denote the same parts, and the disclosures made in respect of same parts and same reference numbers and same component names may be transposed to these drawings.

The substantially cruciform support element 62 mounted on the guide carriage 66 or detachably connected to it has laterally protruding projections 85 in its longitudinal extension and a projection 86 extending in the longitudinal direction of the support element 62. Provided between a middle web 87 and the oppositely lying projections 85 is at least one approximately U-shaped recess extending across a part of a thickness 88 of the support element 623 forming a pivot mounting 89, in which at least a part of a fork-shaped actuator lever 69 of the height adjusting mechanism 43 extends. Two pivot mounts 89 are expediently disposed at a distance apart from one another. The U-shaped actuator lever 69 with a substantially L-shaped cross section is designed to be displaced or pivot about a pivot axis 90 extending parallel with the transport plane 19 and in an axis extending transversely to the longitudinal extension thereof. A longitudinal mid-axis 91 of the height adjusting mechanism 43 extends parallel with the guide elements 34, which are not illustrated in this drawing, and perpendicular to the transport plane 19. Shorter legs 92 of the substantially L-shaped actuator lever 69 co-operate with the pivot mounts 89 and are mounted so as to be displaced in a pivoting motion by means of at least one bearing element 93 extending through a bore in the leg 92. The bearing elements 93 may be provided in the form of threaded bolts, etc., for example.

Expediently provided in the region of the oppositely lying pivot mounts 89 is a leg 94 oriented substantially perpendicular to the legs 92 and projecting in the direction of an apron 18, not illustrated in this drawing, by means of which the replaceable guide rails 21 are positioned and connected. The guide rails 21 may be detachably fixed using any fixing means known from the prior art, such as screws, etc. In order to fix the guide rail 21 of the actuator lever 69, substantially U-shaped recesses 96 are provided between a middle web 95 and the oppositely lying legs 94 for receiving bearing elements 98 mounted so as to pivot about a pivot axis 97. The bearing elements 98 are preferably provided in the form of roller bearings 99, in particular grooved ball bearings.

Disposed between the support element 62, in particular the projection 86, and the actuator lever 69 is at least one, in particular several elastic return elements 100, which counteract any movement—indicated by arrow 101—towards the workpiece holder 2. The return elements 100 may be elastically flexible spring elements of any type known from the prior art, such as for example compression springs, plate springs, etc. The return elements 100 are accommodated and positioned by means of bolt elements 102 with a screw thread arrangement. Consequently, the effective spring length of the return elements 100 can be varied as required. The support element 62, in particular the projection 86, has at least one stop and clearance compensating device 103, which limits a displacement path of the actuator lever 69 and hence a clearance width 104 as measured parallel with the transport plane 19—indicated in FIG. 7—between two oppositely lying extracted guide tracks 23 and guide rails 21.

Every adjusting mechanism 31 is expediently provided with a stop and clearance compensating device 103 of this type 103. As a result, the clearance width 104 between the guide rails 21 and if necessary any manufacturing tolerances of a guide mechanism 105 and the guide rollers 106 and/or guide tracks 20 incorporated in it can now be compensated on the one hand, whilst on the other hand, the guide rails 21 can be oriented or adjusted relative to the guide rails 21 disposed on the conveyor sections 5 or transport stations 7 so that they are arranged flush with one another in the longitudinal direction. In the most basic situation, the stop and clearance compensating device 103 may be provided in the form of at least one screw-thread arrangement in the region of the projection 86 and the middle web 95 of the actuator lever 69. The displacement path restricted by the stop surfaces 107 in the direction parallel with the transport plane 19 can be set by varying the screw-in depth of the screw-thread arrangement. As illustrated in this embodiment, the stop surfaces 107 are provided in the form of high-tensile nuts.

Figure 10:
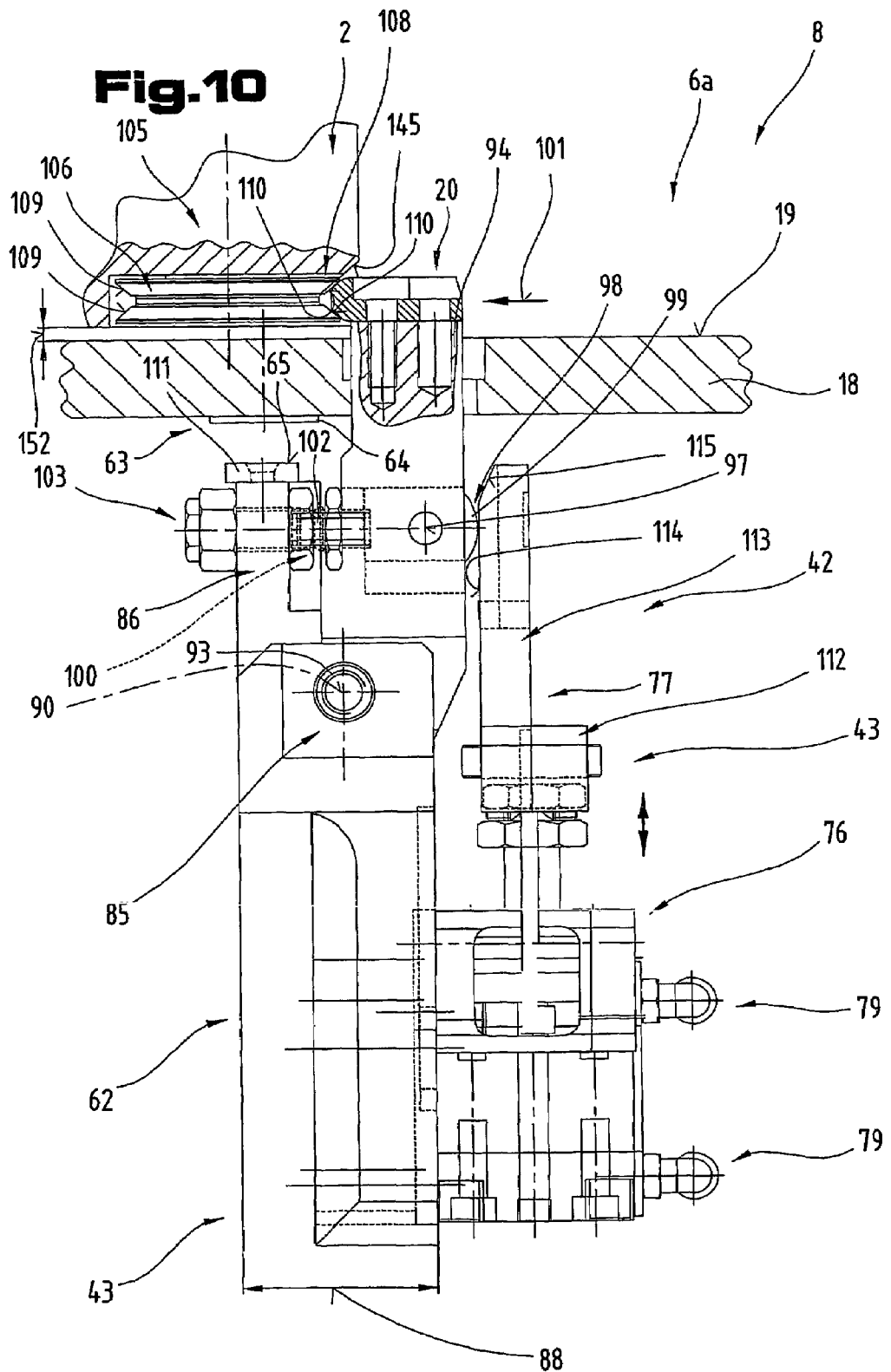
FIG. 10 is a highly simplified, schematic diagram showing a side view in partial section, depicting the height adjusting mechanism and the operating and/or locking mechanism mounted on it, and a part-region of the apron or rotary table and the workpiece holder with the guide element of the workpiece holder and guide track in an engaged position.

The displacement path of the respective oppositely lying adjusting mechanism 31 is selected so that the guide rails 21 and the guide elements 106 of the workpiece holder 2 engage in one another in an essentially positive lock. The friction needed between the guide track 20 and the guide element 106 to move, in particular roll, the guide element 106 relative to the guide track 20 is essentially negligibly small. The guide elements 106 of the workpiece holder 2 have a groove-shaped recess 108 for engaging in the guide tracks 20 spaced at a distance apart from one another transversely to the feed direction—indicated by arrow 16—and at least one guide track 20 in at least one of the conveyor sections 6a; 6c or in the node station 8 can be raised from a non-operating position disposed outside a clearance profile of the workpiece holder 2—illustrated in FIG. 11—into a position above the transport plane 19—illustrated in FIG. 12—by means of a height adjusting mechanism 43 of the adjusting mechanism 31 and is designed so that it can be displaced so as to engage with the recesses 108 of the guide elements 106 transversely to a longitudinal direction of the guide track 20 by means of the operating and/or locking mechanism 42 into an engaged position —as illustrated in FIG. 10. When the guide track 20 engages with at least one guide element 106, the workpiece holder 2 is forcibly guided along the guide tracks 20.

Tapering guide surfaces 109 extending at an angle to one another in the direction of an axis of the guide elements 106 bound the recess 108 of the guide elements 106. The guide tracks 20, which can be moved into engagement with the groove-shaped recesses 108 of the guide elements 106, have guide surfaces 110 matching the recesses 108 in at least certain regions. The guide tracks 20 in the conveyor sections 6a, 6c are displaced simultaneously and in the same direction so as to engage between the inclined guide surfaces 109 of the recesses 108 of the guide elements 106. Naturally, the guide surfaces 110 may also be provided by means of an arc, in particular radii, extending across at least a part of a thickness of the guide tracks 20. A tangent on the turning point of the arc extends parallel with the guide surfaces 109 of the guide elements 106. The groove-shaped recess 108 may have a V-shaped or trapezoidally shaped cross section, etc., in which case the guide rails 21 are disposed at least at a slight distance apart from a groove base of the recess 108 when in the engaged position. The guide surfaces 109 of the recess 108 subtend an angle of between 30° and 120°, preferably between 40° and 90°, for example 60°. The guide elements 106 may be of a single-piece or multi-part structure, part regions of which may be provided with coatings having different properties. This means that vibration damping and/or high tensile materials may be used as a means of extending the range of applications if necessary, for example. The guide elements 106 expediently have congruent guide surfaces 109 extending at the same angle in their cross-sectional shape, in which case the workpiece holder 2 will co-operate with the guide tracks 20, so that it can be guided between and along the latter to produce a self-centring effect.

Although not illustrated, another alternative option is to provide the guide tracks 20 with a groove-shaped recess, into which the guide elements 106 project in an engaged position. The guide elements 106 on the workpiece holder 2 have a complementary or concave cross-sectional shape facing the recess.

As described in respect of the preceding drawings, the node station 8 has at least one height adjusting mechanism 63 incorporating the stop element 64, so that a height adjustment in the direction perpendicular to the transport plane 19 is limited by a plate-shaped restricting element 111 incorporating the stop surface 65. The restricting element 111 is detachably affixed to an end face of the projection 86 of the support element 62 extending parallel with the transport plane 19. The guide tracks 20 of the node station 8 can therefore be oriented flush with the guide tracks 20 of the transport stations 7 in the direction perpendicular to the transport plane 19.

As explained in detail above, the operating and/or locking mechanism 42 mounted on the support element 62 incorporates the actuator drive 76 and the substantially U-shaped operating element 77 with an L-shaped cross section. In order to compensate for any tension which might occur in the operating elements 77, a leg 112 is provided and has a longitudinal slot extending in a direction parallel with the transport plane 19. Another leg 113 of the operating element 77 extending perpendicular to the transport plane 19 is disposed between the actuator lever 69 and the clearance compensating device 44. A side face 114 forming a slide track for the actuator lever 69 extends across at least a part of a height of the leg 113 and is bounded by an oblique surface 115 extending at an angle to the side face 114 in the free end region of the leg 113.

Figure 11:
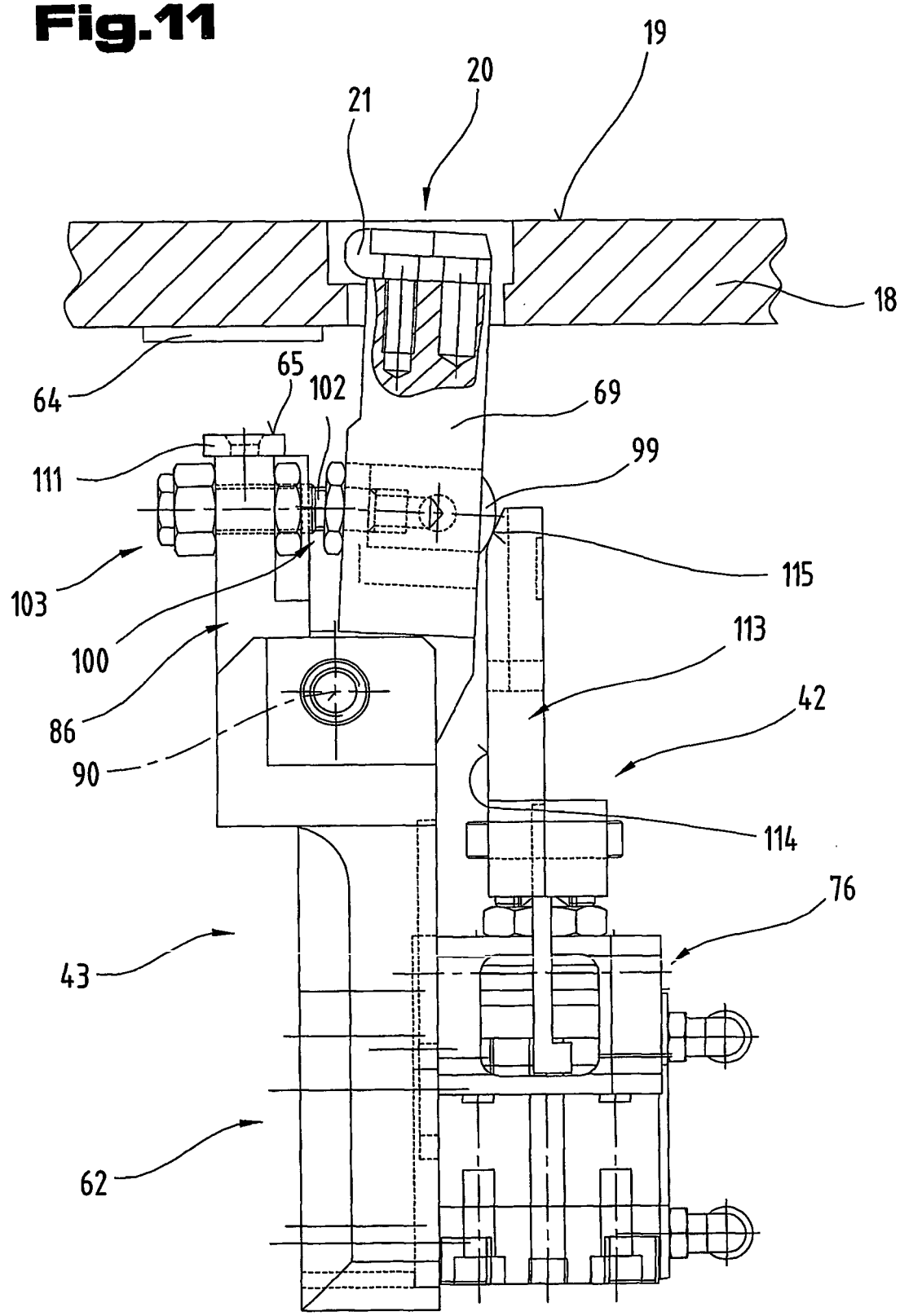
FIG. 11 is a highly simplified, schematic diagram illustrating a side view, in partial section, of the height adjusting mechanism and the operating and/or locking mechanism mounted on it, as well as a part region of the apron or rotary table with a guide track disposed in a non-operating position.
Figure 12:
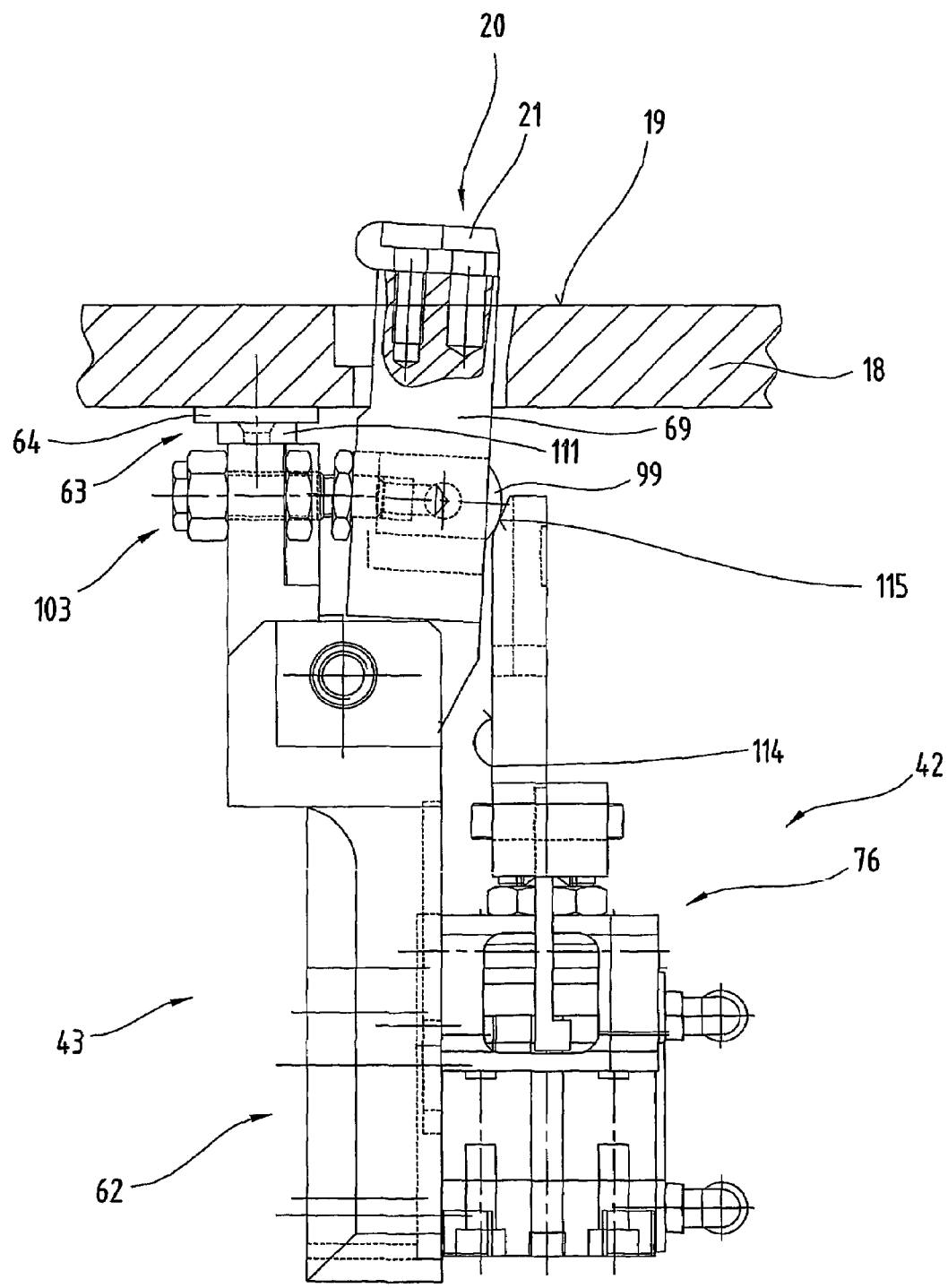
FIG. 12 is a highly simplified, schematic diagram showing a side view, in partial section, of the height adjusting mechanism and the operating and/or locking mechanism mounted on it, as well as a part region of the apron or rotary table, with a guide track in a pre-definable position or intermediate position.

As may be seen in FIGS. 11 and 12, the bearing element 98 and ball bearing 99 projecting alongside the actuator lever 69 are supported in a non-operating position and in an intermediate position or raised position due to the elastic return elements 100 acting on the oblique surface 115 of the operating element 79. FIG. 10 illustrates the guide rail 21 in a displaced engaged position. When the workpiece holder 2 is introduced into the node station 8, a signal is triggered and transmitted to the central control system, which then initiates operation of the two respective oppositely lying adjusting mechanisms 31. The height adjusting mechanisms 43 of the adjusting mechanisms 31 are firstly raised in the direction perpendicular to the transport plane 19, causing the spring-biased actuator lever 69 and the guide rails 21 to be raised at an angle to the transport plane 19 and, once a pre-definable position or intermediate position limited by the height restricting mechanism 63 has been reached, the other actuator drive 76 of the operating and/or locking mechanism 42 is operated and the operating element 77 is displaced in the direction perpendicular to the transport plane 19 and the guide tracks 20 moved synchronously towards one another. As a result of the rolling action of the bearing element 98 or ball bearing 99 along the oblique surface 115 in the direction of the side face 114, the actuator lever 69 is pivoted transversely to the feed direction—indicated by arrow 16—until stop surfaces 107 of the stop and clearance compensating device 103 sit in abutment. The advantage of this solution primarily resides in the fact that the guide rails 21 are moved by the operating element 77 into a first, raised and adjusted engaged position and are releasably secured to prevent them from returning to a lowered non-operating position if necessary. The operating element 77 is not lowered and the bearing element 98 moved to the region of the oblique surface 115 until the actuator drives 76 are operated or pressurised. The mutually parallel height adjusting elements 43 are then switched by operating the actuator drives 71 and lowered simultaneously.

The clearance compensating device 44, which co-operates with a side face lying opposite the side face 114, is able to compensate for any variations in tolerance or friction-induced wear of the bearing element 99 and the operating element 77 which may occur.

Figure 13:
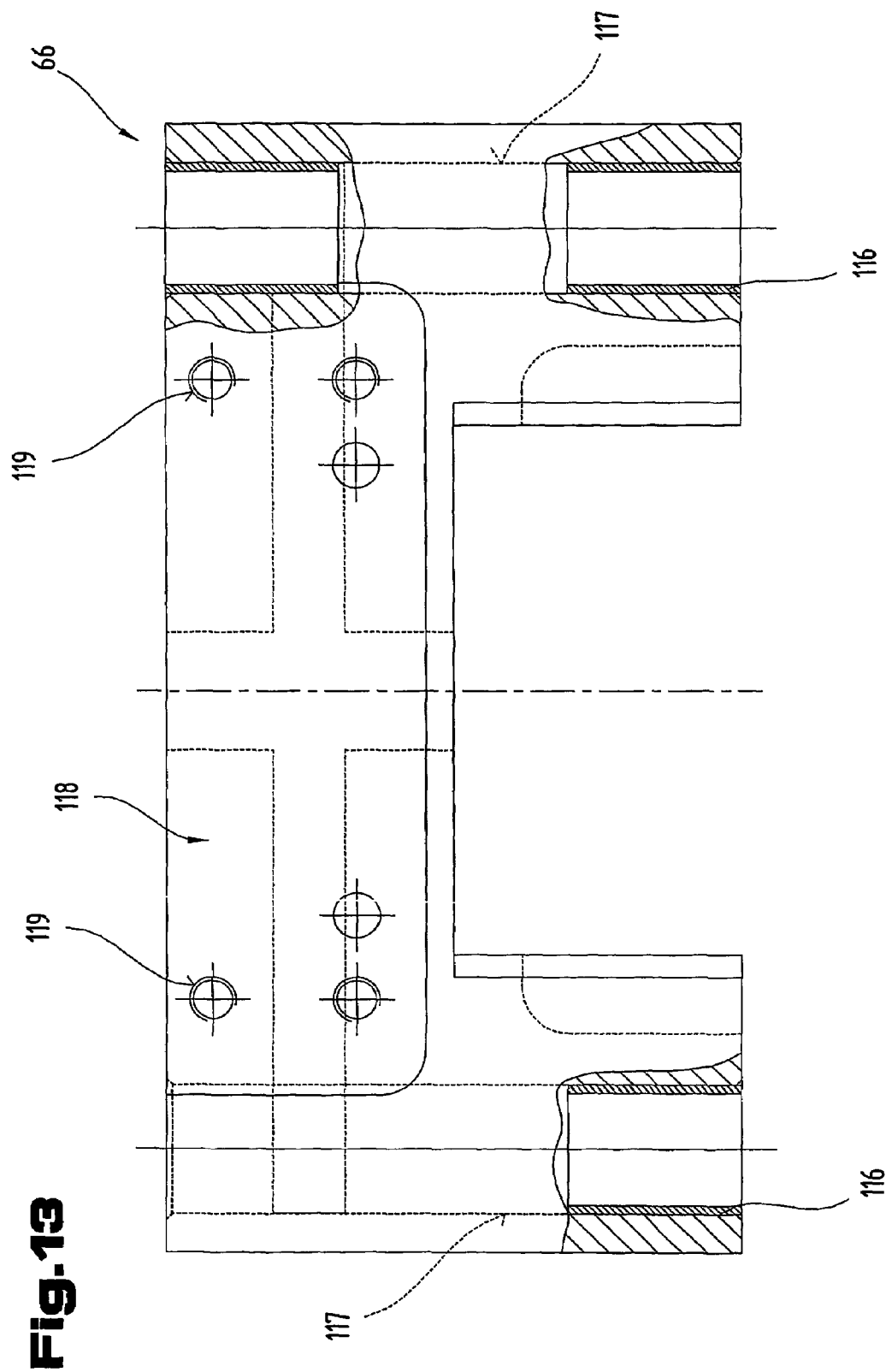
FIG. 13 is a highly simplified, schematic diagram showing a side view of a guide carriage in partial section.
Figure 14:
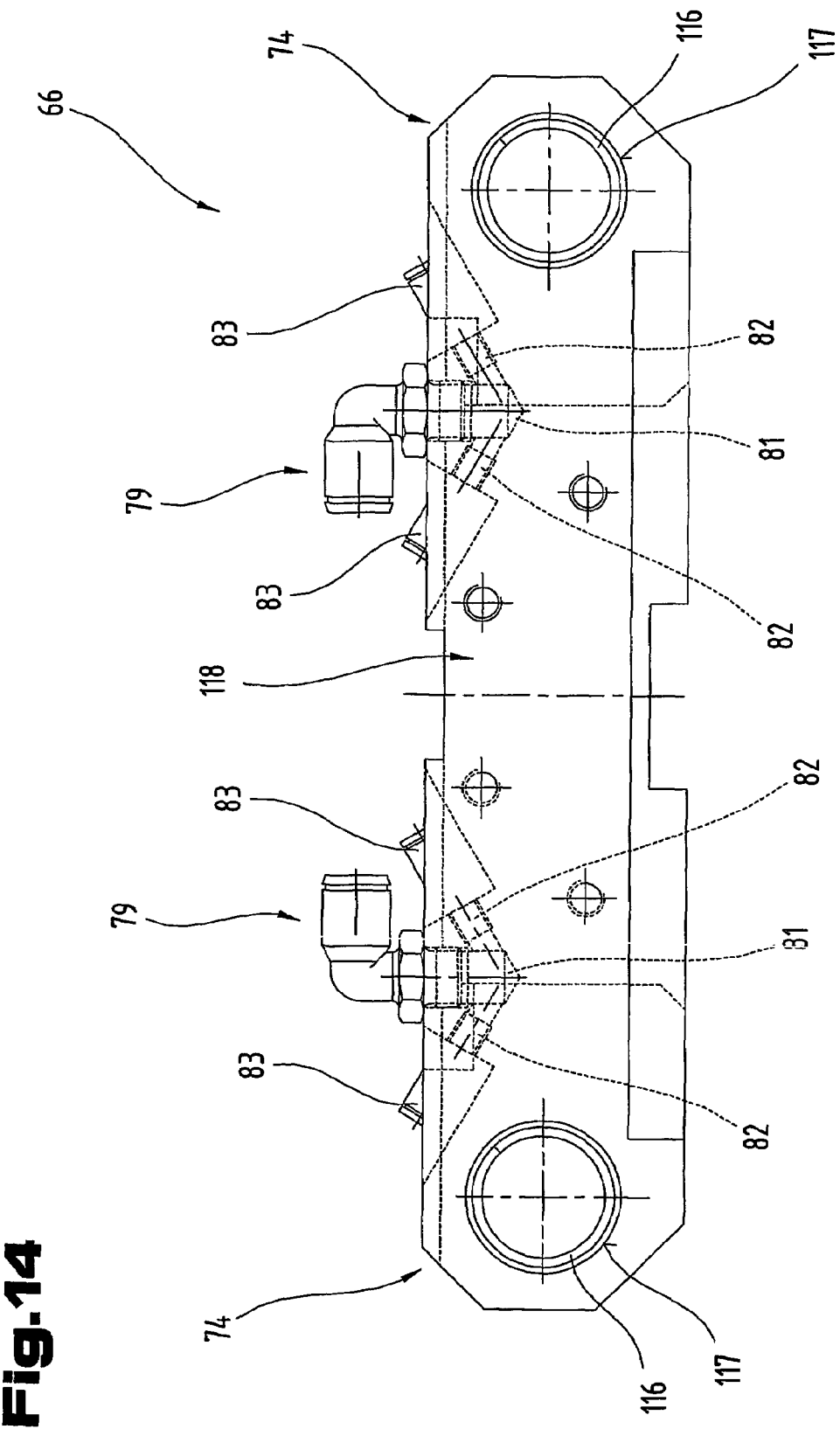
FIG. 14 is a highly simplified, schematic diagram showing a plan view of the guide carriage.

FIGS. 13 and 14, which will be described together, illustrate different views of the prism-shaped guide carriage 66. The guide carriage 66 has bores 117 with guide bushes 116. The adjusting mechanisms 31 are essentially guided along the guide elements 34 without any clearance, although these are not illustrated in this drawing. Naturally, any plain bearing bushes, recirculating ball bushings, etc., known from the prior art may be used as guide bushes 116. Another advantage is the fact that the guide carriage 66 is designed as a pressure-transmitting distributor rail 118 and in this embodiment, pressure can expediently be applied to several distribution passages 82 simultaneously via at least one flow passage 81. The flow passage 81, provided in the form of a blind bore, is preferably disposed perpendicular to the distribution passages 82, which are also provided in the form of blind bores. Naturally, it would also be possible for the guide carriage 66 designed as a pneumatic or hydraulic distributor rail 118 to have integrated switch modules, such as multi-way valves, check valves, throttle valves, etc., or as an alternative these could be mounted directly on the guide carriage 66. It would, naturally, also be possible to integrate components of a control system in the guide carriage 66 for processing logic data or bus data and/or these could also be mounted directly on it.

For details of the design of the electric and/or pneumatic and/or hydraulic distributor rail 118, reference may be made to the more detailed disclosure of patent specification WO 99/09462 A, the subject matter of which forms part of this disclosure by reference.

The guide carriage 66 also has threaded bores 119 for releasably securing the support element 62.

Figure 15:
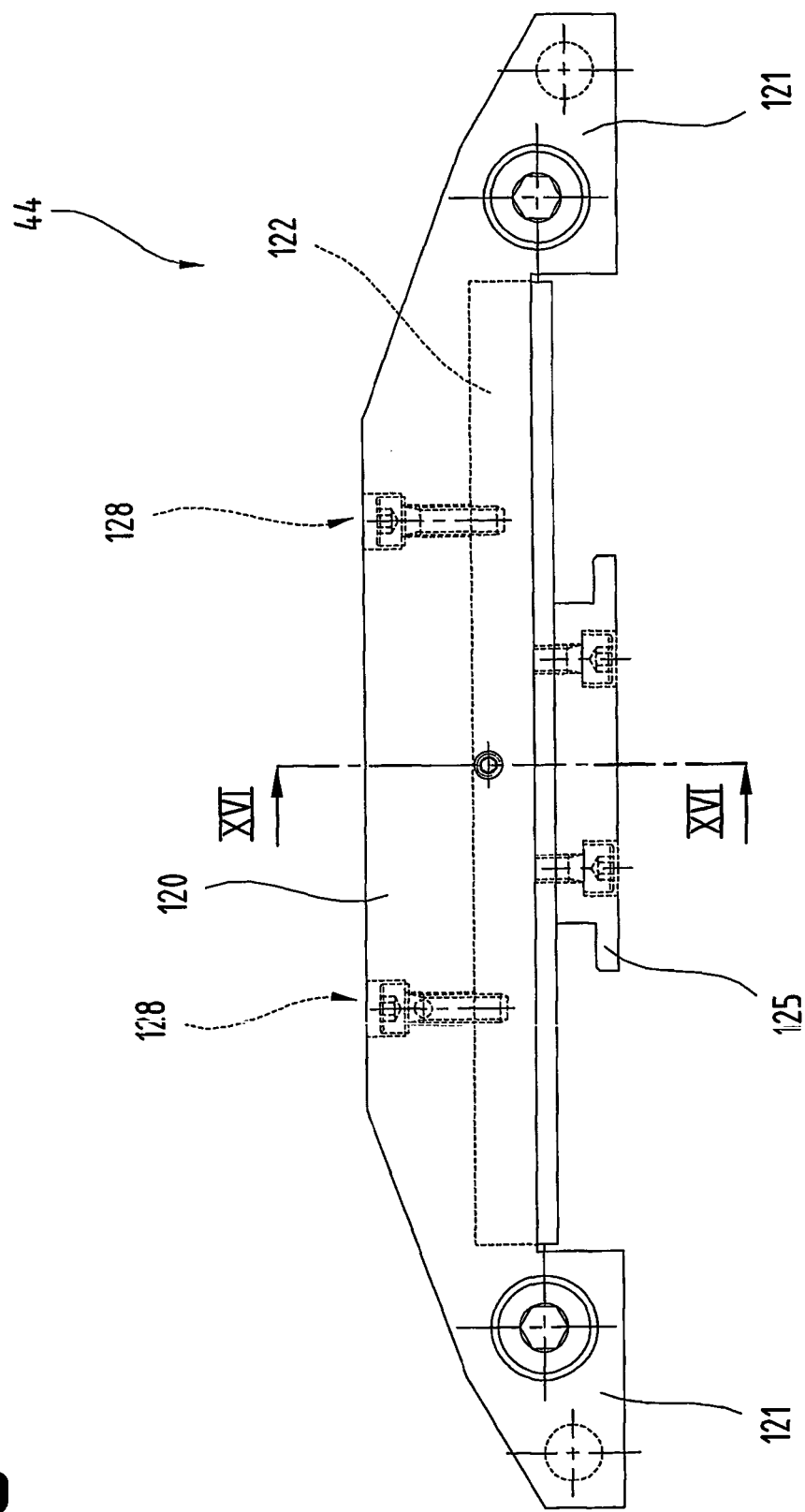
FIG. 15 is a highly simplified, schematic diagram showing a plan view of a clearance compensating device.
Figure 16:
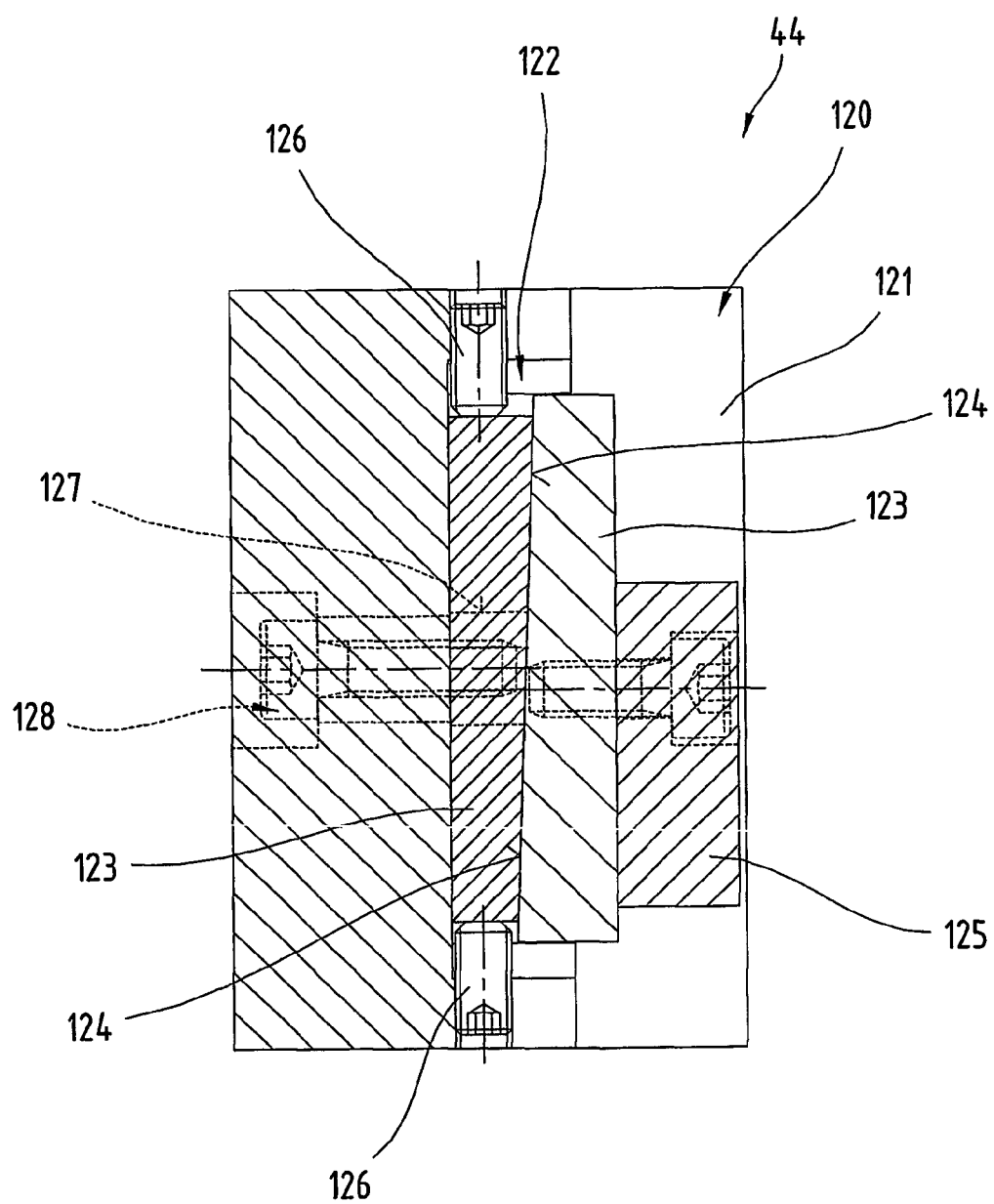
FIG. 16 is a highly simplified, schematic diagram showing a side view of the clearance compensating device in section along line XVI—XVI indicated in FIG. 15.

FIGS. 15 and 16, which will be described together, show different views of the clearance compensating device 44. It comprises a substantially prism-shaped base body 120, in which a recess 122 is set back between two oppositely lying projections 121. Two actuator elements 123, which can be adjusted relative to one another and co-operate with the recess 122, have mutually facing wedge-shaped surfaces or positioning surfaces 124 extending at an angle, so that when a compression force is a applied in a direction extending at least at an angle to the wedge-shaped or positioning surface 124, a fixing flange 125 can be displaced in the axial direction relative to the positioning elements 123. The fixing flange 125 has an approximately T-shaped cross section and engages in at least certain regions in a recess disposed in the operating element 77 of the operating and/or locking mechanism 42 (not illustrated). This produces a positive connection between the operating element 77 and the fixing flange 125 of the clearance compensating device 44.

As illustrated in this embodiment, the compression force or adjusting force is applied by means of threaded pins 126 mounted in the base body 120 by means of a screw-thread arrangement, which enables a relative adjustment between the actuator elements 123. The actuator element 123, which can be pressurised with at least an adjusting force, is expediently provided with a longitudinal slot 127 in the region of its half-height, into which a free end of a fixing and/or centring element 128, in particular a screw arrangement, projects. The adjusting force is expediently applied perpendicular to the adjusting motion of the fixing flange 125, which permits a relative displacement of the two actuator elements 123 due to the presence of the longitudinal slot 127 in the actuator element 123, to which the adjusting force is applied and due to the presence of the oblique, wedge-shaped positioning surfaces 124, thereby enabling the adjustment path of the fixing flange 125 to be varied. The fact that the adjustment path of the fixing flange 125 can be varied means that any clearance which might occur due to manufacturing tolerances or friction-induced wear can be compensated.

In another embodiment of the clearance compensating device 44, elastic return elements are provided between the base body 120 and at least one actuator element 123, which apply the fixing flange 125 with a pre-definable pressing force against the operating element 77 of the operating and/or locking mechanism 42 and to the bearing element 98 of the actuator lever 69, so that any clearance is automatically compensated. Naturally, the compression or adjusting force may be generated by any pneumatic or hydraulic or electric actuator drives known from the prior art in order to set an adjustment path of the operating flange 125.

Figure 17:
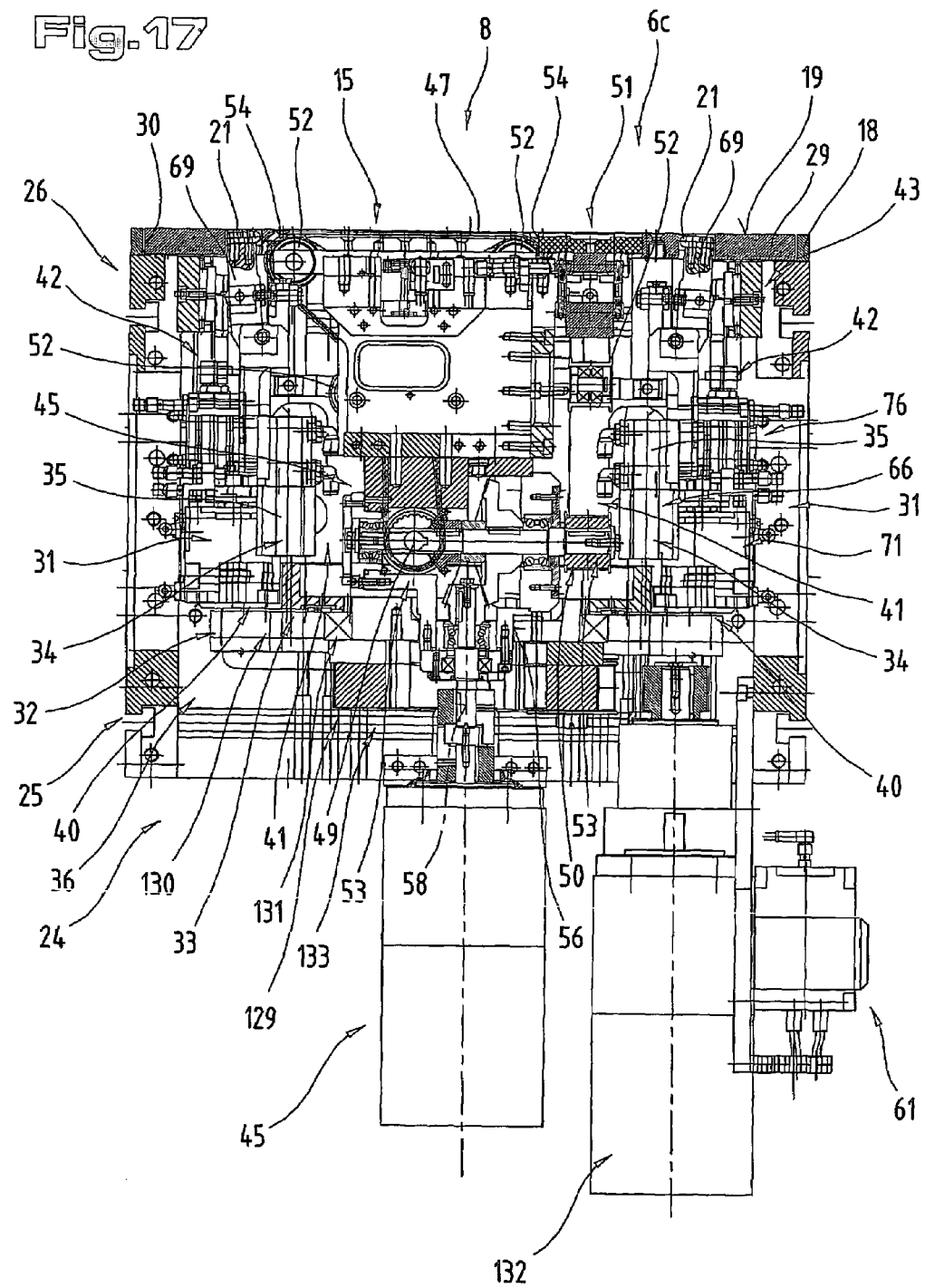
FIG. 17 is a highly simplified, schematic diagram showing a side view, in section, of another conveyor section and a node station for transferring workpiece holders in the same position or a different position from the node station into one of the transport stations.

FIG. 17 illustrates another conveyor section 6c, in particular the node station 8, in which the workpiece holder 2 is forwarded to the other conveyor section 5, in particular the transport station 7, in the same position or same disposition or in a shifted position. The node station 8 proposed by the invention comprises the base frame 24 incorporating the bottom and top frame parts 25, 26, between which the side walls extend, bounding at least certain regions of the support frame 32 receiving at least one, in particular several adjusting mechanisms 31. To facilitate assembly or maintenance, etc., the substantially square base frame 24 of the node station 8 has more or less rectangular access apertures in the region of the side walls. The modular support frame 32 has the polygonal, in particular octagonal support plate 33 extending parallel with the transport plane 19 of the rotary table 29 and detachably affixed to the bottom frame part 25 of the base frame 24 and guide elements 34 and the guide bars 35 forming them, extending perpendicular thereto. The rotary table 29 is disposed in the recess 30 provided in the apron 18 so as to be displaceable in a rotating motion. The support frame 32 and the adjusting mechanisms 31 constitute a replaceable unit 36 which can be connected to the base frame 24. Disposed in the outer peripheral region of the lateral intermediate regions 40 of the support plate 33 are the substantially rail-shaped support elements 41 extending from the support plate 33 in the direction of the rotary table 29, which are connected to the support plate 33 by releasable fixing means. The rotary table 29, which is releasably secured to the support elements 41 by fixing means, incorporates the cutouts 54 extending parallel with the feed direction—indicated by arrow 16—through which the forward feed mechanisms 15, 51 extend. The forward feed mechanisms 15, 51 comprise the pulley blocks 52 and the drive rollers 53, about which the endless drive element 47 is circulated. The drive element 47 might be a double toothed notched belt, for example. The two forward feed mechanisms 15, 51 are respectively driven at the same circumferential speed by means of the drive system 45 incorporating the gear mechanism 46. In order to provide as compact a structure as possible, the gear mechanism 46 is a planetary gear comprising the driving input part 48 and the output parts 49, 50, the output parts 49, 50 of which serve as drive rollers 53 for the forward feed mechanisms 15, 51. Gear mechanisms 46 of this type, which essentially require no maintenance, are known from the general background art.

In order to drive the rotary table 29 connected to the support frame 33 in rotation, the support frame 33 with the adjusting mechanisms 31 disposed on it is mounted so as to be displaceable in a rotating motion. A projection 129 of the support frame 33, circulating concentrically about the mid-axis 58, and a bearing mechanism 131 of the base plate 130 connected to the bottom base frame 25 support the entire unit 36. Bearings of this type capable of taking high forces are generally known from the prior art and may be provided in the form of a double in-line radial grooved ball bearing, etc., for example. A majority of forces and torques which occur, especially acting parallel with or at an angle to the transport plane 19, for example during a machining process, etc., are transmitted via the guide rails 21 and actuator lever 69 directly to the oppositely lying base body 120 and to the support elements 41.

A drive system 132 for driving the workpiece holder 2 (not illustrated in this drawing) disposed on the rotary table 29 in rotation, which is arranged offset from the drive system 45 transmitting the forward motion to the workpiece holder 2 and is also connected to the base frame 24, is drivingly connected to a drive means 133 connected to the support frame 33. A cylindrical gear-notched belt arrangement is used to ensure that a driving torque of the drive system 132 is transmitted to the drive means 133 without any slip. The drive system 132 used may incorporate any electric motors known from the prior art, such as asynchronous motors, stepper motors, servo-motors, etc. The drive system 132 is also connected to the base frame 24 in such a way that it can be replaced.

If an asynchronous motor is used, the rotation path is restricted by mechanical stop elements. However, only pre-definable rotation paths are possible. An alternative to this would be to permit any freely programmable position or any rotation of the rotary table 29 and workpiece holder 2, which could then be set by programming, using use a stepper motor or servo motor.

The structural design and construction of the height adjusting mechanisms 43 and operating and/or locking mechanisms 42 forming the adjusting mechanisms 31 are the same as those described in respect of the preceding drawings.

Figure 18:
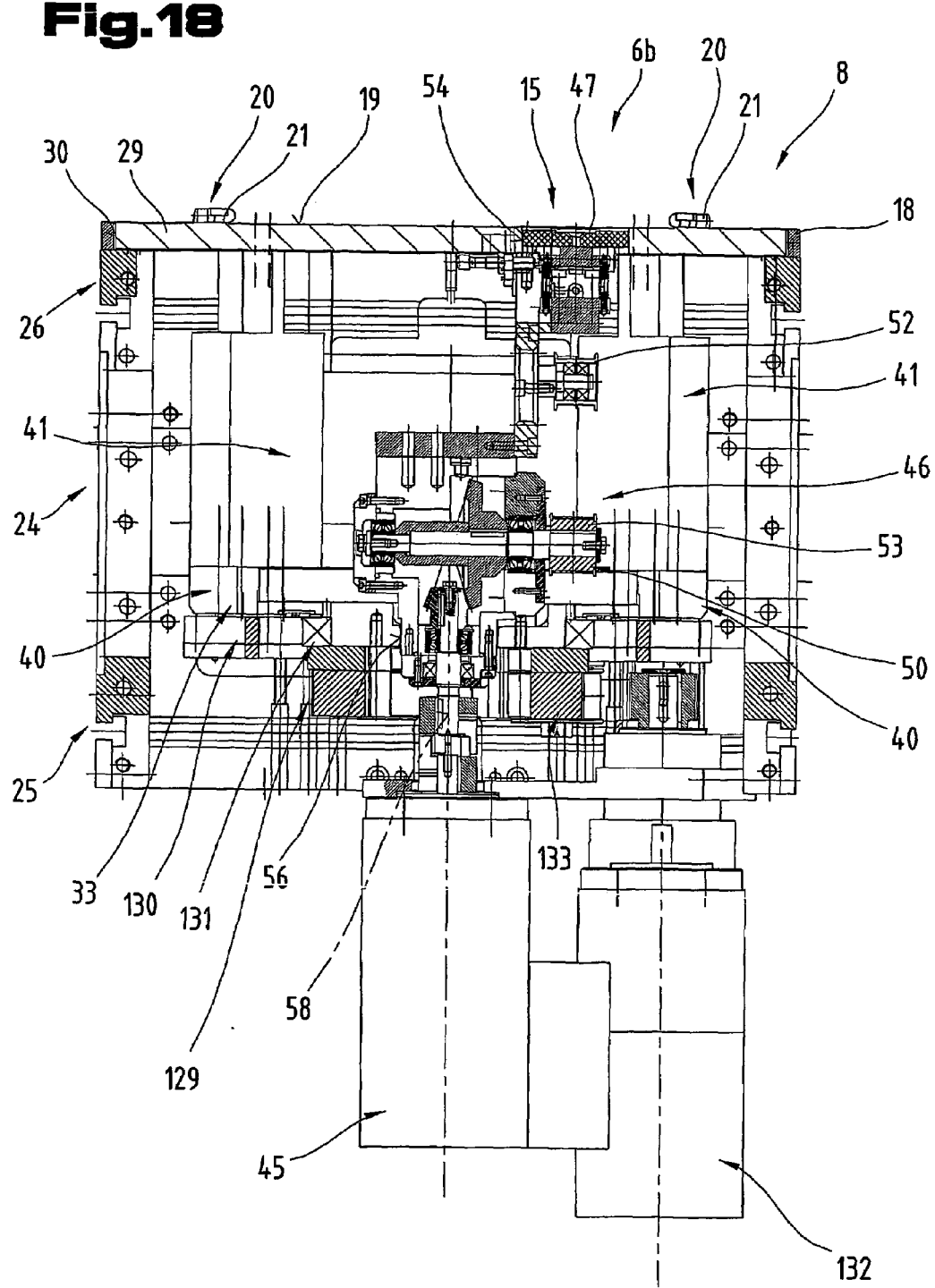
FIG. 18 is a highly simplified, schematic diagram showing a side view, in section, of another conveyor section and a node station for transferring workpiece holders in the same position from the node station into one of the transport stations.

FIG. 18 illustrates a different embodiment of the conveyor sections 6b or node station 8. This embodiment enables the workpiece holder 2 to be transferred in a shifted position into one of the conveyor sections 5 or transport stations 7. This node station 8 has two guide tracks 20 and the guide rails 21 constituting them, spaced apart from one another parallel with the feed direction—indicated by arrow 16—and in the direction extending transversely thereto, which are secured to a rotary table 29 so as to be stationary. They are connected to the rotary table 29 by fixing means enabling them to be replaced. The polygonal, in particular octagonal support plate 33 receiving the support elements 41 in the outer peripheral region of the lateral intermediate regions 40 is mounted so as to be displaceable in rotation by means of the bearing mechanism 131 of the base plate 130, which is secured between the support plate 33 and the bottom frame part 25 of the base frame 24 so as to be immobilised. The apron 29 is joined to the support plate 33 by means of the support elements 41 so that when the drive system 132 is operated, a torque is transmitted to the drive means 133 and the rotary table 29 is rotated by a pre-definable adjustment path. The support plate 33 with the projection 129 running concentrically about the mid-axis 58 is displacingly linked to the drive means 133, thereby transmitting the torque of the drive system 132 to the rotary table 29.

The forward feed mechanism 15 extending through the cutout 54 in the rotary table 29 is drivingly linked to the drive system 45 and interconnects with the gear mechanism 46 disposed in the recess 56 in the support plate 33. The forward feed mechanism 15 incorporates the pulley blocks 52 and the drive roller 53 about which the endless drive element 47 is circulated. Accordingly, the drive roller 53 is the output part 50 of the gear mechanism 46. The apron 18 placed on the top frame part 26 has the recess 30 receiving the circular rotary table 29 and the rotary table 29 is spaced at least at a slight distance apart from the mounting surface for the apron 18. This distance can be pre-set by dimensioning the mounting of the bearing mechanism 131.

The forward feed mechanism 15 in the node station 8 co-operates with an actuator element, in particular a pneumatic cylinder, hydraulic cylinder etc., which positions the drive element 47 in the direction perpendicular to the transport plane 19 and moves the corresponding drive element 47 into engagement with the drive means of the workpiece holder 2.

Figure 19:
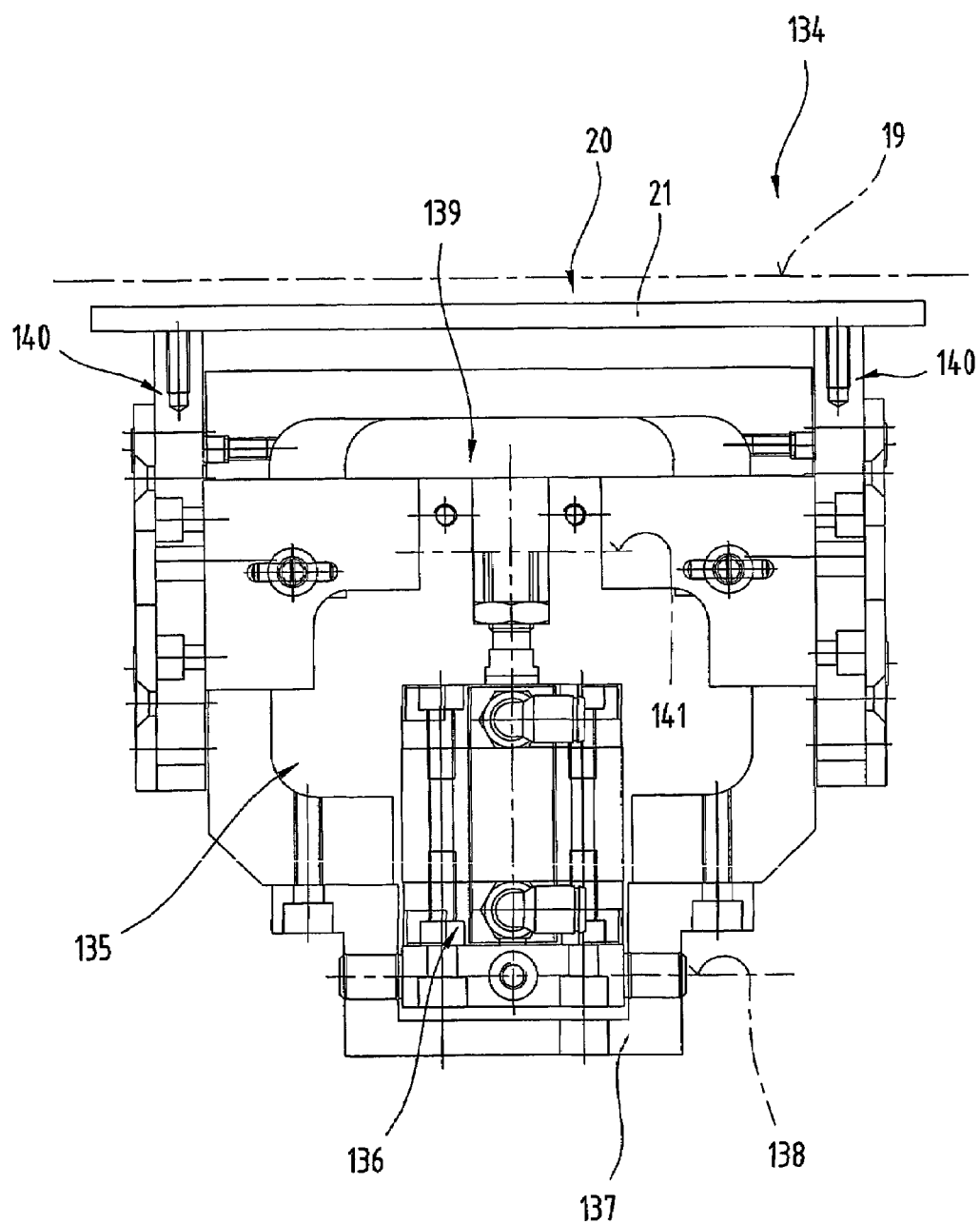
FIG. 19 is a highly simplified, schematic diagram showing an end-on view of another embodiment of an adjusting mechanism.
Figure 20:
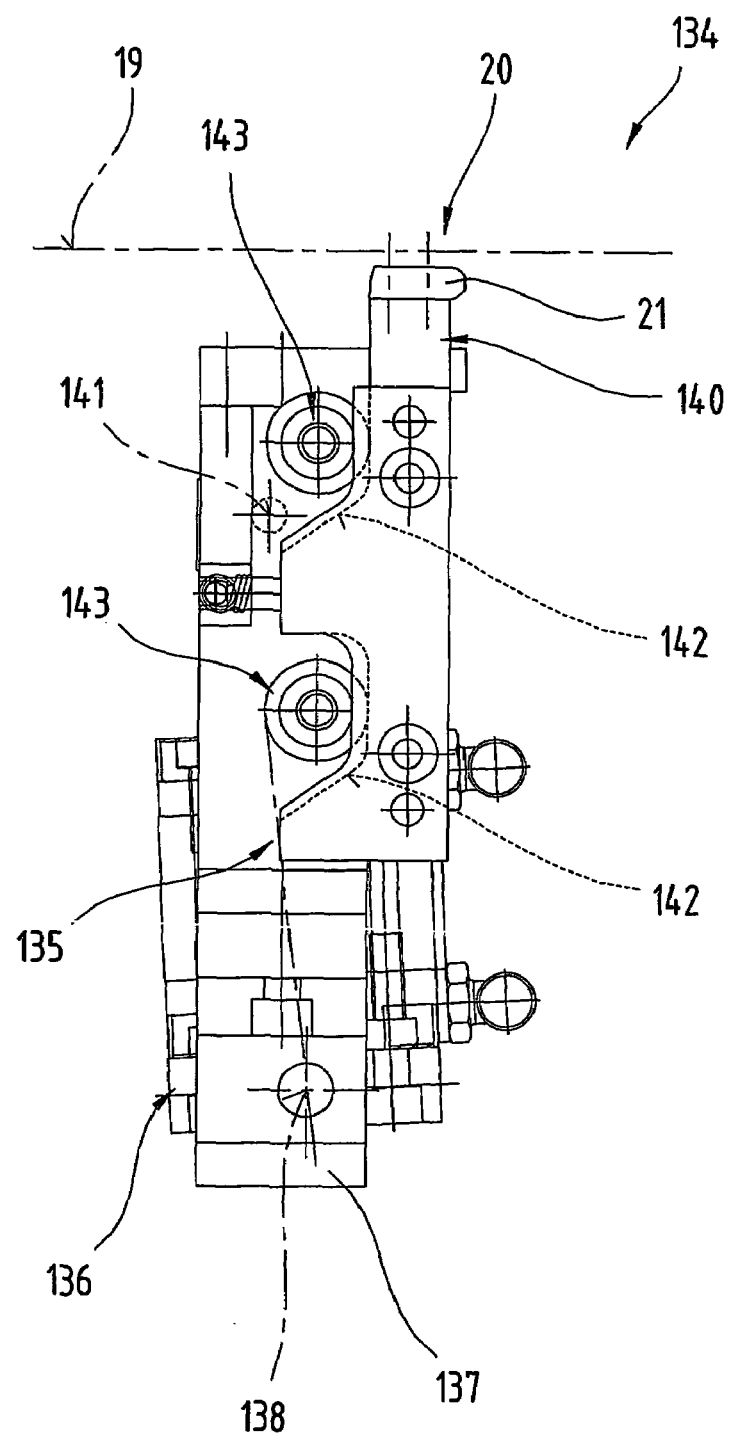
FIG. 20 is a highly simplified, schematic diagram showing a side view of the adjusting mechanism.

FIGS. 19 and 20, which will be described together, show a side view in section of a different embodiment of an adjusting mechanism 134. The adjusting mechanism 134 has a substantially prism-shaped support body 135, which co-operates with a replaceable fixing element 137 receiving an actuator drive 136, which can be displaced in a pivoting motion, on the side lying opposite the transport plane 19. The actuator drive 136, which is a linear drive, is provided with a locking plate at an end region facing the fixing element 137, through which a pivot pin extends, so that the actuator drive 136 is mounted so that it can be displaced in a pivoting motion about an axis 138 running parallel with the transport plane 19. A free end of a piston rod of the actuator drive 136 is linked to projecting parts 139 of actuator levers 140 so as to be displaceable in a pivoting motion about a pivot axis 141. The actuator levers 140 of the adjusting mechanism 134, which can be operated by means of an actuator drive 136, are respectively provided with one, preferably with two slide tracks 142, for example, arranged in symmetrical mirror image one above the other in the direction perpendicular to the transport plane 19. At least one bearing element 143, in particular a roller bearing, is supported on the slide track 142. A first part region of the mutually parallel slide tracks 142 is at least slightly inclined relative to the transport plane 19. Another part region of the slide tracks 142 adjoining the inclined part region in the vertical adjustment direction extends perpendicular to the transport plane 19. The actuator levers 140 receiving the guide tracks 20 are designed so as to be pivotable or displaceable against the action of elastic return elements out of the non-operating position into the engaged position in a direction parallel with the inclination of the part region of the slide track 142 in order to engage with the recesses 108 of the guide elements 106 (although these are not illustrated in this drawing). The return element counteracting the displacement is preferably provided in the form of at least one spring arrangement, in particular a tension spring, which is disposed between the support body 135 and the actuator levers 140. The bearing elements 143 co-operating with the slide tracks 142 are secured on the side of the support body 135 and spaced at a distance apart, one above the other. In order to provide lateral and longitudinal guidance for the actuator levers 140, the latter are disposed between at least two guide parts affixed to the support body 135. In the non-operating position, a longitudinal mid-axis of the actuator drive 136 extends at least at a slight angle relative to an axis running perpendicular to the transport plane 19, whereas in the engaged position, the longitudinal mid-axis is disposed perpendicular to the transport plane 19.

When pressurising medium is applied to the actuator drive 136, the piston rod is extracted and the bearing elements which are disposed perpendicular to the transport plane in the non-operating position roll along the vertical part region. As a result, the actuator levers 140 are moved vertically. In the inclined part region, the actuator levers 140 are moved along the latter by the rolling action of the bearing elements 143 in the direction parallel with and perpendicular to the transport plane 19. The part region which is crucial to the displacement is the inclined part region, whereas the vertical part region is decisive for the non-operating position only and therefore permits only a slight displacement path in the vertical direction.

FIGS. 21 to 23, which will be described together, illustrate different views of the workpiece holder 2. Two mutually parallel longitudinal side faces 145 are spaced apart by a width 144 and extend perpendicular to transverse side faces 147 which are spaced apart by a length 146. The length 146 and width 144 of the workpiece holder 2 are expediently identical. A bottom face 148 extending perpendicular to the longitudinal side faces 145 and transverse side faces 147 accommodates the guide mechanism 105 and the guide members 106 constituting it, as well as drive means 149. The cross-sectional dimensions of the crossing drive means 149 co-operating with the forward feed mechanisms 15, 51 complement those of the drive elements 47 or notched belts. Toothing on the bottom face 148 of the workpiece holder 2 serves as the drive means 149. The longitudinal side faces 145 and transverse side faces 147 extending vertically between a top face and the bottom face 148 are bounded in a peripheral region closer to the bottom face 148 by side faces 150, which extend at an angle relative to the bottom face 148. The side faces 150 extend parallel with the guide surfaces 110 of the guide rails 20 directed towards the workpiece holder 2. The bottom face 148 and the top face of the workpiece holder 2 extend parallel with the transport plane 19.

Disposed between the drive means 149, which extend parallel with one another at a distance apart from the longitudinal side faces 145 and transverse side faces 147, are the guide elements 106 constituting the guide mechanism 105. In the region of each longitudinal side face 145 and transverse side face 147, at least two, in particular several guide elements 106 are expediently disposed at a distance apart from one another. The guide elements 106, which rotate about an axis extending perpendicular to the bottom face 148, are disposed in circular cylindrical recesses in the bottom face 148, such that no thickness of the workpiece holder 2 projects out. This makes for a compact workpiece holder 2, capable of withstanding high loads. The guide elements 106 are arranged in a square pattern.

At each of its corners, the workpiece holder 2 is expediently provided with wiper or lubricating elements 151 on the inclined side faces 150, which wipe the guide surfaces 100 of the guide rails 21. The wiper and/or lubricating elements 151 are made from an oil-impregnated plastic.

It would naturally also be possible to provide the drive means 149 as a separate unit, mounted in a recess specifically provided for this purpose, extending across the entire width 144 and/or length 146. They may be made from any materials known from the prior art, such as metal, non-metal materials or plastics, fibre-reinforced plastics, etc. For practical purposes, these drive means 149 forming a separate unit are releasably connected to the workpiece holder 2 by means of positive and/or non-positive connecting elements.

As indicated by dotted-dashed lines in FIG. 21, the workpiece holder 2 is expediently provided with data carriers in the corner regions of the bottom face 148, to ensure that they can be unambiguously identified and so that their position or disposition in one of the conveyor sections 5; 6 can also be unambiguously identified. For practical purposes, each workpiece holder 2 has four data carriers disposed in the corner regions, each of which has a separate identification code which can be detected by means of reading and/or memory stations arranged in the conveyor sections 5, 6 and monitored from a central control system. The particular advantage of providing the data carriers is that it offers the possibility of introducing the workpiece holder 2 into the production line 1 in any position, sine it can be initially recorded or identified on passing a reading and/or memory station. Due to the fact that the codes of the data carriers of the workpiece holder 2 can not be confused with one another, the position or disposition can be clearly determined, so that information can be transmitted to the control unit and compared with a default value, e.g. the desired position of the workpiece holder 2. If the actual position of the workpiece holder 2 deviates from the desired position, for example, at least one command can be output in order to activate the transport and node stations 7, 8. From whatever position it happens to be in, the workpiece holder 2 will then be moved by one or more processes by means of one or more node stations 8 into a position or disposition necessary for processing purposes, thereby eliminating unnecessary and costly downtimes.

As shown in the embodiment illustrated as an example here, the guide elements 106 are provided in the form of guide rollers with a groove-shaped recess 108 bounded by complementary, mutually angled guide surfaces 109, in which the guide rails 21 operated by the adjusting mechanism 31 engage in an essentially positive arrangement—as illustrated in FIG. 3. Guided between two oppositely lying guide rails 21 and along them in the direction of the height and side, the workpiece holder 2 is exclusively supported by the guide surfaces 109 of the guide members 106 on the guide surfaces 110 of the guide rails 21. For practical purposes, a slight vertical distance 152 is left free between the bottom face 148 and the transport plane 19. The forward feed mechanisms 15, 51 must be displaced by at least this distance, plus a height of the toothing of the drive element 47.

FIGS. 22 and 23 illustrate another embodiment of the forward feed mechanism 15 for transmitting a forward feed motion between the drive element 47 and the drive means 149 of the workpiece holder 2. The drive element 47 or notched belt has strip-shaped coupling elements 154, 155 on the top face 153 directed towards the bottom face 148 of the workpiece holder 2, which are also provided on the bottom face 148 of the workpiece holder 2, which are respectively applied against a bearing surface 156 thereof in a positive and or friction lock. The coupling elements 154 have a plurality of coupling parts 157 with at least slightly elastically flexible projections 158, the coupling parts 157 advantageously being arranged on a flat support body 159. The drive element 47 is expediently of a multi-layered construction, one of the layers forming the support body 159 of the coupling element 155, across the surface of which a plurality of coupling parts 157 are disposed, oriented at least at an angle relative to the bearing surface 156 receiving them. Distributed across their surface and standing proud of it, the coupling parts 157 have slightly elastically flexible projections 158. The forward feed mechanisms 15, 51, which are displaceable perpendicular to the transport plane 19, move the mutually facing coupling elements 154, 155 into a substantially positive engagement, enabling the coupling elements 154, 155 to be coupled with one another in each of their relative positions.

The fact of providing the plurality of elastically flexible projections 158 or the elastically flexible surfaces of the coupling parts 157 which can be moved into engagement with one another means that, in the coupled fixedly engaged position, the forward feed mechanisms 15; 51 and the drive means 159 of the workpiece holder 2 are engagingly joined to one another and displace the workpiece holder 2 in a linear motion due to the rotating motion of the forward feed mechanism 15; 51. The coupling parts 157 spaced apart from one another in the lengthways and/or widthways direction of the coupling elements 154, 155 have a cross section of a truncated cone shape, with at least one, in particular several, radially extending projections 158 spaced apart from one another across the periphery of the surface in the longitudinal direction. The projections 158 have a multi-cornered, in particular triangular or trapezoidal, etc., cross section. Side faces of the elastically flexible and reversible projections 158 are disposed at an angle relative to one another, for example, tapering in the radial direction the farther their distance away. Naturally, the surface of the coupling parts 157 could also be covered with a coating having a different surface roughness or a surface structure—as schematically indicated in this drawing. As may be seen from this drawing, the coupling elements 154, 155 are respectively of a single-piece design and made from the same material. Naturally, they may also made up of a plurality of parts and made from materials with different properties, e.g. strength, elasticity, etc. For practical purposes, both coupling elements 154, 155 are made from the same material, in particular thermoplastic polymers. It would naturally also be possible for one of the two coupling elements 154, 155 to be made from plastics, in particular thermoplastic polymers, with a different strength and/or toughness.

The coupling elements 154, 155 may naturally be joined to the respective components by means of any joining method or joining means known from the prior art, such as welding, bonding or optionally rivets, screws, etc.

It should be pointed out that the coupling elements 154, 155 are illustrated in a simplified format and on a very much enlarged scale and only a few of the coupling parts 157 are illustrated in the drawing in order to retain clarity. In actual fact, the coupling elements 154, 155 have a plurality of coupling parts 157.

The coupling elements 154, 155 may naturally include any geometries, designs and dimensions known from the prior art.

As mentioned previously, the workpiece holder 2 is positioned in the conveyor section 6a, 6b, 6c by means of a control unit. It would naturally also be possible for another transversely extending guide track 20 to be raised in the conveyor sections 6a, 6c in addition to the guide tracks 20 already described, in which case it would fulfill the function of a mechanical stop element. In another embodiment, as the workpiece holder 2 passes into the node station 8, a guide track 20 in at least one of the conveyor sections 6a; 6c or in the node station 8 is already displaced in readiness to assume an engaging position, in which case only a guide track 20 extending parallel with it is then displaced or acts as a stop element for positioning the workpiece holder 2.

As explained above, several transport stations 7 arranged one after the other are designed as holding or buffer runs, in which one or more workpiece holders 2 may be located at the same time, at least one of which moves into a node station 8 disposed downstream of the transport station 7 in the feed direction—indicated by arrow 16—after being released, in other words as the workpiece holder 2 following the preceding workpiece holder 2 leaves the node station 8, whilst the workpiece holder 2 downstream in the feed direction—indicated by arrow 16—is fed onwards into the transport station 7 by a specific displacement path.

Naturally, another possible option is for the holding or buffer run to form a common unit incorporating two mutually parallel guide tracks 20 spaced apart from one another across the length thereof, and a guide mechanism 15 disposed between them accommodating the endlessly circulating drive element 17. At this stage, it should be pointed out that the forward feed mechanisms 15; 51 may optionally be capable of running in two directions, in which case it would also be possible to reverse the feed direction—indicated by arrow 16. The holding or buffer run receiving the plurality of workpiece holders 2, arranged one after the other and spaced at a slight distance apart, is able to deliver the workpiece holders 2 in timed cycles and correctly positioned into the node station 8 downstream. As a result of the non-positive and/or positive engagement of the workpiece holders 2 with the forward feed mechanism 15, the workpiece holders 2 arranged one after another and spaced at a slight distance apart are rigidly coupled with one another, in which case the control unit ensures that the workpiece holders 2 are continuously fed into or fed out of the holding or buffer run continuously, in order to increase productivity of the production line 1.

FIG. 24 illustrates part regions of two immediately consecutive conveyor sections 5; 6a; 6b; 6c and the transport stations 7 and node stations 8 constituting them, together with the forward feed mechanisms 15; 51 co-operating with them. The workpiece holder 2 receiving the components 3 is drivingly linked to at least one forward feed mechanism 15 or, in the transfer region, to two forward feed mechanisms 15 spaced at a slight distance apart from one another in the longitudinal direction and positioned in a feed direction—indicated by arrow 16—and optionally transported in cycles to another conveyor section 5; 6a; 6b; 6c. The forward feed mechanism 15; 51 has several pulley blocks 52, mounted so as to rotate on a frame part 161, and the drive roller 53 drivingly linked to the drive system 45. The drive element 47 endlessly circulating about the drive roller 53 and the pulley blocks 52 is provided in the form of a double toothed notched belt. The top face 153 of the notched belt directed towards the workpiece holder 2 is made up of several locating means 163 separated from one another in the longitudinal direction by driver elements 162. The drive means 49 co-operating with the notched belt also has locating means 165 separated from one another by driver elements 164 on the bottom face 148 of the workpiece holder 2. The mutually co-operating driver elements 162, 164 and locating means 163, 165 have an identical geometry in terms of pitch, tooth width, tooth height, gap width, flank angle, head height. etc. When the locating means 163 of the notched belt is coupled with the driver element 164 of the drive means 149 in the engaged position, only the mutually inclined tooth flanks are in contact with one another.

In order to transfer the workpiece holder 2 in the correct position and without jolting from the first forward feed mechanism 15 of the first conveyor sections 5 to the other forward feed mechanism 15 of the other conveyor sections 5; 6a; 6b; 6c, it is necessary to drive the two separately driven forward feed mechanisms 15 in synchronisation with one another. The two drive systems 45 are expediently inter-connected via a connecting line, in particular a bus line, to a decentralised control unit 166, via which the commands and/or data sets needed to activate and control the forward feed mechanisms 15 are transmitted. Such drive systems 45 with a high positioning accuracy, known from the prior art, in particular servo-motors, stepper motors, etc., are fitted with an incremental transmitter, an encoder for fixing a position of the drive element 47 and at least one driver element 162 or locating means 163. As a result of the control and computing algorithm stored in the control unit 166, which might include neural networks, fuzzy logic, etc., the relative position of the drive element 47 can be determined at any time and applied to the other downstream drive system 45 for control purposes.

The drive element 47 circulating at a pre-definable speed engages the workpiece holder 2 arriving from an upstream conveyor section 5 and is drivingly linked in a positive connection for a brief time to a forward feed mechanism 15, if necessary. A high positioning accuracy to within less than 0.1 mm can be obtained due to the slip-free driving action of the drive element 47 and the slip-free engagement of the drive element 47 and drive means 149. For practical purposes, the distance 167 between two drive elements 47 as measured between the driver elements 164 is a multiple of the pitch 175 of the drive means 149.

The desired parameters, e.g. desired values for the position, speed, forward feed rate, etc., which can be retrieved from a memory of the control unit 166, are compared with an actual parameter, e.g. the actual value of the position of the drive element of the first forward feed mechanism 15, and a compensation applied for any deviation, if necessary. The actual parameter of the other forward feed mechanism 15, e.g. the actual value for the position of the drive element 47, is then adjusted depending on the set desired parameter, e.g. desired value for the first upstream forward feed mechanism 15, by varying the speed or forward feed rate of the drive element 47 of the other feed mechanism 15 relative to it. After locating the positions of the two forward feed mechanisms 15 relative to one another, the drive systems 45 and hence the drive elements 47 can then be driven synchronously and hence at the same speed. At least one return mechanism 168 disposed between the pulley blocks 52 arranged one after the other in the feed direction—indicated by arrow 16—is pre-set by means of elastic return elements 169 to counteract the weight of the workpiece holder 2 and components 3. The return mechanism additionally has a slide plate 171 with a slide surface 170, on which certain regions of the notched belt are supported by the bottom face.

As at least one locating means 163 of the notched belt and a locating means 165 of the workpiece holder 2 move towards one another, the floatingly mounted slide plate 171 is displaced in a direction perpendicular to the feed direction—indicated by arrow 16—and against the action of the elastic return elements 169. The displacement is detected by means of at least one sensor 172 and transmitted to the control unit 166. The sensors 172 may naturally be any sensor known from the prior art, such as capacitive sensors, distance, sensors, etc.

The workpiece holder 2 leaving the first forward feed mechanism 15 of the conveyor section 5 arrives at the intake region 173 of the other forward feed mechanism 15 of the other conveyor section 5. As the locating means 163 and 165 move towards one another, the return mechanism 168, in particular the slide plate 171, is released by a tooth height. This causes the signal or command to be transmitted via the sensor 172 to the control unit 166, prompting a change in the speed of the drive system 45 of the other forward feed mechanism 15, so that a difference between the first forward feed mechanism 15 and the other forward feed mechanism 15 causes the locating means or engaging means 163 to mutually locate in the driving element or elements 164 of the notched belt in a positive lock and the workpiece holders 2 are moved along uniformly. Once the locating means 163 and the driver elements 164 are engaged, the return mechanism 168 is returned to its initial position. Naturally, the speed of the other forward feed mechanism 15 can be briefly increased above or reduced below the speed of the first forward feed mechanism 15. Once the two return mechanisms 168 have been returned to their initial position and the slide plate 171 is therefore disposed parallel with the transport plane 19, the two drive system 45 of the forward feed drives 15 are synchronously driven so that the workpiece holder 2 is moved along by the positive lock of the locating means 163, 165 in the driver elements 162, 164, without causing any tension in the workpiece holder 2 itself.

The sensors 172 are connected to the control unit 166 by line connections of a type known from the prior art, such as bus lines or three-conductor cables, for example. Naturally, another option would be for the locating means 163 to locate automatically in the driver element 164 solely on the basis of the forward feed motion.

In another embodiment, the position of the workpiece holder 2 moving towards the first forward feed mechanism 15 or moving out of the first forward feed mechanism 15 is determined by means of at least one sensor 172, in particular a glass measure, disposed in a pre-definable position of the apron 18 or the rotary table 29 which detects the displacement path and, when the actual position of the workpiece holder 2 is detected, the actual position of the drive element 47, in particular its locating means 163 and/or driver element 162, is determined and a parameter of the drive means 149, in particular its locating means 165 and/or driver element 164 is varied in accordance with the pre-set desired positions. Since the distance measuring system in the form of the glass measure actively co-operates with the forward feed mechanism 15; 51, if there is a change in the distance 167 corresponding to a multiple of a pitch 174 of the drive means 149 on the workpiece holder 2, the forward feed rate can be changed in order to produce an automatic engagement.

Naturally, another possibility would be, for example, to detect the relative position of the drive means 149 with respect to the drive element 17; 47 of the other forward feed mechanism 15 by means of the flanks of at least one driver element 162 and transmit it to the control unit 166, which will then command the drive system 45 of the other forward feed mechanism 15 to change the relative position of the drive element 17; 47 with respect to the drive means 149 so that the workpiece holder 2 approaching the intake region 173 is moved into engagement with the drive element 17; 47 without slipping. To this end, the drive element 47 has a pitch 175 which matches a pitch 174 of the drive means 149 of the workpiece holder 2 for example. If the actual relative position deviates from a desired relative position, the relative position can be adjusted by changing the speed or forward feed rate of the drive element 17; 47.

By changing the speed or forward feed rate of at least one of the forward feed mechanisms 15, the distance 167 can be adjusted to a multiple of the pitch 174 of the drive means 149. The driver elements 162, 165 of the drive means 149 and the notched belt are provided in the form of a groove-shaped recess with an approximately V-shaped or trapezoidal shaped cross section.

In another embodiment whereby a workpiece holder 2 can be transferred from one to other immediately downstream conveyor sections 5; 6a; 6b; 6c, the drive system 45 for the first drive element 47 is speed-controlled and the drive system 45 for the other drive element 47 is torque-controlled. As the workpiece holder is being transferred from the first forward feed mechanism 15; 51 to the other forward feed mechanism 15; 51, if the locating means 165 do not exactly meet the driver elements 162, a higher driving force or driving torque will be generated between the flank of the locating means 165 and the flank of the locating means 163 after the driver element 162, which means that at least one of the drive systems 45 will briefly experience a speed change until the drive system 45 has reached its pre-set desired value again. The speeds of the two forward feed mechanisms 15; 51, which may or may not be different, are then stored in the memory of the control unit 166, from where they can be retrieved.

It should be pointed out at this stage that the production line 1 proposed by the invention has a plurality of forward feed mechanisms 15; 51, which are interconnected with one another and to the central unit 166 via control lines. Consequently, all forward feed mechanisms 15; 51 are able to communicate with one another.

FIGS. 25 to 28, which will be described together, illustrate different embodiments of the coupling elements 154, 155 described in connection with FIGS. 22 and 23, which are mounted respectively on the bearing surface 156 of the workpiece holder 2 and the drive element 47 or notched belt in a positive and/or friction locking arrangement. FIG. 25 illustrates the coupling elements 154, 155 in the disengaged state and FIG. 26 shows them in the engaged state. The mutually engageable coupling elements 154, 155 may be of a one or multi-part design or a one or multi-layered design and are at least slightly elastically flexible and reversible, incorporating with bearing regions 176 between them for at least one other coupling part 157 in the form of the other coupling element 155. As may be seen from this preferred embodiment, the coupling parts 157 have a pyramid-shaped or wedge-shaped cross section. The coupling parts 157, which are intrinsically elastic and are distributed, preferably uniformly, along a bearing surface 156, are designed so as to be elastically deformable and reversible in three spatial directions and when the forward feed mechanism 15; 51 is activated, they are moved or forced into a positive engagement in a direction perpendicular to the feed direction—indicated by arrow 16—with at least one receiving region 176 of the other coupling element and/or are pushed into one another and elastically deformed. The coupling elements 154, 155 are preferably joined to the workpiece holder 2 and the drive element 147 in the region of the bearing surface 156 by means of a layer of adhesive. As illustrated in this exemplary embodiment, the coupling element 154, 155 has a flat support body 159 between the coupling parts 157 and the surface or bearing surface 156 forming them, on which the coupling parts 157 are distributed, preferably uniformly, on a support body surface remote from the bearing surface 156. The support body 159 constituting the single-piece coupling element 154, 155 in conjunction with the coupling parts 157 may have properties that are the same as or different from the coupling parts 157 in terms of toughness, strength, elasticity, etc. The coupling parts 157, preferably uniformly distributed on the support body surface, are bounded by side flanks extending out towards one another from the support body surface in the direction remote from the support body surface, which form support surfaces 177. The coupling parts 157 may naturally be provided with bead-shaped projections 158 projecting out from the support surfaces 177—as indicated by broken lines in FIG. 25—which are arranged at least at a slight distance apart from one another in the direction of a height of the coupling parts 157. It would naturally also be possible for the region of a profiled surface and the support surfaces 177 of the coupling parts 157 forming it to be totally covered by a coating and have a projection 158—as described above in connection with FIGS. 22 and 23—which is of an elastically flexible and reversible design. This coating may be made from a plastic with different properties from the coupling parts 157. For practical purposes, the coating is made from a material, in particular a plastic, with a higher elasticity. The layer itself expediently has a wave-shaped engagement or profiled surface. As may be seen from FIG. 25, the oppositely lying coupling elements 154, 155 may have different pitch distances 178, 179 between two coupling parts 157 of a coupling element 154; 155 arranged immediately one after the other or behind the other, so that coupling elements 154, 155 which lie opposite one another and can be moved into engagement with one another when the forward feed mechanism 15; 51 is raised—as indicated by arrow 180—so that part regions of the coupling elements 154; 155, in particular the coupling parts 157, are elastically deformed, as may be seen from FIG. 26. The workpiece holder 2 has the coupling elements 155 forming the drive means 149 and is guided along the guide tracks 20 in terms of height and to the side—although this is not illustrated in this drawing—and, when the forward feed mechanism 15; 51 is raised—as indicated b y arrow 180—it engages with the drive element 47 incorporating the first coupling element 154 in a positive and/or friction-locking arrangement. If the workpiece holder 2 is located in the node station 8 as such, the length of the mutually engaging coupling parts 157 of the coupling elements 154, 155 corresponds to a length of the coupling element 155 on the workpiece holder 2. Consequently, the workpiece holder 2 can be positioned exactly in the node station 8 and in the transport stations 7.

Consequently, the mutually engageable coupling elements 154, 155 may have the same pitch 178, 179 and a different number of coupling parts 157 within the same length. Moving or displacing at least one bearing region 176 of the first coupling element 154 relative to at least one coupling part 157 generates a higher positive and/or friction locking connection in the lengthways and/or widthways direction of the more or less strip-shaped coupling elements 154, 155. If the pitch distances 178, 179 are different, more than one coupling part 157 is forced into the bearing region 176 simultaneously, due to the support surfaces 177 sliding along one another as the coupling parts 157 of the mutually engageable coupling elements 154, 155 are moved into engagement with one another. This is schematically illustrated in FIG. 26. In order to assist the movement of several coupling parts 157 of a coupling element 154 into one receiving region 176 of the other coupling element 155, the flank angles 181 may be of different inclinations. By setting a maximum displacement path of the raisable forward feed mechanism 15; 51, the flanks of the coupling parts 157 are supported exclusively one against the other in the engaged position. As the workpiece holder 2 is moved out of a transport or node station 7; 8, the engaged coupling parts 157 are released from one another due to the relative motion of the workpiece holder 2 with respect to the drive element 47. As the length of overlap between the mutually engaged coupling parts 157 decreases in the region of the node station 8, for example, the length of overlap between the mutually engaged coupling parts 157 between the workpiece holder 2 and the drive element 47 of the transport station 7 disposed downstream of the node station 8 decreases, so that the workpiece holder 2 is always drivingly linked to at least one forward feed mechanism 15; 51. The coupling element 155 of the workpiece holder 2 may naturally also constitute a separate unit, disposed in a recess provided on the bottom face 148 of the workpiece holder 2. Consequently, the coupling element 155 will be spaced at least slightly apart from the transport plane 19.

FIGS. 27 and 28 illustrate other embodiments of the coupling elements 154, 155, the coupling elements 154, 155 illustrated in FIG. 27 being shown in the disengaged position and the coupling elements 154, 155 illustrated in FIG. 28 being shown in the engaged position. In this particular embodiment, the coupling element 154, 155 is provided in the form of a coupling part 157 with at least one surface profile 182, with a regular or irregular recurring waved pattern 183. The surface profile 182 is made up of several profile peaks 184 and profile valleys 185 which are disposed adjacent to one another in a regular or irregular arrangement, a maximum height 186 and maximum depth 187 being bounded by a base profile 188 and a reference profile 189. The profile peaks 184 and profile valleys 185, which may have the same or a slightly shorter height 186 or depth 187, extend between the base and reference profile 188, 189. It should be pointed out that the height 186 and depth 187 are respectively measured between the base and reference profiles 188, 189 as well as between a middle profile 190 and the reference profiles 188, 189. An opening width 192 of the profile valley 185, as measured at the middle profile 190 and between two adjacent profile surfaces 191, may be of the same or different dimensions from the other opening widths 192 of the other profile valleys 185. One of the coupling elements 155 is disposed on the top face 153 of the drive element 47 and the other coupling element 154 is disposed on the bottom face 148 of the workpiece holder 2 and the heights 186 and depths 187 of the profile peaks 184 and profile valleys 185 may differ from one another.

As may be seen more clearly from FIG. 28, the profile peaks 184 and profile valleys 185 of the mutually engageable coupling elements 154, 155 are of an elastically flexible and reversible design, so that, when at least two profile peaks 184 of the coupling elements 154, 155 come into contact with one another or impact with one another, they are elastically deformed in such a way that, on contact, the material is forced into the profile valley 185 or profile valleys 185 adjacent to the profile peak or peaks 184 and only certain regions of the profile peaks 184 are received in substantially matching profile valleys 185. As a result of the deformation of the profile peaks 184 and profile valleys 185 forming the coupling parts 157 and under the effect of the force applied by the forward feed mechanism 15; 51—indicated by arrow 180—a higher contact force and hence friction force is achieved between the coupling elements 154, 155, as a result of which the mutually engageable and latchable coupling elements 154, 155 enable the workpiece holder 2 to be moved forward. When the forward feed mechanism 15; 51 is lowered into its initial position, the coupling parts 157 are deformed and automatically resume their original initial position. The profile peaks 184 and profile valleys 185 of the mutually engageable coupling elements 154, 155 assume an engaged position in which they only partially mesh with one another. The particular advantage of this is that although the profile peaks and profile valleys 184, 185 can be moved into positive engagement with one another to a degree of approximately 30 to 100%, in particular between 50 and 90%, for example 70%, this is nevertheless enough to enable pre-definable forward displacement forces to be transmitted in a direction parallel with and/or at an angle to the bearing surface 156. The remaining proportion of the positive and friction lock, in other words 70 to 0%, in particular 50 and 10%, for example 30%, of the profile peaks 184 and profile valleys 185 is elastically deformed in certain regions. It should be pointed out that this proportion is measured as a percentage by reference to the coupling parts 157 or profile peaks 184 and profile valleys 185 distributed across the support body surface. It would also be possible, for example, for one of the coupling elements 154, 155 to have a different property in terms of strength, toughness, modulus of elasticity etc., which would means that at least one profile tip 184 of the first coupling element 154 would be able to conform to at least one profile tip 184 of the other coupling element 155 with less force. This provides a means of influencing the height of the forward feed force needed in order to transport the workpiece holder 2.

It should be pointed out that the coupling elements 154, 155 are illustrated in a simplified format and on a very much enlarged scale.

Finally, it should be pointed out that the conveyor sections 6a, 6b, 6c as well as work station 4 may be used for processing the components 3. Edges of the mutually spaced guide tracks 20 directed towards one another form a square in the conveyor sections 6a, 6c. Of these, a respective pair of guide tracks 20 may be designed so that they can be displaced by means of the adjusting mechanism 31; 134. Furthermore, a longitudinal distance between the rotation axes of the guide rollers disposed in the corner regions of the workpiece holder 2 may be the same as or at least slightly shorter than a length of the guide tracks 20 in the node stations 8. Accordingly, the workpiece holder 2 is essentially guided across its entire length 146 or width 144 in terms of height and at the side.

For the sake of good order, it should finally be pointed out that in order to provide a clearer understanding of the production line, it and its constituent parts are illustrated to a certain degree out of scale and/or on an enlarged scale and/or on a reduced scale.

The objectives and the solutions proposed by the invention may be found in the description.

Above all, the individual embodiments and features illustrated in FIGS. 1, 2, 3, 4, 5; 6, 7; 8, 9, 10, 11, 12; 13, 14; 15, 16; 17; 18; 19, 20; 21, 22, 23; 24; 25, 26, 27, 28 may be construed as independent solutions proposed by the invention. The associated objectives and solutions may be found in the detailed descriptions of the drawings.

| | List of reference numbers |
|---|---|
| 1 | Production line |
| 2 | Workpiece holder |
| 3 | Component |
| 4 | Work station |
| 5 | Conveyor section |
| 6a | Conveyor section |
| 6b | Conveyor section |
| 6c | Conveyor section |
| 7 | Transport station |
| 8 | Node station |
| 9 | Machine frame |
| 10 | Mounting surface |
| 11 | Support element |
| 12 | Base frame |
| 13 | Main conveyor |
| 14 | Transverse conveyor |
| 15 | Forward feed mechanism |
| 16 | Arrow |
| 17 | Drive element |
| 18 | Apron |
| 19 | Transport plane |
| 20 | Guide track |
| 21 | Guide rail |
| 22 | Length |
| 23 | Width |
| 24 | Base frame |
| 25 | Frame part |
| 26 | Frame part |
| 27 | Length |
| 28 | Width |
| 29 | Rotary table |
| 30 | Recess |
| 31 | Adjusting mechanism |
| 32 | Support frame |
| 33 | Support plate |
| 34 | Guide element |
| 35 | Guide bar |
| 36 | Unit |
| 37 | Mid-axis |
| 38 | Mid-axis |
| 39 | Side region |
| 40 | Lateral intermediate region |
| 41 | Support element |
| 42 | Operating and/or locking mechanism |
| 43 | Height adjusting mechanism |
| 44 | Clearance compensating device |
| 45 | Drive system |
| 46 | Gear system |
| 47 | Drive element |
| 48 | Input drive part |
| 49 | Output part |
| 50 | Output part |
| 51 | Forward feed mechanism |
| 52 | Pulley block |
| 53 | Drive roller |
| 54 | Cutout |
| 55 | Gear housing |
| 56 | Recess |
| 57 | Mid-axis |
| 58 | Mid-axis |

-continued

List of reference numbers

| | |
|---|---|
| 59 | Control module |
| 60 | Connecting line |
| 61 | Supply unit |
| 62 | Support body |
| 63 | Height-restricting mechanism |
| 64 | Stop element |
| 65 | Stop surface |
| 66 | Guide carriage |
| 67 | Height |
| 68 | Length |
| 69 | Actuator lever |
| 70 | Recess |
| 71 | Actuator drive |
| 72 | Support plate |
| 73 | Piston rod |
| 74 | Guide part region |
| 75 | Support surface |
| 76 | Actuator drive |
| 77 | Operating element |
| 78 | Interrogation element |
| 79 | Connecting element |
| 80 | Connecting line |
| 81 | Flow passage |
| 82 | Distributor passage |
| 83 | Terminal element |
| 84 | Connecting line |
| 85 | Projection |
| 86 | Projection |
| 87 | Middle web |
| 88 | Thickness |
| 89 | Pivot bearing |
| 90 | Pivot axis |
| 91 | Longitudinal mid-axis |
| 92 | Leg |
| 93 | Bearing element |
| 94 | Leg |
| 95 | Middle web |
| 96 | Recess |
| 97 | Rotation axis |
| 98 | Bearing element |
| 99 | Roller bearing |
| 100 | Return element |
| 101 | Arrow |
| 102 | Bolt element |
| 103 | Stop and clearance compensating device |
| 104 | Width |
| 105 | Guide mechanism |
| 106 | Guide element |
| 107 | Stop surface |
| 108 | Recess |
| 109 | Guide surface |
| 110 | Guide surface |
| 111 | Restricting element |
| 112 | Leg |
| 113 | Leg |
| 114 | Side face |
| 115 | Oblique surface |
| 116 | Guide bush |
| 117 | Bore |
| 118 | Distributor rail |
| 119 | Threaded bore |
| 120 | Base body |
| 121 | Projection |
| 122 | Recess |
| 123 | Actuator element |
| 124 | Wedge and positioning surface |
| 125 | Fixing flange |
| 126 | Threaded pin |
| 127 | Longitudinal slot |
| 128 | Fixing and/or centring element |
| 129 | Projection |
| 130 | Base plate |
| 131 | Bearing mechanism |
| 132 | Drive system |
| 133 | Drive means |
| 134 | Adjusting mechanism |
| 135 | Support body |

-continued

List of reference numbers

| | |
|---|---|
| 136 | Actuator drive |
| 137 | Fixing element |
| 138 | Axis |
| 139 | Part |
| 140 | Actuator lever |
| 141 | Pivot axis |
| 142 | Slide track |
| 143 | Bearing element |
| 144 | Width |
| 145 | Longitudinal side face |
| 146 | Length |
| 147 | Transverse side face |
| 148 | Bottom face |
| 149 | Drive means |
| 150 | Side face |
| 151 | Wiping and/or lubricating element |
| 152 | Distance |
| 153 | Top face |
| 154 | Coupling element (drive element) |
| 155 | Coupling element |
| 156 | Bearing surface |
| 157 | Coupling parts |
| 158 | Projection |
| 159 | Support body |
| 160 | Transfer region |
| 161 | Frame part |
| 162 | Driver element (notched belt-gap) |
| 163 | Locating means (notched belt-tooth) |
| 164 | Driver element (workpiece holder-gap) |
| 165 | Locating means (workpiece holder-tooth) |
| 166 | Control unit |
| 167 | Distance |
| 168 | Return mechanism |
| 169 | Return element |
| 170 | Slide surface |
| 171 | Slide plate |
| 172 | Sensor |
| 173 | Intake region |
| 174 | Pitch (workpiece holder) |
| 175 | Pitch (belt) |
| 176 | Bearing region |
| 177 | End face |
| 178 | Pitch distance |
| 179 | Pitch distance |
| 180 | Arrow |
| 181 | Flank angle |
| 182 | Surface profile |
| 183 | Waved pattern |
| 184 | Profile peak |
| 185 | Profile valley |
| 186 | Height |
| 187 | Depth |
| 188 | Base profile |
| 189 | Reference profile |
| 190 | (Middle) profile |
| 191 | Profiled surface |
| 192 | Opening width |

What is claimed is:

1. Production line (1) for assembling or processing components transported on a workpiece holder (2), incorporating several conveyor sections (5, 6a, 6b, 6c) arranged one after the other in a feed direction (16) of the workpiece holder (2), each of which has at least one separate forward feed mechanism (15, 51) which is independent of the adjacent conveyor sections (5, 6a, 6b, 6c), and at least two oppositely lying guide tracks (20) spaced at a distance apart from one another and disposed transversely to the feed direction (16), along which the workpiece holder (2) is guided by guide elements (106) disposed at its oppositely lying sides, and is displaceable by means of the respective forward feed mechanism (15, 51), wherein the guide elements (106) or the guide tracks (20) form a groove-shaped recess (108) and the guide elements (106) on the workpiece holder (2) have a cross-sectional shape complementing the recess (108) in the guide tracks (20), or the guide tracks (20) have guide surfaces (110) in at least certain regions which complement the recess (108), and the workpiece holder (2) with its drive means (149) engages in a form lock in a belt-type drive element (17, 47) of the forward feed mechanism (15, 51) and is drivingly linked to the drive element (17, 47) and is guided along the guide tracks (20) in a direction perpendicular to and parallel with the transport plane (19) and, in at least one of the conveyor sections (6a; 6c), a pair of guide tracks (20) lying opposite one another in the feed direction (16) can be raised by means of an adjusting mechanism (31) from a non-operating position outside a structure gage of the workpiece holder (2) into a position located above the transport plane (19) and can be displaced respectively in the same direction transversely to the longitudinal direction of the guide track (20) into an engaged position so that the guide tracks (20) mutually engage with the guide elements (106).

2. Production line as claimed in claim 1, wherein the guide elements (106) are provided in the form of guide rollers disposed on oppositely lying sides of the workpiece holder (2), at least in corner regions, which rotate about axes extending perpendicular to the transport plane (19).

3. Production line as claimed in claim 1, wherein the guide elements (106) are guide rails.

4. Production line as claimed in claim 1, wherein the guide elements (106) are disposed consecutively, spaced apart from one another by a distance which is the same as or slightly longer than a length of the guide tracks (20) in the conveyor section (6a,6c).

5. Production line as claimed in claim 1, wherein the workpiece holder (2) is square-shaped and the guide elements (106) are disposed on a bottom face (148) of the workpiece holder (2) directed towards the transport plane (19).

6. Production line as claimed in claim 2, wherein at least certain regions of the guide rollers are disposed in circular cylindrical recesses in the bottom face (148) of the workpiece holder (2).

7. Production line as claimed in claim 1, wherein the groove-shaped recess (108) on the guide elements (106) is bounded by complementary guide surfaces (109) disposed at an angle to one another and at least certain regions of the guide tracks (20) have guide surfaces (110) complementing the recess (108).

8. Production line as claimed in claim 1, wherein the guide tracks (20) are provided in the form of guide rails (21) or by guide rollers respectively disposed along the guide tracks (20) arranged at a distance apart from one another.

9. Production line as claimed in claim 1, wherein edges of the mutually spaced guide tracks (20) disposed transversely to the feed direction (16) of the workpiece holder (2) form a square in the conveyor section (6a,6c).

10. Production line as claimed in claim 1, wherein that the workpiece holder (2) is supported by the guide elements (106) against the guide tracks (20) and at least a slight distance (152) is left free between a bottom face (148) of the workpiece holder (2) and the transport plane (19) in a direction perpendicular to the transport plane (19).

11. Production line as claimed in claim 10, wherein the vertical distance (152) between the workpiece holder (2) and the transport plane (19) can be adjusted by means of a remotely operable height adjusting mechanism (63).

12. Production line as claimed in claim 1, wherein the two oppositely lying guide tracks (20) disposed transversely to the feed direction (16) of the workpiece holder (2) are respectively connected to at least one adjusting mechanism (31; 134) and are displaceable synchronously with one another.

13. Production line as claimed in claim 12, wherein each of the adjusting mechanisms (31) of the conveyor sections (6a,6c) is disposed on a support frame (32) and has a first actuator drive (71), an operating and locking mechanism (42) for the guide track (20), a substantially prism-shaped guide carriage (66) and a support body (62) provided therewith.

14. Production line as claimed in claim 13, wherein the support frame (32) is interchangeably connected to a base frame (24) of a machine frame (9) by fixing means.

15. Production line as claimed in claim 13, wherein the adjusting mechanisms (31) of the conveyor section (6a,6c) are interchangeably connected to the support frame (32) by fixing means.

16. Production line as claimed in claim 15, wherein the square base frame (24) of the conveyor sections (6a, 6b, 6c) has a bottom frame part (25) and a top frame part (26), which are connected to one another by means of vertically extending side walls, and a square apron (18) is placed on the top frame part (26).

17. Production line as claimed in claim 16, wherein a recess (30) for a circular rotary table (29) is provided in the apron (18) and the support frame (32) has a preferably octagonal support plate (33) disposed parallel with the transport plane (19) and strip-shaped support elements (41) disposed perpendicular thereto, and the rotary table (29) and the support plate (33) are connected to one another by diagonally opposite support elements (41).

18. Production line as claimed in claim 17, wherein the support frame (32) is mounted on a face remote from the rotary table (29) by means of a bearing mechanism (131) 50 as to be displaceable in a pivoting motion relative to the base frame (24), about an axis extending perpendicular to the transport plane (19), and a drive means (133) parallel with the transport plane (19) is drivingly linked to a drive system (132).

19. Production line as claimed in claim 18, wherein the drive system (132) is detachably connected to the stationary base frame (24).

20. Production line as claimed in claim 16, wherein the apron (18) or the rotary table (29) has longitudinal cutouts (54) to accommodate at least one pair of guide rails (21) and the drive elements (47) of the forward feed mechanism (15, 51).

21. Production line as claimed in claim 17, wherein, in the extracted position, the pair of guide rails (21) projects out from the apron (18) or rotary table (29) forming the transport plane (19).

22. Production line as claimed in claim 20, wherein, in the non-operating position, the pair of guide rails (21) is lowered into the cutouts (54) in the apron (18) or in the rotary table (29) below the transport plane (19).

23. Production line as claimed in claim 1, wherein the workpiece holder (2) has a drive means (149) on its bottom face (148) between the guide elements (106) disposed on oppositely lying sides, and the at least one forward feed mechanism (15, 51) incorporating a drive element (17, 47) comprising the latter is drivingly connected to the respective drive means (149).

24. Production line as claimed claim 1, wherein a first forward feed mechanism (15) with a first drive element (47) is disposed between the guide tracks (20) of the conveyor section (6a,6c) in the feed direction (16) of the workpiece holder (2) and another forward feed mechanism (51) with another drive element (47) is disposed transversely to the feed direction (16) of the workpiece holder (2), and the forward feed mechanisms (15, 51) are alternately height-adjustable in the direction perpendicular to the transport plane (19) and are driven by means of a drive system (45) with an interconnected gear mechanism (46) at the same circumferential speed, and the workpiece holder (2) is alternately drivingly connected to one of the forward feed mechanisms (15, 51) and can be displaced and positioned in the feed direction (16) or transversely to the feed direction (16) in one of several conveyor sections (5) alongside the conveyor section (6a,6c).

25. Production line as claimed in claim 13, wherein the prism-shaped guide carriage (66) of the adjusting mechanisms (13) is mounted so as to be displaceable by means of the first actuator drive (71) along guide elements (34) vertically disposed on the support plate (33) of the support frame (32) and the substantially cruciform support body (62) for receiving certain regions of another actuator drive (76) of the operating and locking mechanism (42) is connected to the guide carriage (66).

26. Production line as claimed in claim 25, wherein the support body (62) has projections (85) projecting laterally, transversely to its longitudinal extension, and has substantially U-shaped pivot mounts (89) between a middle web (87) and the projections (85) across at least a part of its thickness (88), as well as a projection (86) between the pivot mounts (89) in the other longitudinal extension.

27. Production line as claimed in claim 13, wherein at least one fork-shaped actuator lever (69) is mounted on the support body (62) and the guide rail (21) is detachably connected to the actuator lever (69) by means of connecting elements and mutual positioning elements.

28. Production line as claimed in claim 27, wherein the actuator lever (69) is mounted so as to be displaceable in a pivoting motion against the action of at least one elastic return element (100) about an axis extending transversely thereto.

29. Production line as claimed in claim 27, wherein the actuator lever (69) has a substantially L-shaped cross section in the region of the oppositely lying pivot mounts (89), and shorter legs (92) of bearing elements (93) in the region of the pivot mounts (89) extending transversely to the longitudinal extension of the support body (61) are mounted so as to be pivotable, and legs (94) projecting out from the shorter legs (92) have bearing elements (98) mounted so as to pivot about a rotation axis (97) extending parallel with a pivot axis (90) for the actuator lever (69).

30. Production line as claimed in claim 29, wherein the bearing elements (98) are provided in the form of roller bearings (99).

31. Production line as claimed in claim 1, wherein the adjusting mechanisms (31) are displaceable in a direction perpendicular to the transport plane (19) and a displacement motion of the adjusting mechanisms (31) in the direction perpendicular to the transport plane (19) is restricted by a height adjusting mechanism (63).

32. Production line as claimed in claim 27, wherein a displacement path of the actuator lever (69) transversely to the feed direction (16) of the workpiece holder (2) is restricted by adjustable means of a stop and clearance compensating device (103).

33. Production line as claimed in claim 13, wherein the guide carriage (66) is drivingly connected to the first actuator drive (71) via an interconnected support plate (72).

34. Production line as claimed in claim 13, wherein the operating and locking mechanism (42) has another actuator drive (76) affixed to the support body (62), and an operating element (77).

35. Production line as claimed in claim 34, wherein the operating element (77) of the operating and locking mechanism (42) is substantially U-shaped and has an L-shaped cross section.

36. Production line as claimed in claim 34, wherein a leg (112) of the operating element (77) is mounted on the other actuator drive (76) and the other projecting leg (113) has an oblique surface (115) on its free end in the region of a side face (114) directed towards the actuator lever (69).

37. Production line as claimed in claim 36, wherein, when the guide track (20) is in a non-operating position, the oblique surface (115) is engagingly linked to the bearing element (98) of the actuator lever (69).

38. Production line as claimed in claim 36, wherein when the guide track (20) is in a raised engaged position, the bearing element (98) of the actuator lever (69) is engagingly linked to the vertical side face (114) forming a slide track.

39. Production line as claimed in claim 34, wherein the operating and/or locking mechanism (42) co-operates with at least one clearance compensating device (44) detachably affixed to the support elements (41).

40. Production line as claimed in claim 39, wherein the clearance compensating device (44) has a substantially prism-shaped base body (120) with wedge-shaped positioning elements (123) therein, which can be displaced and fixed relative to one another.

41. Production line as claimed in claim 34, wherein pressure is applied consecutively to the first actuator drives (71) to make a synchronous height adjustment and to the other actuator drives (76) to effect a synchronous pivoting motion of the respective pairs of guide rails (21) in the conveyor section (6a,6c).

42. Production line as claimed in claim 12, wherein an actuator lever (140) of the adjusting mechanism (134) operable by means of an actuator drive (136) has at least one slide track (142) and the slide track (142) is supported on at least one bearing element (143).

43. Production line as claimed in claim 42, wherein a first part region of the slide track (142) is inclined relative to the transport plane (19) and another part region adjoining it extends perpendicular to the transport plane (19).

44. Production line as claimed in claim 42, wherein the actuator lever (140) bearing the guide track (20) is adjustable or displaceable in order to produce a mutual engagement of the guide track (20) with the guide elements (106) against the action of elastic return elements, out of the non-operating position into the engaged position in a direction parallel with the angle of inclination of the part region of the slide track (142).

45. Production line as claimed claim 42, wherein the actuator drive (136) is mounted so as to be pivotable about an axis (138) extending transversely to the longitudinal axis thereof.

46. Production line as claimed in claim 13, wherein the guide carriage (66) acts as a pneumatic or hydraulic or electrical distributor rail (118) with terminals.

47. Production line as claimed in claim 46, wherein the distributor rail (118) has electric control lines or passages conveying a pressurising medium.

48. Production line as claimed in claim 46, wherein the guide carriage (66) is provided with a memory module or a control unit processing signals or bus data.

49. Production line as claimed in claim 1, wherein the one of the conveyor sections (5) is a holding or buffer run (13) for accommodating several workpiece holders (2) in readiness for delivering the workpiece holders (2) to and away from one other conveyor section (5).

50. Method of transferring a workpiece holder (2) from a first conveyor section (5, 6a, 6b, 6c) to a second conveyor section (5, 6a, 6b, 6c) immediately adjacent to it, the workpiece holder (2) being engaged in a positive lock by a drive means (149) with a first cogged-belt drive arranged in the first conveyor section (5, 6a, 6b, 6c) and a second cogged-belt drive arranged in the second conveyor section (5, 6a, 6b, 6c) during the movement of the work piece holder (2) between the first and second conveyor sections (5, 6a, 6b, 6c), wherein before the workpiece holder (2) enters the other conveyor section (5, 6a, 6b, 6c), a distance (167) between driver elements (162) of two consecutive cogged-belt drives corresponding to a multiple of a pitch (174) of the drive means (149) on the workpiece holder (2) is detected and, if there is a deviation, a forward feed rate of at least one cogged-belt drive of the first and second conveyor sections (5, 6a, 6b, 6c) displacingly connected to the drive means (149) of the workpiece holder (2) and designed to engage in the drive means (149) of the workpiece holder (2) is briefly varied until the distance (167) is set to a multiple of the pitch (174) of the drive means (149) on the workpiece holder (2), after which the workpiece holder (2) moves from the first conveyor section (5, 6a, 6b, 6c) into the second conveyor section (5, 6a, 6b, 6c) and the driver elements (164) of the drive means (149) are alternately engaged with locating means (163) of the cogged-belt drives in the second conveyor section (5, 6a, 6b, 6c) free of slip.

51. Method as claimed in claim 50, wherein, as the workpiece holder (2) is transferred from the first conveyor section (5; 6a; 6b; 6c) towards the second conveyor section (5; 6a; 6b; 6c) disposed downstream in a feed direction (16), a relative position of the drive means (149) on the workpiece holder (2) with respect to the cogged-belt drive is detected in order to ascertain the distance (167) and, in the event of a deviation, a forward feed rate of at least one of the cogged-belt drives is briefly varied and, once the distance (167) is set, the workpiece holder (2) is moved into the second conveyor section (5; 6a; 6b; 6c) and the locating means (163) of the cogged-belt drive is alternately moved into engagement with driver elements (164) of the drive means (149) without any slip.

52. Method as claimed in claim 50, wherein, once the distance (167) has been set, the speeds of drive systems (45) for the cogged-belt drives are synchronised during the movement of the workpiece holder (2) between the first and second conveyor sections (5, 6a, 6b, 6c) and the actual values of the adjusted speeds and the distance (167) are stored as desired values.

53. Method as claimed in claim 50, wherein the cogged-belt drives and the drive means (149) have the same geometries, such as pitch, tooth width, tooth height, and gap width.

54. Method as claimed in claim 50, wherein the drive system (45) for the first cogged-belt drive is speed-controlled and the drive system (45) for the second cogged-belt drive is torque-controlled and, as it is transferred from the first conveyor section (5, 6a, 6b, 6c) to the second conveyor section (5, 6a, 6b, 6c), the workpiece holder (2) sits with a first flank of a tooth of the drive means (149) at a tangent to a flank of a tooth of the cogged-belt drive and, if there is a deviation in the distance (167), a desired value of a driving torque that will overcome the load torque is applied to the drive system (45), after which the speed is changed, and when the driving torque reaches the desired value, the set speed or a resultant distance (167) is stored as a new desired value.

55. Forward feed mechanism (15, 51) for a workpiece holder (2) with a bottom face (148) which can be displaced and positioned along at least two oppositely lying guide tracks (20) and guided in a lateral and vertical direction, which forward feed mechanism (15, 51) has at least one endlessly circulating belt-type drive element (17, 47) drivingly linked to the workpiece holder (2) in order to move the workpiece holder (2) along the guide tracks (20), the drive element (17, 47) having a first coupling element (155) on a top face (153) directed towards the bottom face (148) of the workpiece holder (2) and the workpiece holder (2) having a second coupling element (155) on the bottom face (148), the first and second coupling elements each having at least one coupling part (157) which can be moved into engagement, wherein the coupling parts (157) of the coupling elements (154, 155) are made from an elastically flexible and reversible plastics material and, when the coupling elements (154, 155) are in a coupled engaged position, contacting coupling parts (157) of the first and second coupling elements (154, 155) are elastically deformed, so that the coupling elements (154, 155) can be coupled with one another in each of their relative positions for the positioned movement of the workpiece holder (2) along the guide tracks (20).

56. Forward feed mechanism as claimed in claim 55, wherein the belt-type drive element (17, 47) constitutes the coupling element (154, 155).

57. Forward feed mechanism as claimed in claim 55, wherein the first coupling element (154) is connected with the drive element (17, 47) and the second coupling element (155) is connected with the workpiece holder (2).

58. Forward feed mechanism as claimed in claim 55, wherein the drive element (17, 47) is of a multi-layered structure and one of the layers is the first coupling element (154).

59. Forward feed mechanism as claimed in claim 55, wherein the coupling parts (157) have slightly elastically flexible projections (158) distributed on their surface or on a flat support body (159) and standing proud thereof.

60. Forward feed mechanism as claimed in claim 55, wherein, in the engaged position, the oppositely lying coupling elements (154, 155) of the drive element (17, 47) and workpiece holder (2) engage one another in an essentially positive and friction lock in order to move the workpiece holder (2) along.

61. Forward feed mechanism as claimed in claim 55, wherein the drive element (17, 47), is relatively displaceable at least at an angle to a bearing surface (156) of the first and second coupling elements in order to engage or release the engageable coupling elements (154, 155), and the displacement path is restricted by a minimum height of the coupling parts (157) of the second coupling element (155) on the workpiece holder (2).

62. Forward feed mechanism as claimed in claim 55, wherein the drive element (17, 47) and the workpiece holder (2) is made from plastic and the coupling elements (154, 155) are extruded thereon.

63. Forward feed mechanism as claimed in claim 55, wherein the coupling element (154, 155) is made in a single piece and from the same material.

64. Forward feed mechanism as claimed in claim 55, wherein the coupling element (154, 155) comprises multiple parts or multiple layers.

65. Forward feed mechanism as claimed in claim 55, wherein the coupling element (154, 155) is made from materials having different strength or toughness properties and modulus of elasticity.

66. Forward feed mechanism as claimed in claim 55, wherein the first coupling element (154) has a mechanical property that is different from that of the second coupling element (155).

67. Forward feed mechanism as claimed in claim 55, wherein the coupling part (157) has a surface profile (182) with profile peaks (184) and profile valleys (185) regularly or irregularly distributed across a bearing surface (156) on the belt-type drive element and workpiece holder or a support body of the first and second coupling elements.

68. Forward feed mechanism as claimed in claim 67, wherein the coupling parts (157) of the first and second coupling elements are elastically deformable and reversible in three spatial directions.

69. Forward feed mechanism as claimed in claim 67, wherein the workpiece holder (2) and the drive element (17, 47) cause a conformation of the profiled surface (191) of at least one coupling element (154, 155) when at least two profile peaks (184) of the coupling elements (154, 155) come into contact one another or impact with one another and the coupling elements (154, 155) are drivingly linked to one another in a positive and friction lock.

70. Forward feed mechanism as claimed in claim 55, wherein, in the region of the profiled surface (191), the coupling element (154, 155) is provided with an elastically deformable and reversible coating or with at least one projection (158) standing proud of it.

71. Forward feed mechanism as claimed in claim 55, wherein the first and second coupling elements each have a plurality of coupling parts and a pitch distance (178, 179) between two adjacent coupling parts (157) of the engageable coupling elements (154, 155) is different.

72. Forward feed mechanism as claimed in claim 60, wherein the proportion of the coupling parts (157) which can be engaged with one another in a positive lock to transmit the forward displacement force is between 30% and 100%.

73. Forward feed mechanism as claimed in claim 60, wherein the proportion of the coupling parts (157) which can be engaged with one another in a friction lock to transmit the forward displacement force is between 70% and 0%.

* * * * *